US012652206B2

(12) United States Patent
Liang et al.

(10) Patent No.: US 12,652,206 B2
(45) Date of Patent: Jun. 9, 2026

(54) DATA TRANSMISSION METHOD, COMMUNICATION NODE, AND COMPUTER READABLE STORAGE MEDIUM

(71) Applicant: ZTE Corporation, Shenzhen (CN)

(72) Inventors: Chulong Liang, Shenzhen (CN); Jin Xu, Shenzhen (CN); Liguang Li, Shenzhen (CN); Guanghui Yu, Shenzhen (CN); Jian Kang, Shenzhen (CN); Qiang Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 187 days.

(21) Appl. No.: 18/566,060

(22) PCT Filed: May 9, 2022

(86) PCT No.: PCT/CN2022/091729
§ 371 (c)(1),
(2) Date: Nov. 30, 2023

(87) PCT Pub. No.: WO2022/252925
PCT Pub. Date: Dec. 8, 2022

(65) Prior Publication Data
US 2024/0372771 A1    Nov. 7, 2024

(30) Foreign Application Priority Data

Jun. 2, 2021    (CN) .......................... 202110615616.X

(51) Int. Cl.
*H04L 27/34* (2006.01)
*H04L 27/36* (2006.01)
(52) U.S. Cl.
CPC .......... *H04L 27/3405* (2013.01); *H04L 27/36* (2013.01)
(58) Field of Classification Search
CPC .......................... H04L 27/3405; H04L 27/36
See application file for complete search history.

(56) References Cited

U.S. PATENT DOCUMENTS 9,031,168 B1 * 5/2015 Liu ...................... H04L 27/3405
375/329
10,177,948 B2 * 1/2019 Murakami .............. H04L 27/34
(Continued)

FOREIGN PATENT DOCUMENTS

| CN | 102316072 A | 1/2012 |
| CN | 103560861 A | 2/2014 |

(Continued)

OTHER PUBLICATIONS

Zhang et al., DWDM Modulation Format Recognition in DWDM System based on Gaussian Noise Model. Journal of Optoelectronics-laser. Jan. 31, 2019;27(01). 10 pages.
(Continued)

*Primary Examiner* — Freshteh N Aghdam
(74) *Attorney, Agent, or Firm* — Wolf, Greenfield & Sacks, P.C.

(57) ABSTRACT

Disclosed are a data transmission method, a communication node, and a non-transitory computer readable storage medium. The method is applied to a first communication node and may include: acquiring a first bit sequence $f_0$, $f_1$, $f_2$, ..., $f_{E-1}$; mapping every Qm bits in the first bit sequence $f_0$, $f_1$, $f_2$, ..., $f_{E-1}$ to one complex-valued modulation symbol based on a Regular Amplitude Phase Shift Keying (RAPSK) constellation to obtain a symbol sequence $x_0$, $x_1$, $x_2$, ..., $x_{E/Qm-1}$, wherein E denotes a length of the first bit sequence and is a positive integer, Qm denotes a modulation order of RAPSK modulation, and the RAPSK constellation has $2^{Qm}$ constellation points; and transmitting the symbol sequence $x_0$, $x_1$, $x_2$, ..., $x_{E/Qm-1}$ to a second communication node.

18 Claims, 39 Drawing Sheets

(56) References Cited

U.S. PATENT DOCUMENTS

| | | | |
|---|---|---|---|
| 2019/0268210 A1 | 8/2019 | Kayhan et al. | |
| 2020/0220763 A1* | 7/2020 | Montorsi | H04L 27/3405 |
| 2021/0377086 A1* | 12/2021 | Hussein | H04L 27/2064 |

FOREIGN PATENT DOCUMENTS

| | | | |
|---|---|---|---|
| CN | 103763298 A | 4/2014 |
| CN | 110832818 A | 2/2020 |
| WO | 2019/091544 A1 | 5/2019 |

OTHER PUBLICATIONS

Ferrand et al., High Rate Regular APSK Constellations. IEEE Transactions on Communications. Mar. 31, 2019;67(3). 8 pages.

International Search Report and Written Opinion mailed Jul. 27, 2022, in connection with International Application No. PCT/CN2022/091729.

Extended European Search Report for European Application No. 22814972.0, dated Apr. 9, 2025.

* cited by examiner

Acquire a first bit sequence $f_0, f_1, f_2, ..., f_{E-1}$    $\sim$ S110

Map every Qm bits in the first bit sequence $f_0, f_1, f_2, ..., f_{E-1}$ to one complex-valued modulation symbol based on a regular amplitude phase shift keying (RAPSK) constellation to obtain a symbol sequence $x_0, x_1, x_2, ..., x_{E/Qm-1}$, where E denotes a length of the first bit sequence and is a positive integer, Qm denotes a modulation order of RAPSK modulation, and the RAPSK constellation has $2^{Qm}$ constellation points    $\sim$ S120

Transmit the symbol sequence $x_0, x_1, x_2, ..., x_{E/Qm-1}$ to a second communication node    $\sim$ S130

FIG. 1

Receive a symbol sequence $x_0, x_1, x_2, ..., x_{E/Qm-1}$ transmitted by a first communication node, the symbol sequence $x0, x1, x_2, ..., x_{E/Qm-1}$ being obtained by the first communication node mapping every Qm bits in a first bit sequence $f_0, f_1, f_2, ..., f_{E-1}$ to one complex-valued modulation symbol based on a regular amplitude phase shift keying (RAPSK) constellation, where E denotes a length of the first bit sequence and is a positive integer, Qm denotes a modulation order of RAPSK modulation, and the RAPSK constellation has $2^{Qm}$ constellation points    $\sim$ S210

FIG. 2

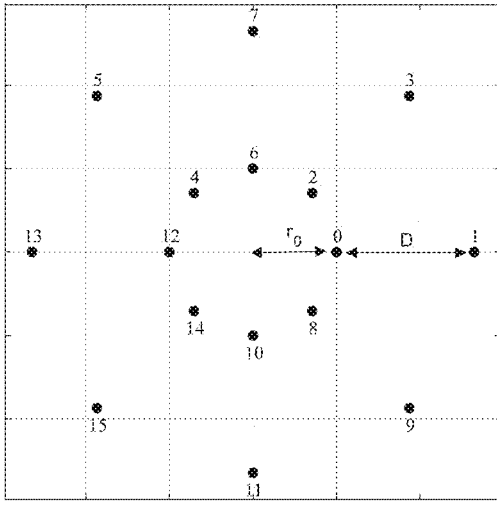

FIG. 3a

DATA TRANSMISSION METHOD, COMMUNICATION NODE, AND COMPUTER READABLE STORAGE MEDIUM

CROSS-REFERENCE TO RELATED APPLICATION

This application is a national stage filing under 35 U.S.C. § 371 of International Patent Application Serial No. PCT/CN2022/091729, filed May 9, 2022, which claims priority to Chinese patent application No. 202110615616.X filed on Jun. 2, 2021. The contents of these applications are incorporated herein by reference in their entirety.

TECHNICAL FIELD

The present disclosure relates to a wireless communication network, for example, to a data transmission method, a communication node, and a computer-readable storage medium.

BACKGROUND

With the continuous development of wireless communication networks, wireless communication has played an increasingly important role in people's lives. Currently, in the 5th Generation (5G) mobile communication technology standard of the 3rd Generation Partnership Project (3GPP), there is a performance gap between Quadrature Amplitude Modulation (QAM) constellation signaling and capacity-approaching Gaussian signaling. This performance gap, as the spectral efficiency (SE) increases, will exceed 1 dB. A pressing challenge at hand is to find a solution that enables the constellation signaling to achieve the same block error rate as capacity-approaching Gaussian signaling under identical spectral efficiency conditions.

SUMMARY

The present disclosure provides a data transmission method, a communication node and a computer-readable storage medium, which can reduce the received signal-to-noise ratio required to achieve the same block error rate relative to transmitting QAM constellation signals under identical spectral efficiency conditions.

According to an embodiment of the present disclosure provided is a data transmission method, which is applied to a first communication node. The method may include:

acquiring a first bit sequence $f_0$, $f_1$, $f_2$, . . . , $f_{E-1}$; mapping every Qm bits in the first bit sequence $f_0$, $f_1$, $f_2$, . . . , $f_{E-1}$ to one complex-valued modulation symbol based on a regular amplitude phase shift keying (RAPSK) constellation to obtain a symbol sequence $x_0$, $x_1$, $x_2$, . . . , $x_{E/Qm-1}$, where E denotes a length of the first bit sequence and is a positive integer, Qm denotes a modulation order of RAPSK modulation, and the RAPSK constellation has $2^{Qm}$ constellation points; and transmitting the symbol sequence $x_0$, $x_1$, $x_2$, . . . , $x_{E/Qm-1}$ to a second communication node.

An embodiment of the present disclosure provides a data transmission method, which is applied to a second communication node, the method including: receiving a symbol sequence $x_0$, $x_1$, $x_2$, . . . , $x_{E/Qm-1}$ transmitted by a first communication node, the symbol sequence $x_0$, $x_1$, $x_2$, . . . , $x_{E/Qm-1}$ being obtained by the first communication node mapping every Qm bits in a first bit sequence $f_0$, $f_1$, $f_2$, . . . , $f_{E-1}$ to one complex-valued modulation symbol based on a regular amplitude phase shift keying (RAPSK) constellation, where E denotes a length of the first bit sequence and is a positive integer, Qm denotes a modulation order of RAPSK modulation, and the RAPSK constellation has $2^{Qm}$ constellation points.

An embodiment of the present disclosure provides a communication node, including: a processor, the processor being configured to perform the method of any one of the above embodiments when executing a computer program.

A further embodiment of the present disclosure provides a computer-readable storage medium storing a computer program which, when executed by a processor, causes the process to perform the method of any one of the above embodiments.

The above embodiments and other aspects and the implementations thereof in the present disclosure are further described in the brief description of drawings, the detailed description, and the claims.

BRIEF DESCRIPTION OF DRAWINGS

FIG. 1 is a schematic flowchart of a data transmission method according to an embodiment;

FIG. 2 is a schematic flowchart of another data transmission method according to an embodiment;

FIGS. 3a-3f are schematic diagrams of modulation mapping with different values of Qm, mp, ma, and θ* after determination of mp phase mapping bits and ma amplitude mapping bits in a certain way according to an embodiment in a first example of a fourth exemplary implementation;

DETAILED DESCRIPTION

Figure 3B:
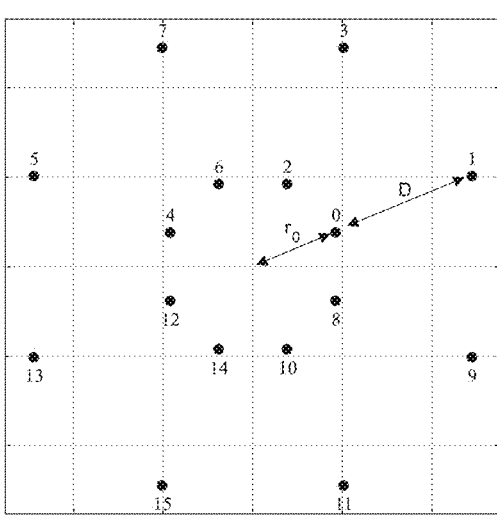

The embodiments of the present disclosure will be described in detail below in conjunction with the accompanying drawings.

Currently, in 5G standards, there exists a performance gap between QAM constellation signaling and capacity-approaching Gaussian signaling (hereinafter referred to as Gaussian signaling). This performance gap will exceed 1 dB as spectral efficiency of transmission (hereinafter referred to as spectral efficiency) increases (the performance gap between QAM constellation signaling and Gaussian signaling is typically 1.53 dB in the worst-case scenario). Therefore, to achieve the same spectral efficiency, QAM constellation signaling requires a received signal-to-noise ratio (SNR) that is more than 1 dB higher than that required for Gaussian signaling.

In order to reduce the required signal-to-noise ratio for signal reception under given spectral efficiency and block error rate conditions, geometrical shaping methods are commonly employed. These methods involve designing new signal constellations that approximate Gaussian signaling. A constellation represents a set of complex values including a finite number of elements, with each element referred to as a constellation point. For a constellation with 2Qm constellation points, Qm denotes the modulation order of the constellation, and Qm is typically a positive integer.

Amplitude Phase Shift Keying (APSK) is a widely used geometrical shaping method that has been applied in the Digital Video Broadcasting-Satellite-2nd Generation (DVB-S2) standard. An APSK constellation includes the following features:

(1) All constellation points are located on Na (Na>1) concentric circles, where each circle can also be referred to as a ring.

(2) The constellation points on the same circle are evenly spaced, meaning that the phase difference between adjacent constellation points is constant.

(3) The constellation points on the i-th circle share a common phase offset $\theta_i$, where i=0, 1, . . . , Na−1.

The above features can also be expressed using the following formula:

$$
x = \begin{cases}
r_0 \cdot \exp\left(j\left(\frac{2\pi}{n_0} \cdot i + \theta_0\right)\right) & i = 0, 1, \ldots, n_0 - 1 \\
r_1 \cdot \exp\left(j\left(\frac{2\pi}{n_1} \cdot i + \theta_1\right)\right) & i = 0, 1, \ldots, n_0 - 1 \\
\vdots & \vdots \\
r_{Na-1} \cdot \exp\left(j\left(\frac{2\pi}{n_{Na-1}} \cdot i + \theta_{Na-1}\right)\right) & i = 0, 1, \ldots, n_{Na-1} - 1
\end{cases},
$$

where $0 \leq r_0 < r_1 < \ldots < r_{Na-1}$ represents the radii of the Na concentric circles, $n_i$ and $\theta_i$ denote the number of constellation points and the phase offset of the constellation points on the circle with a radius of $r_i$, respectively, and, $j=\sqrt{-1}$ is an imaginary unit.

In the 5G standards, the process of bit interleaving and modulation mapping after Low Density Parity Check (LDPC) channel coding and rate matching is as follows:

(a) Bit interleaving: After channel coding and rate matching, a bit sequence $e_0$, $e_1$, $e_2$, . . . , $e_{E-1}$ is interleaved to a bit sequence $f_0$, $f_1$, $f_2$, . . . , $f_{E-1}$ according to the following method, where Qm is the modulation order of the QAM constellation.

```
for j = 0 to E/Qm−1
  for i = 0 to Qm−1
    f_{i+j·Q_m} = e_{i·E/Q_m+j}
  end
end for
```

The aforementioned interleaving process arranges the bit sequence $e_0$, $e_1$, $e_2$, . . . , $e_{E-1}$ in a row-by-row fashion into a matrix with Qm rows and E/Qm columns. Then, the corresponding elements are mapped one-to-one to the bit sequence $f_0$, $f_1$, $f_2$, . . . , $f_{E-1}$ which is arranged in a column-by-column fashion into a matrix with Qm rows and E/Qm columns.

For example, if Qm=4 and E=24, the aforementioned bit interleaving process can be represented using a matrix as follows:

$$
\begin{bmatrix}
f_0 & f_4 & f_8 & f_{12} & f_{16} & f_{20} \\
f_1 & f_5 & f_9 & f_{13} & f_{17} & f_{21} \\
f_2 & f_6 & f_{10} & f_{14} & f_{18} & f_{22} \\
f_3 & f_7 & f_{11} & f_{15} & f_{19} & f_{23}
\end{bmatrix}
=
\begin{bmatrix}
e_0 & e_1 & e_2 & e_3 & e_4 & e_5 \\
e_6 & e_7 & e_8 & e_9 & e_{10} & e_{11} \\
e_{12} & e_{13} & e_{14} & e_{15} & e_{16} & e_{17} \\
e_{18} & e_{19} & e_{20} & e_{21} & e_{22} & e_{23}
\end{bmatrix}.
$$

(b) Modulation mapping: A modulation mapper takes binary digits, 0 or 1, as input and generates complex-valued modulation symbols as output.

① $\pi/2$-Binary Phase Shift Keying (BPSK)

For $\pi/2$-BPSK modulation, bits b(i) are mapped to complex-valued modulation symbols d(i) according to the following rule:

$$
d(i) = \frac{e^{j\frac{\pi}{2}(i\,mod\,2)}}{\sqrt{2}}[(1 - 2b(i)) + j(1 - 2b(i))].
$$

② BPSK

For BPSK modulation, bits b(i) are mapped to complex-valued modulation symbols d(i) according to the following rule:

$$
d(i) = \frac{1}{\sqrt{2}}[(1 - 2b(i)) + j(1 - 2b(i))].
$$

③ Quadrature Phase Shift Keying (QPSK)

For QPSK modulation, pairs of bits b(2i), b(2i+1) are mapped to complex-valued modulation symbols d(i) according to the following rule:

$$
d(i) = \frac{1}{\sqrt{2}}[(1 - 2b(2i)) + j(1 - 2b(2i + 1))].
$$

④ 16QAM

For 16QAM modulation, quadruplets of bits b(4i), b(4i+1), b(4i+2), b(4i+3) are mapped to complex-valued modulation symbols d(i) according to the following rule:

$$
d(i) = \frac{1}{\sqrt{10}}\{(1 - 2b(4i))[2 - (1 - 2b(4i + 2))] +
$$
$$
j(1 - 2b(4i + 1))[2 - (1 - 2b(4i + 3))]\}.
$$

⑤ 64QAM

For 64QAM modulation, sextuplets of bits b(6i), b(6i+1), b(6i+2), b(6i+3), b(6i+4), b(6i+5) are mapped to complex-valued modulation symbols d(i) according to the following rule:

$$
d(i) = \frac{1}{\sqrt{42}}\{(1 - 2b(6i))[4 - (1 - 2b(6i + 2))[2 - (1 - 2b(6i + 4))]] +
$$
$$
j(1 - 2b(6i + 1))[4 - (1 - 2b(6i + 3))[2 - (1 - 2b(6i + 5))]]\}.
$$

⑥ 256QAM

For 256QAM modulation, octuplets of bits b(8i), b(8i+1), b(8i+2), b(8i+3), b(8i+4), b(8i+5), b(8i+6), b(8i+7) are mapped to complex-valued modulation symbols d(i) according to the following rule:

$$
d(i) = \frac{1}{\sqrt{170}}\{(1 - 2b(8i))[8 - (1 - 2b(8i + 2))
$$
$$
[4 - (1 - 2b(8i + 4))[2 - (1 - 2b(8i + 6))]]] +
$$
$$
j(1 - 2b(8i + 1))[8 - (1 - 2b(8i + 3))
$$
$$
[4 - (1 - 2b(8i + 5))[2 - (1 - 2b(8i + 7))]]]\}.
$$

In the above formulas, $j=\sqrt{-1}$ is the imaginary unit.

It can be seen that the modulation mapping for QAM modulation with modulation order Qm follows the following rules:

1. Bit $b(Qm\cdot i)$ determines the sign of the real part of the complex-valued modulation symbol d(i);
2. Bit $b(Qm\cdot i+1)$ determines the sign of the imaginary part of the complex-valued modulation symbol d(i);
3. Bits $b(Qm\cdot i+2)$, . . . , $b(Qm\cdot i+Qm-2)$ determine the absolute value of the real part of the complex-valued modulation symbol d(i); and
4. Bits $b(Qm\cdot i+3)$, . . . , $b(Qm\cdot i+Qm-1)$ determine the absolute value of the imaginary part of the complex-valued modulation symbol d(i).

For example, when Qm=1, $\pi/2$-BPSK modulation is used; when Qm=2, QPSK modulation is used; when Qm=4, 16QAM modulation is used; when Qm=6, 64QAM modulation is used; and when Qm=8, 256QAM modulation is used. If the higher layer parameter tp-pi2BPSK is configured, q=1; otherwise, q=2.

In the present disclosure, 1024QAM modulation may also be used. For 1024QAM modulation, 10-tuplets of bits b(i), b(i+1), b(i+2), b(i+3), b(i+4), b(i+5), b(i+6), b(i+7), b(i+8), b(i+9) are mapped to complex-valued modulation symbols x according to the following rule:

$$
x = \frac{1}{\sqrt{682}}\{(1 - 2b(i))[16 - (1 - 2b(i + 2))
$$
$$
[8 - (1 - 2b(i + 4))[4 - (1 - 2b(i + 6))[2 - (1 - 2b(i + 8))]]]] +
$$
$$
j(1 - 2b(i + 1))[16 - (1 - 2b(i + 3))[8 - (1 - 2b(i + 5))
$$
$$
[4 - (1 - 2b(i + 7))[2 - (1 - 2b(i + 9))]]]]\}.
$$

The scheme provided by the embodiments of the present disclosure is designed for bit interleaving and modulation mapping based on the Regular Amplitude Phase Shift Keying (RAPSK) constellation. The RAPSK constellation is closely related to the Gray mapped Amplitude Phase Shift Keying (Gray-APSK) constellation. The Gray-APSK constellation includes the following features:

1) All constellation points are located on Na (Na>1) concentric circles and $Na=2^{ma}$, where ma is the number of bits for amplitude mapping and is a positive integer.

2) The concentric circle labeled i has a radius of $r_i$, which is expressed as:

$$r_i = \sqrt{-\ln\left[1 - \frac{i+0.5}{Na}\right]},$$

i=0, 1, 2 . . . , Na−1; and $r_0$ is the minimum radius.

3) The constellation points on the same circle are evenly spaced, meaning that the phase difference between adjacent constellation points is constant; the number of constellation points on each circle is the same and is a power of 2, that is, $n_0=n_1=\cdots=n_{Na-1}=Np=2^{mp}$; Np denotes the number of points per ring, or the number of phases on each concentric circle; and mp denotes the number of bits for phase mapping and is a positive integer.

4) Constellation points on all the circles have a common phase offset, that is, $\theta_0=\theta_1=\ldots=\theta_{Na-1}=\theta^*$, where $\theta^*$ is an arbitrary constant real number.

5) There is a one-to-one mapping between the $2^{Qm}$ constellation points of Gray-APSK and the Qm-tuplets of bits, which is referred to as the modulation mapping of Gray-APSK, where Qm=ma+mp.

The modulation mapping of Gray-APSK adheres to the Gray mapping principles:

a) the modulation mapping of any two adjacent constellation points on the same circle differs by 1 bit, i.e., the Hamming distance is 1; and b) the modulation mapping of any two adjacent constellation points with the same phase differs by 1 bit, i.e., the Hamming distance is 1.

An embodiment of the present disclosure provides a mobile communication network (including but not limited to the 5G), the network architecture of which may include a terminal device and an access network device. The terminal device is connected to the access network device in a wireless way, and the terminal device can be either stationary or mobile. In an embodiment of the present disclosure, there is provided a data transmission method, a communication node, and a computer-readable storage medium, which are operable on the aforementioned mobile communication network. Compared to the current 5G technology, the present disclosure combines RAPSK constellation with Gray mapping to achieve Gray mapped RAPSK. By designing the constellation point coordinates, the mapping from bits to constellation points (also known as modulation mapping), and bit interleaving, it enables a reduction in the required receiver signal-to-noise ratio for achieving the same block error rate under the same transmission spectral efficiency conditions, compared to QAM constellation signaling. Furthermore, as the modulation order increases, the reduction in required receiver signal-to-noise ratio becomes more significant. Furthermore, the constellations involved in the present disclosure utilize a low-complexity max-log demodulation algorithm that is well-suited for high-speed transmission in future cellular communications.

The access network device is the device through which the terminal device connects wirelessly to the mobile communication system. The access network device may be a base station (base station), an evolved NodeB (eNodeB), a transmission reception point (TRP), a next generation NodeB (gNB) in a 5G mobile communication system, a base station in a future mobile communication system, or an access node in a WiFi system, etc.; and may also be a module or unit that performs part of the functions of the base station, for example, it may be a central unit (CU) or a distributed unit (DU). The embodiments of the present disclosure do not limit the specific technology and the specific form adopted by the access network device. In the present disclosure, the access network device may be referred to as network device for short, and unless otherwise specified, the network device refers to the access network device.

The terminal device may also be referred to as a terminal, a user equipment (UE), a mobile station, a mobile terminal, etc. The terminal device may be a mobile phone, a tablet computer, a computer with wireless transceiver function, a virtual reality terminal device, an augmented reality terminal device, a wireless terminal in industrial control, a wireless terminal in unmanned driving, a wireless terminal in remote operation, a wireless terminal in smart grid, a wireless terminal in transportation safety, a wireless terminal in smart city, a wireless terminal in smart home, etc. The embodiments of the present disclosure do not limit the specific technology and the specific form adopted by the terminal device.

Hereinafter, the data transmission method, communication node and the technical effects thereof are described.

FIG. 1 shows a schematic flowchart of a data transmission method according to an embodiment. As shown in FIG. 1, the method provided by this embodiment is applicable to a first communication node (such as a base station or a UE) and includes the following steps.

At S110, a first bit sequence $f_0, f_1, f_2, \ldots, f_{E-1}$ is acquired.

In an embodiment, the first bit sequence $f_0, f_1, f_2, \ldots, f_{E-1}$ is obtained by the first communication node after performing at least one of the following operations on a transport block: channel coding, rate matching, bit interleaving, code block concatenation, or scrambling.

In an embodiment, the step of "acquiring a first bit sequence $f_0, f_1, f_2, \ldots, f_{E-1}$" in step S110 may include the following two steps.

At step a1, a second bit sequence $e_0, e_1, e_2, \ldots, e_{E-1}$ is acquired from a transport block.

At step a2, the second bit sequence $e_0, e_1, e_2, \ldots, e_{E-1}$ is subjected to bit interleaving to obtain the first bit sequence $f_0, f_1, f_2, \ldots, f_{E-1}$.

The first K bits of the second bit sequence $e_0, e_1, e_2, \ldots, e_{E-1}$ are input bits of channel coding, where 0<K<E.

At S120, every Qm bits in the first bit sequence $f_0, f_1, f_2, \ldots, f_{E-1}$ are mapped to one complex-valued modulation symbol based on a regular amplitude phase shift keying (RAPSK) constellation to obtain a symbol sequence $x_0, x_1, x_2, \ldots, x_{E/Qm-1}$, where E denotes a length of the first bit sequence and is a positive integer, Qm denotes a modulation order of RAPSK modulation, and the RAPSK constellation has $2^{Qm}$ constellation points.

Step S120 may also be referred to as a process of RAPSK modulation of the first bit sequence $f_0, f_1, f_2, \ldots, f_{E-1}$.

In an embodiment, the RAPSK constellation includes at least one of the following features:

all the constellation points in the RAPSK constellation are located on $Na=2^{ma}$ concentric circles, where ma denotes a number of amplitude mapping bits, and ma=Qm/2-1;

all the constellation points in the RAPSK constellation are located on $Na=2^{ma}$ concentric circles, and there are $Np=2^{mp}$ constellation points on each concentric circle, where ma denotes a number of amplitude mapping bits, mp denotes a number of phase mapping bits, and mp=Qm−ma;

there are $Np=2^{mp}$ constellation points on each concentric circle of the RAPSK constellation, where mp denotes a number of phase mapping bits, and $mp=Qm/2+1$;

all the constellation points in the RAPSK constellation are located on $Na=2^{ma}$ concentric circles, and a concentric circle labeled i has a radius of $r_i=r_0+i\cdot D$, where $i=0, 1, \ldots, Na-1$, ma denotes a number of amplitude mapping bits, $r_0$ denotes a minimum radius, D denotes an interval between adjacent concentric circles, and $r_0$ has a value range which is a function of Qm; or all the constellation points in the RAPSK constellation are located on $Na=2^{ma}$ concentric circles, and a concentric circle labeled i has a radius of $r_i=r_0+i\cdot D$, where $i=0, 1, \ldots, Na-1$, ma denotes a number of amplitude mapping bits, $r_0$ denotes a minimum radius, D denotes an interval between adjacent concentric circles, and D has a value range which is a function of Qm.

In a possible implementation, every Qm bits $[f_{k\cdot Qm}, f_{1+k\cdot Qm}, f_{2+k\cdot Qm}, \ldots f_{Qm-1+k\cdot Qm}]=[b_0, b_1, \ldots, b_{Qm-1}]$ in the first bit sequence $f_0, f_1, f_2, \ldots, f_{E-1}$ are mapped to one complex-valued modulation symbol $x_k=x$, where $k=0, 1, \ldots, E/Qm-1$.

The mp phase mapping bits $c_{1,0}, c_{1,1}, \ldots, c_{1,mp-1}$ are determined in any one of the following manners:

the phase mapping bits $c_{1,0}, c_{1,1}, \ldots, c_{1,mp-1}$ are the first mp bits of the Qm bits $b_0, b_1, \ldots, b_{Qm-1}$;

the phase mapping bits $c_{1,0}, c_{1,1}, \ldots, c_{1,mp-1}$ are the first mp bits of the Qm bits $b_0, b_1, \ldots, b_{Qm-1}$ with positions of the bits $b_0$ and $b_1$ exchanged;

the phase mapping bits $c_{1,0}, c_{1,1}, \ldots, c_{1,mp-1}$ are the last mp bits of the Qm bits $b_0, b_1, \ldots, b_{Qm-1}$; or the phase mapping bits $c_{1,0}, c_{1,1}, \ldots, c_{1,mp-1}$ are the first 2 bits and the odd-indexed bits in the last Qm-2 bits of the Qm bits $b_0, b_1, \ldots, b_{Qm-1}$.

the amplitude mapping bits $c_{2,0}, c_{2,1}, \ldots, c_{2,ma-1}$ are determined in any one of the following manners:

the amplitude mapping bits $c_{2,0}, c_{2,1}, \ldots, c_{2,ma-1}$ are the last ma bits of the Qm bits $b_0, b_1, \ldots, b_{Qm-1}$;

the amplitude mapping bits $c_{2,0}, c_{2,1}, \ldots, c_{2,ma-1}$ are the first ma bits of the Qm bits $b_0, b_1, \ldots, b_{Qm-1}$; or the amplitude mapping bits $c_{2,0}, c_{2,1}, \ldots, c_{2,ma-1}$ are the even-indexed bits in the last Qm-2 bits of the Qm bits $b_0, b_1, \ldots, b_{Qm-1}$.

In another possible implementation, every Qm bits $[f_{k\cdot Qm}, f_{1+k\cdot Qm}, f_{2+k\cdot Qm}, \ldots, f_{Qm-1+k\cdot Qm}]=[b_0, b_1, \ldots, b_{Qm-1}]$ in the first bit sequence $f_0, f_1, f_2, \ldots, f_{E-1}$ are mapped to one complex-valued modulation symbol $x_k=x$, where $k=0, 1, \ldots, E/Qm-1$.

The Qm bits of one complex-valued modulation symbol x include a first segment of bits, a second segment of bits, and a third segment of bits; and the first segment of bits includes two sign mapping bits $d_{1,0}$ and $d_{1,1}$, the second segment of bits includes mp-2 bits $d_{2,0}, d_{2,1}, \ldots, d_{2,mp-3}$, and the third segment of bits include $ma=Qm-mp$ bits $d_{3,0}, d_{3,1}, \ldots, d_{3,ma-1}$, where $2<mp<Qm$.

The first segment of bits $d_{1,0}$ and $d_{1,1}$ are determined in any one of the following manners:

the first segment of bits $d_{1,0}$ and $d_{1,1}$ are the first 2 bits of the Qm bits $b_0, b_1, \ldots, b_{Qm-1}$;

the first segment of bits $d_{1,0}$ and $d_{1,1}$ are the first 2 bits of the Qm bits $b_0, b_1, \ldots, b_{Qm-1}$ with positions of the bits $b_0$ and $b_1$ exchanged; or the first segment of bits $d_{1,0}$ and $d_{1,1}$ are the two bits with indexes ma and ma+1 in the Qm bits $b_0, b_1, \ldots, b_{Qm-1}$.

The second segment of bits $d_{2,0}, d_{2,1}, \ldots, d_{2,mp-3}$ are determined in any one of the following manners:

the second segment of bits $d_{2,0}, d_{2,1}, \ldots, d_{2,mp-3}$ are the bits with indexes from 2 to mp-1 in the Qm bits $b_0, b_1, \ldots, b_{Qm-1}$;

the second segment of bits $d_{2,0}, d_{2,1}, \ldots, d_{2,mp-3}$ are the last mp-2 bits of the Qm bits $b_0, b_1, \ldots, b_{Qm-1}$; or the second segment of bits $d_{2,0}, d_{2,1}, \ldots, d_{2,mp-3}$ are the odd-indexed bits in the last Qm-2 bits of the Qm bits $b_0, b_1, \ldots, b_{Qm-1}$.

The third segment of bits $d_{3,0}, d_{3,1}, \ldots, d_{3,ma-1}$ are determined in any one of the following manners:

the third segment of bits $d_{3,0}, d_{3,1}, \ldots, d_{3,ma-1}$ are the last ma bits of the Qm bits $b_0, b_1, \ldots, b_{Qm-1}$;

the third segment of bits $d_{3,0}, d_{3,1}, \ldots, d_{3,ma-1}$ are the first ma bits of the Qm bits $b_0, b_1, \ldots, b_{Qm-1}$; or the third segment of bits $d_{3,0}, d_{3,1}, \ldots, d_{3,ma-1}$ are the even-indexed bits in the last Qm-2 bits of the Qm bits $b_0, b_1, \ldots, b_{Qm-1}$.

In an embodiment, in a case where mp or ma is greater than 1, mp phase mapping bits $c_{1,0}, c_{1,1}, \ldots, c_{1,mp-1}$ and ma amplitude mapping bits $c_{2,0}, c_{2,1}, \ldots, c_{2,ma-1}$ use the same Gray mapping scheme.

In an embodiment, in a case where mp-2 or ma is greater than 1, mp-2 bits $d_{2,0}, d_{2,1}, \ldots, d_{2,mp-3}$ and ma bits $d_{3,0}, d_{3,1}, \ldots, d_{3,ma-1}$ use the same Gray mapping scheme.

At S130, the symbol sequence $x_0, x_1, x_2, \ldots, x_{E/Qm-1}$ is transmitted to a second communication node.

FIG. 2 shows a schematic flowchart of another data transmission method according to an embodiment. As shown in FIG. 2, the method provided by this embodiment is applicable to a second communication node (such as a UE or a base station) and includes the following steps.

At S210, a symbol sequence $x_0, x_1, x_2, \ldots, x_{E/Qm-1}$ transmitted by a first communication node is received, the symbol sequence $x_0, x_1, x_2, \ldots, x_{E/Qm-1}$ being obtained by the first communication node mapping every Qm bits in a first bit sequence $f_0, f_1, f_2, \ldots, f_{E-1}$ to one complex-valued modulation symbol based on a regular amplitude phase shift keying (RAPSK) constellation, where E denotes a length of the first bit sequence and is a positive integer, Qm denotes a modulation order of RAPSK modulation, and the RAPSK constellation has $2^{Qm}$ constellation points.

In an embodiment, after the second communication node receives the symbol sequence $x_0, x_1, x_2, \ldots, x_{E/Qm-1}$, the second communication node may also perform RAPSK demodulation on the symbol sequence $x_0, x_1, x_2, \ldots, x_{E/Qm-1}$ to obtain an estimate of the first bit sequence $f_0, f_1, f_2, \ldots, f_{E-1}$.

In an embodiment, the first bit sequence $f_0, f_1, f_2, \ldots, f_{E-1}$ is obtained by the first communication node after performing at least one of the following operations on a transport block: channel coding, rate matching, bit interleaving, code block concatenation, or scrambling.

In an embodiment, the RAPSK constellation includes at least one of the following features:

all the constellation points in the RAPSK constellation are located on $Na=2^{ma}$ concentric circles, where ma denotes a number of amplitude mapping bits, and $ma=Qm/2-1$;

all the constellation points in the RAPSK constellation are located on $Na=2^{ma}$ concentric circles, and there are $Np=2^{mp}$ constellation points on each concentric circle, where ma denotes a number of amplitude mapping bits, mp denotes a number of phase mapping bits, and $mp=Qm-ma$;

there are $Np=2^{mp}$ constellation points on each concentric circle of the RAPSK constellation, where mp denotes a number of phase mapping bits, and $mp=Qm/2+1$;

all the constellation points in the RAPSK constellation are located on $Na=2^{ma}$ concentric circles, and a concentric circle labeled i has a radius of $r_i=r_0+i\cdot D$, where i=0, 1, . . . , Na−1, ma denotes a number of amplitude mapping bits, $r_0$ denotes a minimum radius, D denotes an interval between adjacent concentric circles, and $r_0$ has a value range which is a function of Qm; or all the constellation points in the RAPSK constellation are located on $Na=2^{ma}$ concentric circles, and a concentric circle labeled i has a radius of $r_i=r_0+i\cdot D$, where i=0, 1, . . . , Na−1, ma denotes a number of amplitude mapping bits, $r_0$ denotes a minimum radius, D denotes an interval between adjacent concentric circles, and D has a value range which is a function of Qm.

In a possible implementation, every Qm bits [f Qm, $f_1+k\cdot Qm$, $f_2+k\cdot Qm$, . . . $f_{Qm-1+k\cdot Qm}]=[b_0, b_1, \ldots, b_{Qm-1}]$ in the first bit sequence $f_0, f_1, f_2, \ldots, f_{E-1}$ are mapped to one complex-valued modulation symbol $x_k=x$, where k=0, 1, . . . , E/Qm−1.

The mp phase mapping bits $c_{1,0}, c_{1,1}, \ldots, c_{1,mp-1}$ are determined in any one of the following manners:

the phase mapping bits $c_{1,0}, c_{1,1}, \ldots, c_{1,mp-1}$ are the first mp bits of the Qm bits $b_0, b_1, \ldots, b_{Qm-1}$;

the phase mapping bits $c_{1,0}, c_{1,1}, \ldots, c_{1,mp-1}$ are the first mp bits of the Qm bits $b_0, b_1, \ldots, b_{Qm-1}$ with positions of the bits $b_0$ and $b_1$ exchanged;

the phase mapping bits $c_{1,0}, c_{1,1}, \ldots, c_{1,mp-1}$ are the last mp bits of the Qm bits $b_0, b_1, \ldots, b_{Qm-1}$; or the phase mapping bits $c_{1,0}, c_{1,1}, \ldots, c_{1,mp-1}$ are the first 2 bits and the odd-indexed bits in the last Qm−2 bits of the Qm bits $b_0, b_1, \ldots, b_{Qm-1}$.

The ma amplitude mapping bits $c_{2,0}, c_{2,1}, \ldots, c_{2,ma-1}$ are determined in any one of the following manners:

the amplitude mapping bits $c_{2,0}, c_{2,1}, \ldots, c_{2,ma-1}$ are the last ma bits of the Qm bits $b_0, b_1, \ldots, b_{Qm-1}$;

the amplitude mapping bits $c_{2,0}, c_{2,1}, \ldots, c_{2,ma-1}$ are the first ma bits of the Qm bits $b_0, b_1, \ldots, b_{Qm-1}$; or the amplitude mapping bits $c_{2,0}, c_{2,1}, \ldots, c_{2,ma-1}$ are the even-indexed bits in the last Qm−2 bits of the Qm bits $b_0, b_1, \ldots, b_{Qm-1}$.

In another possible implementation, every Qm bits $[f_{k\cdot Qm}, f_{1+k\cdot Qm}, f_{2+k\cdot Qm}, \ldots, f_{Qm-1+k\cdot Qm}]=[b_0, b_1, \ldots, b_{Qm-1}]$ in the first bit sequence $f_0, f_1, f_2, \ldots, f_{E-1}$ are mapped to one complex-valued modulation symbol $x_k=x$, where k=0, 1, . . . , E/Qm−1.

The Qm bits of one complex-valued modulation symbol x include a first segment of bits, a second segment of bits, and a third segment of bits; and the first segment of bits includes two sign mapping bits $d_{1,0}$ and $d_{1,1}$, the second segment of bits includes mp−2 bits $d_{2,0}, d_{2,1}, \ldots, d_{2,mp-3}$, and the third segment of bits include ma=Qm−mp bits $d_{3,0}$, $d_{3,1}, \ldots, d_{3,ma-1}$, where 2<mp<Qm.

The first segment of bits $d_{1,0}$ and $d_{1,1}$ are determined in any one of the following manners:

the first segment of bits $d_{1,0}$ and $d_{1,1}$ are the first 2 bits of the Qm bits $b_0, b_1, \ldots, b_{Qm-1}$;

the first segment of bits $d_{1,0}$ and $d_{1,1}$ are the first 2 bits of the Qm bits $b_0, b_1, \ldots, b_{Qm-1}$ with positions of the bits $b_0$ and $b_1$ exchanged; or the first segment of bits $d_{1,0}$ and $d_{1,1}$ are the two bits with indexes ma and ma+1 in the Qm bits $b_0, b_1, \ldots, b_{Qm-1}$.

The second segment of bits $d_{2,0}, d_{2,1}, \ldots, d_{2,mp-3}$ are determined in any one of the following manners:

the second segment of bits $d_{2,0}, d_{2,1}, \ldots, d_{2,mp-3}$ are the bits with indexes from 2 to mp−1 in the Qm bits $b_0$, $b_1, \ldots, b_{Qm-1}$;

the second segment of bits $d_{2,0}, d_{2,1}, \ldots, d_{2,mp-3}$ are the last mp−2 bits of the Qm bits $b_0, b_1, \ldots, b_{Qm-1}$; or the second segment of bits $d_{2,0}, d_{2,1}, \ldots, d_{2,mp-3}$ are the odd-indexed bits in the last Qm−2 bits of the Qm bits $b_0, b_1, \ldots, b_{Qm-1}$.

The third segment of bits $d_{3,0}, d_{3,1}, \ldots, d_{3,ma-1}$ are determined in any one of the following manners:

the third segment of bits $d_{3,0}, d_{3,1}, \ldots, d_{3,ma-1}$ are the last ma bits of the Qm bits $b_0, b_1, \ldots, b_{Qm-1}$;

the third segment of bits $d_{3,0}, d_{3,1}, \ldots, d_{3,ma-1}$ are the first ma bits of the Qm bits $b_0, b_1, \ldots, b_{Qm-1}$; or the third segment of bits $d_{3,0}, d_{3,1}, \ldots, d_{3,ma-1}$ are the even-indexed bits in the last Qm−2 bits of the Qm bits $b_0, b_1, \ldots, b_{Qm-1}$.

In an embodiment, in a case where mp or ma is greater than 1, mp phase mapping bits $c_{1,0}, c_{1,1}, \ldots, c_{1,mp-1}$ and ma amplitude mapping bits $c_{2,0}, c_{2,1}, \ldots, c_{2,ma-1}$ use the same Gray mapping scheme.

In an embodiment, in a case where mp−2 or ma is greater than 1, mp−2 bits $d_{2,0}, d_{2,1}, \ldots, d_{2,mp-3}$ and ma bits $d_{3,0}$, $d_{3,1}, \ldots, d_{3,ma-1}$ use the same Gray mapping scheme.

In the present disclosure, by designing the RAPSK constellation (for example, designing constellation point coordinates, etc.), every Qm bits in the first bit sequence $f_0, f_1, f_2, \ldots, f_{E-1}$ are mapped to one complex-valued modulation symbol in the bits-to-constellation points mapping process based on the new RAPSK constellation to obtain the symbol sequence $x_0, x_1, x_2, \ldots, x_{E/Qm-1}$, thereby enabling a reduction in the required receiver signal-to-noise ratio for achieving the same block error rate under the same transmission spectral efficiency conditions, compared to QAM constellation signaling. Furthermore, as the modulation order increases, the reduction in required receiver signal-to-noise ratio becomes more significant.

Some exemplary implementations are listed below for explaining the data transmission methods provided in FIGS. 1 and 2. The exemplary implementations described below may be executed separately or in combination.

In a first exemplary implementation, the RAPSK modulation involved in FIGS. 1 and 2 is further explained. For convenience of description, when performing RAPSK modulation, every Qm bits $[f_{k\cdot Qm}, f_{1+k\cdot Qm}, f_{2+k\cdot Qm}, \ldots f_{Qm-1+k\cdot Qm}]$ in the first bit sequence $f_0, f_1, f_2, \ldots f_{E-1}$ can be denoted as $[b_0, b_1, \ldots, b_{Qm-1}]$ (i.e. $[f_{k\cdot Qm}, f_{1+k\cdot Qm}, f_{2+k\cdot Qm}, \ldots, f_{Qm-1+k\cdot Qm}]=[b_0, b_1, \ldots, b_{Qm-1}]$), and the resulted complex-valued modulation symbol $x_k$ is denoted as x (i.e. $x_k=x$).

The RAPSK constellation includes at least one of the following features:

Feature 1. All the constellation points in the RAPSK constellation are located on $Na=2^{ma}$ concentric circles, and a concentric circle labeled i has a radius of $r_1=r_0+i\cdot D$, where i=0, 1, . . . , Na−1, ma denotes a number of amplitude mapping bits, $r_0$ denotes a minimum radius (i.e. the radius of the 0th circle), D denotes an interval between adjacent concentric circles, and both $r_0$ and D are real numbers in the interval [0, 1].

Feature 2. There are $Np=2^{mp}$ constellation points on each concentric circle of the RAPSK constellation, and the constellation points located on the same circle are distributed in an equidistant manner, that is, the phase difference between adjacent constellation points is $$\frac{2\pi}{Np} = \frac{\pi}{2^{mp-1}},$$

where Np is the number of phases in RAPSK modulation, mp is the number of phase mapping bits, and mp is a function of Qm and ma.

Feature 3. Constellation points on all concentric circles of the RAPSK constellation have a common phase offset $\theta^*$, where $\theta^*$ is a real number; that is, the phase of constellation points in RAPSK modulation is always taken from the set $$\left\{ \frac{2\pi}{Np} \cdot k + \theta^* \,\middle|\, k = 0,1,2, \ldots, Np-2, Np-1 \right\}.$$

Feature 4. The coordinate value of the complex-valued modulation symbol after RAPSK modulation is a function of at least one of the following parameters:

the minimum radius $r_0$, the interval between adjacent concentric circles D, the modulation order Qm, the number of amplitude mapping bits ma, the number of phase mapping bits mp, the number of concentric circles of RAPSK modulation Na, the number of phases of RAPSK modulation Np, the phase offset $\theta^*$, and the Qm-tuplets of bits $b_0$, $b_1$, . . . , $b_{Qm-1}$.

Feature 5. The complex-valued modulation symbols after RAPSK modulation are within the following set of complex numbers:

$$\left\{ (r_0 + i \cdot D) \cdot \exp\left( j \cdot \left( \frac{2\pi}{Np} \cdot k + \theta^* \right) \right) \,\middle|\, i = 0,1, \ldots, \right.$$
$$\left. Na-1; k = 0,1, \ldots, Np-1 \right\};$$

Where $j = \sqrt{-1}$ is the imaginary unit; i is the amplitude index, which is a function of ma amplitude mapping bits in the Qm-tuplet of bits $b_0$, $b_1$, . . . , $b_{Qm-1}$; and k is the phase index, which is a function of mp phase mapping bits in the Qm-tuplet of bits $b_0$, $b_1$, . . . , $b_{Qm-1}$.

In an embodiment, the set of complex numbers may also be expressed as:

$$\left\{ (r_0 + i \cdot D) \cdot \left[ \cos\left( \frac{2\pi}{Np} \cdot k + \theta^* \right) + j \cdot \right. \right.$$
$$\left. \left. \sin\left( \frac{2\pi}{Np} \cdot k + \theta^* \right) \right] \,\middle|\, i = 0,1, \ldots, Na-1; k = 0,1, \ldots, Np-1 \right\};$$

where $j = \sqrt{-1}$ is the imaginary unit; i is the amplitude index, which is a function of ma amplitude mapping bits in the Qm-tuplet of bits $b_0$, $b_1$, . . . , $b_{Qm-1}$; and k is the phase index, which is a function of mp phase mapping bits in the Qm-tuplet of bits $b_0$, $b_1$, . . . , $b_{Qm-1}$.

Feature 6. RAPSK modulation involves a one-to-one mapping from Qm bits to $2^{Qm}$ complex-valued modulation symbols, referred to as the modulation mapping of RAPSK modulation. In an embodiment of the present disclosure, the modulation mapping of RAPSK modulation is Gray mapping, where ma bits, referred to as amplitude mapping bits, out of the Qm bits are used to determine the radius of the concentric circles for the constellation points (that is, the amplitude of constellation points); and the other mp bits, referred to as phase mapping bits, out of the Qm bits are used to determine the phase of the constellation points.

Feature 7. The number of amplitude mapping bits ma is a function of the modulation order Qm.

In an embodiment, ma=Qm/2-1.

For example, when the modulation order Qm=4, the number of amplitude mapping bits ma=1;

when the modulation order Qm=6, the number of amplitude mapping bits ma=2;

when the modulation order Qm=8, the number of amplitude mapping bits ma=3; and when the modulation order Qm=10, the number of amplitude mapping bits ma=4.

Feature 8. The number of phase mapping bits mp is a function of the modulation order Qm and the number of amplitude mapping bits ma.

In an embodiment, mp=Qm−ma.

Feature 9. The number of phase mapping bits mp is a function of the modulation order Qm.

In an embodiment, mp=Qm/2+1.

For example, when the modulation order Qm=4, the number of phase mapping bits mp=3;

when the modulation order Qm=6, the number of phase mapping bits mp=4;

when the modulation order Qm=8, the number of phase mapping bits mp=5; and when the modulation order Qm=10, the number of phase mapping bits mp=6.

Feature 10. The interval between adjacent concentric circles D is a function of the minimum radius $r_0$ and the number of concentric circles of RAPSK modulation Na.

$$D = \frac{3r_0}{(2Na-1)} \cdot \left( \sqrt{1 + \frac{2(1 - r_0^2)(2 \cdot Na - 1)}{3r_0^2(Na-1)}} - 1 \right).$$

In an embodiment,

Feature 11. The range of values for the minimum radius $r_0$ is a function of the modulation order Qm.

For example, when Qm=4, $0.5 \leq r_0 \leq 0.7$;

when Qm=6, $0.3 \leq r_0 \leq 0.5$;

when Qm=8, $0.2 \leq r_0 \leq 0.4$; and when Qm=10, $0.1 \leq r_0 \leq 0.3$.

Feature 12. The range of values for the interval between adjacent concentric circles D is a function of the modulation order Qm.

For example, when Qm=4, $0.52 \leq D \leq 0.83$;

when Qm=6, $0.29 \leq D \leq 0.40$;

when Qm=8, $0.15 \leq D \leq 0.20$; and when Qm=10, $0.08 \leq D \leq 0.11$.

In a second exemplary implementation, there is provided a mapping bit determination method for RAPSK modulation.

The mp phase mapping bits $c_{1,0}, c_{1,1}, \ldots, c_{1,mp-1}$ may be determined in any one of the following manners:

Manner A1. The phase mapping bits $c_{1,0}, c_{1,1}, \ldots, c_{1,mp-1}$ are the first mp bits of the Qm bits $b_0$, $b_1$, . . . , $b_{Qm-1}$.

That is, $[c_{1,0}, c_{1,1}, \ldots, c_{1,mp-1}] = [b_0, b_1, \ldots, b_{mp-1}]$.

Manner A2. The phase mapping bits $c_{1,0}, c_{1,1}, \ldots, c_{1,mp-1}$ are the first mp bits of the Qm bits $b_0$, $b_1$, . . . , $b_{Qm-1}$ with positions of the bits $b_0$ and $b_1$ exchanged.

That is, $[c_{1,0}, c_{1,1}, \ldots, c_{1,mp-1}] = [b_1, b_0, b_2, b_3, \ldots, b_{mp-1}]$.

Manner A3. The phase mapping bits $c_{1,0}, c_{1,1}, \ldots, c_{1,mp-1}$ are the last mp bits of the Qm bits $b_0$, $b_1$, . . . , $b_{Qm-1}$.

That is, $[c_{1,0}, c_{1,1}, \ldots, c_{1,mp-1}] = [b_{Qm-mp}, b_{Qm-mp+1}, \ldots, b_{Qm-1}]$.

Manner A4. The phase mapping bits $c_{1,0}, c_{1,1}, \ldots, c_{1,mp-1}$ are the first 2 bits and the odd-indexed bits in the last Qm−2 bits of the Qm bits $b_0, b_1, \ldots, b_{Qm-1}$.

That is, $$c_{1,t} = \begin{cases} b_t, & 0 \le t \le 1 \\ b_{2t-1}, & 2 \le t \le mp-1 \end{cases}.$$

The ma amplitude mapping bits $c_{2,0}, c_{2,1}, \ldots, c_{2,ma-1}$ may be determined in any one of the following manners:

Manner B1. The amplitude mapping bits $c_{2,0}, c_{2,1}, \ldots, c_{2,ma-1}$ are the last ma bits of the Qm bits $b_0, b_1, \ldots, b_{Qm-1}$.

That is, $[c_{2,0}, c_{2,1}, \ldots, c_{2,ma-1}]=[b_{Qm-ma}, b_{Qm-ma+1}, \ldots, b_{Qm-1}]$.

Manner B2. The amplitude mapping bits $c_{2,0}, c_{2,1}, \ldots, c_{2,ma-1}$ are the first ma bits of the Qm bits $b_0, b_1, \ldots, b_{Qm-1}$.

That is, $[c_{2,0}, c_{2,1}, \ldots, c_{2,ma-1}]=[b_0, b_1, \ldots, b_{ma-1}]$.

Manner B3. The amplitude mapping bits $c_{2,0}, c_{2,1}, \ldots, c_{2,ma-1}$ are the even-indexed bits in the last Qm−2 bits of the Qm bits $b_0, b_1, \ldots, b_{Qm-1}$.

That is, $c_{2,t}=b_{2t+2}$, $0 \le t \le ma-1$.

In this implementation, the phase mapping bits $c_{1,0}, c_{1,1}, \ldots, c_{1,mp-1}$ are Gray mapped to obtain the phase, which may be, for example, the phase index k; and the amplitude mapping bits $c_{2,0}, c_{2,1}, \ldots, c_{2,ma-1}$ are Gray mapped to obtain the amplitude, which may be, for example, the amplitude index i.

The complex-valued modulation symbol x obtained after the RAPSK modulation is:

$$x = (r_0 + i \cdot D) \cdot \exp\!\left(j \cdot \left(\frac{2\pi}{Np} \cdot k + \theta\right)\right),$$

where $j=\sqrt{-1}$ is the imaginary unit.

In a third exemplary implementation, there is provided another mapping bit determination method for RAPSK modulation.

Different from the mapping bit determination method for RAPSK modulation described above, the Qm bits of a complex-valued modulation symbol x also include two sign mapping bits (denoted as $d_{1,0}$ and $d_{1,1}$).

Specifically, the sign mapping bit $d_{1,0}$ can be used to determine the sign of the real part of a constellation point in one of the following manners:

Manner C1. When the sign mapping bit $d_{1,0}=0$, the real part is positive; and when the sign mapping bit $d_{1,0}=1$, the real part is negative.

Manner C2. When the sign mapping bit $d_{1,0}=1$, the real part is positive; and when the sign mapping bit $d_{1,0}=0$, the real part is negative.

The sign mapping bit $d_{1,1}$ can be used to determine the sign of the imaginary part of a constellation point in one of the following manners:

Manner D1. When the sign mapping bit $d_{1,1}=0$, the imaginary part is positive; and when the sign mapping bit $d_{1,1}=1$, the imaginary part is negative.

Manner D2. When the sign mapping bit $d_{1,1}=1$, the imaginary part is positive; and when the sign mapping bit $d_{1,1}=0$, the imaginary part is negative.

In an embodiment, the sign mapping bit $d_{1,0}$ is the input bit of channel coding.

In an embodiment, the sign mapping bit $d_{1,1}$ is the input bit of channel coding.

In this implementation, the Qm bits of one complex-valued modulation symbol x include a first segment of bits, a second segment of bits, and a third segment of bits; and the first segment of bits includes two sign mapping bits (denoted as $d_{1,0}$ and $d_{1,1}$), the second segment of bits includes mp−2 bits (denoted as $d_{2,0}, d_{2,1}, \ldots, d_{2,mp-3}$) of the remaining Qm−2 bits, and the third segment of bits are ma=Qm−mp bits (denoted as $d_{3,0}, d_{3,1}, \ldots, d_{3,ma-1}$) excluding the first segment of bits and the second segment of bits, where $2 \le mp < Qm$.

The first segment of bits $d_{1,0}$ and $d_{1,1}$ are determined in any one of the following manners:

Manner E1. The first segment of bits $d_{1,0}$ and $d_{1,1}$ are the first 2 bits of the Qm bits $b_0, b_1, \ldots, b_{Qm-1}$.

That is, $[d_{1,0}, d_{1,1}]=[b_0, b_1]$.

Manner E2. The first segment of bits $d_{1,0}$ and $d_{1,1}$ are the first 2 bits of the Qm bits $b_0, b_1, \ldots, b_{Qm-1}$ with positions of the bits $b_0$ and $b_1$ exchanged.

That is, $[d_{1,0}, d_{1,1}]=[b_1, b_0]$.

Manner E3. The first segment of bits $d_{1,0}$ and $d_{1,1}$ are the two bits with indexes ma and ma+1 in the Qm bits $b_0, b_1, \ldots, b_{Qm-1}$.

That is, $[d_{1,0}, d_{1,1}]=[b_{ma}, b_{ma+1}]$.

The second segment of bits $d_{2,0}, d_{2,1}, \ldots, d_{2,mp-3}$ are determined in any one of the following manners:

Manner F1. The second segment of bits $d_{2,0}, d_{2,1}, \ldots, d_{2,mp-3}$ are the bits with indexes from 2 to mp−1 in the Qm bits $b_0, b_1, \ldots, b_{Qm-1}$.

That is, $[d_{2,0}, d_{2,1}, \ldots, d_{2,mp-3}]=[b_2, b_3, \ldots, b_{mp-1}]$.

Manner F2. The second segment of bits $d_{2,0}, d_{2,1}, \ldots, d_{2,mp-3}$ are the last mp−2 bits of the Qm bits $b_0, b_1, \ldots, b_{Qm-1}$.

That is, $[d_{2,0}, d_{2,1}, \ldots, d_{2,mp-3}]=[b_{Qm-mp+2}, b_{Qm-mp+3}, \ldots, b_{Qm-1}]$.

Manner F3. The second segment of bits $d_{2,0}, d_{2,1}, \ldots, d_{2,mp-3}$ are the odd-indexed bits in the last Qm−2 bits of the Qm bits $b_0, b_1, \ldots, b_{Qm-1}$.

That is, $d_{2,t}=b_{2t+3}$, $0 \le t \le mp-3$.

The third segment of bits $d_{3,0}, d_{3,1}, \ldots, d_{3,ma-1}$ are determined in any one of the following manners:

Manner G1. The third segment of bits $d_{3,0}, d_{3,1}, \ldots, d_{3,ma-1}$ are the last ma bits of the Qm bits $b_0, b_1, \ldots, b_{Qm-1}$.

That is, $[d_{3,0}, d_{3,1}, \ldots, d_{3,ma-1}]=[b_{Qm-ma}, b_{Qm-ma+1}, \ldots, b_{Qm-1}]$.

Manner G2. The third segment of bits $d_{3,0}, d_{3,1}, \ldots, d_{3,ma-1}$ are the first ma bits of the Qm bits $b_0, b_1, \ldots, b_{Qm-1}$.

That is, $[d_{3,0}, d_{3,1}, \ldots, d_{3,ma-1}]=[b_0, b_1, \ldots, b_{ma-1}]$.

Manner G3. The third segment of bits $d_{3,0}, d_{3,1}, \ldots, d_{3,ma-1}$ are the even-indexed bits in the last Qm−2 bits of the Qm bits $b_0, b_1, \ldots, b_{Qm-1}$.

That is, $d_{3,t}=b_{2t+2}$, $0 \le t \le ma-1$.

In this implementation, the second segment of bits $d_{2,0}, d_{2,1}, \ldots, d_{2,mp-3}$ are Gray mapped to obtain the phase, which may be, for example, the phase index k; and the third segment of bits $d_{3,0}, d_{3,1}, \ldots, d_{3,ma-1}$ are Gray mapped to obtain the amplitude, which may be, for example, the amplitude index i. The complex-valued modulation symbol x determined by the first segment of bits $d_{1,0}$ and $d_{1,1}$, the phase index k and the amplitude index i may be:

$$x = (r_0 + i \cdot D) \cdot \left[(1 - 2d_{1,0}) \cdot \cos\!\left(\frac{2\pi}{Np} \cdot k + \theta^*\right) + j \cdot (1 - 2d_{1,1}) \cdot \sin\!\left(\frac{2\pi}{Np} \cdot k + \theta^*\right)\right];$$

-continued or $x =$ $$(r_0 + i \cdot D) \cdot \left[ (2d_{1,0} - 1) \cdot \cos\left( \frac{2\pi}{Np} \cdot k + \theta^* \right) + j \cdot (2d_{1,1} - 1) \cdot \sin\left( \frac{2\pi}{Np} \cdot k + \theta^* \right) \right].$$

Here, $j = \sqrt{-1}$ is the imaginary unit, and a possible value of the phase offset is $$\theta^* = \frac{\pi}{Np} = \frac{\pi}{2^{mp}}.$$

In an embodiment, because $Na = 2^{ma}$ and $k$ is obtained through the mapping of $mp-2$ bits, $0 \leq k \leq 2^{mp-2}-1$. Furthermore, because $$\theta^* = \frac{\pi}{Np} = \frac{\pi}{2^{mp}},$$

the angles in cos and sin are:

$$\frac{\pi}{2^{mp}} \leq \frac{\pi}{Np} \cdot k + \theta^* \leq \frac{\pi}{2^{mp}} \cdot \left( 2^{mp-2} - 1 \right) + \frac{\pi}{2^{mp}},$$

within the range of 0 to $\pi/2$, where the $$\frac{\pi}{2^{mp}} \leq \frac{\pi}{Np} \cdot k + \theta^* \leq \frac{\pi}{2} - \frac{\pi}{2^{mp}}$$

values of cos and sin are positive, and the sign of the real and imaginary parts are determined by $d_{1,0}$ and $d_{1,1}$.

In a fourth exemplary implementation, there is provided a RAPSK constellation modulation mapping method. In this implementation, the RAPSK constellation modulation mapping method is described on the basis of the second exemplary implementation described above. In this implementation, in a case where mp or ma is greater than 1, mp phase mapping bits $c_{1,0}$, $c_{1,1}$, . . . . , $c_{1,mp-1}$ and ma amplitude mapping bits $c_{2,0}$, $c_{2,1}$, . . . . , $c_{2,ma-1}$ use the same Gray mapping scheme.

When mp or ma is greater than 1, this implementation exemplarily provides two Gray mapping approaches. It should be noted that other Gray mapping approaches can also be applied to the method described in the present disclosure.

(A) 1-Bit Gray Mapping:

A 1-bit ($g_0$) Gray mapping scheme 1 is shown in column (1) of Table 1, and can be expressed by the formula: $h = g_0$; and a 1-bit ($g_0$) Gray mapping scheme 2 is shown in column (2) of Table 1, and can be expressed by the formula: $h = 1 - g_0$.

TABLE 1

| Two 1-bit Gray mapping schemes | | |
| --- | --- | --- |
|  | (1) | (2) |
| Index h | $g_0$ | $g_0$ |
| 0 | 0 | 1 |
| 1 | 1 | 0 |

(B) 2-Bit Gray Mapping:

A 2-bit ($g_0$, $g_1$) Gray mapping scheme 1 is shown in column (1) of Table 2, and can be expressed by the formula:

$$h = \frac{[4 - (1 - 2g_0)[2 - (2g_1 - 1)]] - 1}{2};$$

and a 2-bit ($g_0$, $g_1$) Gray mapping scheme 2 is shown in column (2) of Table 2, and can be expressed by the formula:

$$h = \frac{[4 - (1 - 2g_0)[2 - (1 - 2g_1)]] - 1}{2}.$$

TABLE 2

| Two 2-bit Gray mapping schemes | | |
| --- | --- | --- |
|  | (1) | (2) |
| Index h | $g_0 g_1$ | $g_0 g_1$ |
| 0 | 00 | 01 |
| 1 | 01 | 00 |
| 2 | 11 | 10 |
| 3 | 10 | 11 |

(C) 3-Bit Gray Mapping:

A 3-bit ($g_0$, $g_1$, $g_2$) Gray mapping scheme 1 is shown in column (1) of Table 3, and can be expressed by the formula:

$$h = \frac{[8 - (1 - 2g_0)[4 - (2g_1 - 1)[2 - (2g_2 - 1)]]] - 1}{2};$$

and a 3-bit ($g_0$, $g_1$, $g_2$) Gray mapping scheme 2 is shown in column (2) of Table 3, and can be expressed by the formula:

$$h = \frac{[8 - (1 - 2g_0)[4 - (1 - 2g_1)[2 - (1 - 2g_2)]]] - 1}{2}.$$

TABLE 3

| Two 3-bit Gray mapping schemes | | |
| --- | --- | --- |
|  | (1) | (2) |
| Index h | $g_0 g_1 g_2$ | $g_0 g_1 g_2$ |
| 0 | 000 | 011 |
| 1 | 001 | 010 |
| 2 | 011 | 000 |
| 3 | 010 | 001 |
| 4 | 110 | 101 |
| 5 | 111 | 100 |
| 6 | 101 | 110 |
| 7 | 100 | 111 |

(D) 4-Bit Gray Mapping:

A 4-bit ($g_0$, $g_1$, $g_2$, $g_3$) Gray mapping scheme 1 is shown in column (1) of Table 4, and can be expressed by the formula:

$$h = \frac{[16 - (1 - 2g_0)[8 - (2g_1 - 1)[4 - (2g_2 - 1)[2 - (2g_3 - 1)]]]] - 1}{2};$$

and a 4-bit $(g_0, g_1, g_2, g_3)$ Gray mapping scheme 2 is shown in column (2) of Table 4, and can be expressed by the formula:

$$h = \frac{[16 - (1 - 2g_0)[8 - (1 - 2g_1)[4 - (1 - 2g_2)[2 - (1 - 2g_3)]]]] - 1}{2}.$$

TABLE 4

| | Two 4-bit Gray mapping schemes | |
| Index h | (1) $g_0g_1g_2g_3$ | (2) $g_0g_1g_2g_3$ |
| --- | --- | --- |
| 0 | 0000 | 0111 |
| 1 | 0001 | 0110 |
| 2 | 0011 | 0100 |
| 3 | 0010 | 0101 |
| 4 | 0110 | 0001 |
| 5 | 0111 | 0000 |
| 6 | 0101 | 0010 |
| 7 | 0100 | 0011 |
| 8 | 1100 | 1011 |
| 9 | 1101 | 1010 |
| 10 | 1111 | 1000 |
| 11 | 1110 | 1001 |
| 12 | 1010 | 1101 |
| 13 | 1011 | 1100 |
| 14 | 1001 | 1110 |
| 15 | 1000 | 1111 |

(E) 5-Bit Gray Mapping:

A 5-bit $(g_0, g_1, g_2, g_3, g_4)$ Gray mapping scheme 1 is shown in column (1) of Table 5, and can be expressed by the formula:

$$h = \frac{[32 - (1 - 2g_0)[16 - (2g_1 - 1)[8 - (2g_2 - 1)[4 - (2g_3 - 1)[2 - (2g_4 - 1)]]]]] - 1}{2};$$

and 5 a 5-bit $(g_0, g_1, g_2, g_3, g_4)$ Gray mapping scheme 2 is shown in column (2) of Table 5, and can be expressed by the formula:

$$h = \frac{[32 - (1 - 2g_0)[16 - (1 - 2g_1)[8 - (1 - 2g_2)[4 - (1 - 2g_3)[2 - (1 - 2g_4)]]]]] - 1}{2}.$$

TABLE 5

| | Two 5-bit Gray mapping schemes | |
| Index h | (1) $g_0g_1g_2g_3g_4$ | (2) $g_0g_1g_2g_3g_4$ |
| --- | --- | --- |
| 0 | 00000 | 01111 |
| 1 | 00001 | 01110 |
| 2 | 00011 | 01100 |
| 3 | 00010 | 01101 |
| 4 | 00110 | 01001 |
| 5 | 00111 | 01000 |
| 6 | 00101 | 01010 |
| 7 | 00100 | 01011 |
| 8 | 01100 | 00011 |
| 9 | 01101 | 00010 |
| 10 | 01111 | 00000 |

TABLE 5-continued

| | Two 5-bit Gray mapping schemes | |
| Index h | (1) $g_0g_1g_2g_3g_4$ | (2) $g_0g_1g_2g_3g_4$ |
| --- | --- | --- |
| 11 | 01110 | 00001 |
| 12 | 01010 | 00101 |
| 13 | 01011 | 00100 |
| 14 | 01001 | 00110 |
| 15 | 01000 | 00111 |
| 16 | 11000 | 10111 |
| 17 | 11001 | 10110 |
| 18 | 11011 | 10100 |
| 19 | 11010 | 10101 |
| 20 | 11110 | 10001 |
| 21 | 11111 | 10000 |
| 22 | 11101 | 10010 |
| 23 | 11100 | 10011 |
| 24 | 10100 | 11011 |
| 25 | 10101 | 11010 |
| 26 | 10111 | 11000 |
| 27 | 10110 | 11001 |
| 28 | 10010 | 11101 |
| 29 | 10011 | 11100 |
| 30 | 10001 | 11110 |
| 31 | 10000 | 11111 |

(F) 6-Bit Gray Mapping:

A 6-bit $(g_0, g_1, g_2, g_3, g_4, g_5)$ Gray mapping scheme 1 is shown in column (1) of Table 6, and can be expressed by the formula:

$$h = \frac{[64 - (1 - 2g_0) \mid 32 - (2g_1 - 1)[16 - (2g_2 - 1)[8 - (2g_3 - 1)[4 - (2g_4 - 1)[2 - (2g_5 - 1)]]]]]] - 1}{2};$$

and a 6-bit $(g_0, g_1, g_2, g_3, g_4, g_5)$ Gray mapping scheme 2 is shown in column (2) of Table 6, and can be expressed by the formula:

$$h = \frac{[64 - (1 - 2g_0) \mid 32 - (1 - 2g_1)[16 - (1 - 2g_2)[8 - (1 - 2g_3)[4 - (1 - 2g_4)[2 - (1 - 2g_5)]]]]]] - 1}{2}.$$

TABLE 6

| | Two 6-bit Gray mapping schemes | |
| Index h | (1) $g_0g_1g_2g_3g_4g_5$ | (2) $g_0g_1g_2g_3g_4g_5$ |
| --- | --- | --- |
| 0 | 000000 | 011111 |
| 1 | 000001 | 011110 |
| 2 | 000011 | 011100 |
| 3 | 000010 | 011101 |
| 4 | 000110 | 011001 |
| 5 | 000111 | 011000 |
| 6 | 000101 | 011010 |
| 7 | 000100 | 011011 |
| 8 | 001100 | 010011 |
| 9 | 001101 | 010010 |
| 10 | 001111 | 010000 |
| 11 | 001110 | 010001 |
| 12 | 001010 | 010101 |
| 13 | 001011 | 010100 |
| 14 | 001001 | 010110 |
| 15 | 001000 | 010111 |
| 16 | 011000 | 000111 |
| 17 | 011001 | 000110 |
| 18 | 011011 | 000100 |

TABLE 6-continued

Two 6-bit Gray mapping schemes

| Index h | (1) $g_0 g_1 g_2 g_3 g_4 g_5$ | (2) $g_0 g_1 g_2 g_3 g_4 g_5$ |
|---|---|---|
| 19 | 011010 | 000101 |
| 20 | 011110 | 000001 |
| 21 | 011111 | 000000 |
| 22 | 011101 | 000010 |
| 23 | 011100 | 000011 |
| 24 | 010100 | 001011 |
| 25 | 010101 | 001010 |
| 26 | 010111 | 001000 |
| 27 | 010110 | 001001 |
| 28 | 010010 | 001101 |
| 29 | 010011 | 001100 |
| 30 | 010001 | 001110 |
| 31 | 010000 | 001111 |
| 32 | 110000 | 101111 |
| 33 | 110001 | 101110 |
| 34 | 110011 | 101100 |
| 35 | 110010 | 101101 |
| 36 | 110110 | 101001 |
| 37 | 110111 | 101000 |
| 38 | 110101 | 101010 |
| 39 | 110100 | 101011 |
| 40 | 111100 | 100011 |
| 41 | 111101 | 100010 |
| 42 | 111111 | 100000 |
| 43 | 111110 | 100001 |
| 44 | 111010 | 100101 |
| 45 | 111011 | 100100 |
| 46 | 111001 | 100110 |
| 47 | 111000 | 100111 |
| 48 | 101000 | 110111 |
| 49 | 101001 | 110110 |
| 50 | 101011 | 110100 |
| 51 | 101010 | 110101 |
| 52 | 101110 | 110001 |
| 53 | 101111 | 110000 |
| 54 | 101101 | 110010 |
| 55 | 101100 | 110011 |
| 56 | 100100 | 111011 |
| 57 | 100101 | 111010 |
| 58 | 100111 | 111000 |
| 59 | 100110 | 111001 |
| 60 | 100010 | 111101 |
| 61 | 100011 | 111100 |
| 62 | 100001 | 111110 |
| 63 | 100000 | 111111 |

It should be noted that the Gray mapping items in column (2) of Table 1 are the bitwise complement of items in column (1) of Table 1; and the Gray mapping items in column (2) of Tables 2 to 6 are derived by applying the rule of "keeping bit $g_0$ unchanged while inverting the remaining bits" based on column (1) in Tables 2 to 6, respectively.

In a first example, the mapping of the mp phase mapping bits is as follows:

when mp=1, the phase index k obtained from mapping the phase mapping bit(s) $c_{1,0}, c_{1,1}, \ldots, c_{1,mp-1}$ is the index h obtained according to the 1-bit Gray mapping scheme 1;

when mp=2, the phase index k obtained from mapping the phase mapping bits $c_{1,0}, c_{1,1}, \ldots, c_{1,mp-1}$ is the index h obtained according to the 2-bit Gray mapping scheme 1;

when mp=3, the phase index k obtained from mapping the phase mapping bits $c_{1,0}, c_{1,1}, \ldots, c_{1,mp-1}$ is the index h obtained according to the 3-bit Gray mapping scheme 1;

when mp=4, the phase index k obtained from mapping the phase mapping bits $c_{1,0}, c_{1,1}, \ldots, c_{1,mp-1}$ is the index h obtained according to the 4-bit Gray mapping scheme 1;

when mp=5, the phase index k obtained from mapping the phase mapping bits $c_{1,0}, c_{1,1}, \ldots, c_{1,mp-1}$ is the index h obtained according to the 5-bit Gray mapping scheme 1; and when mp=6, the phase index k obtained from mapping the phase mapping bits $c_{1,0}, c_{1,1}, \ldots, c_{1,mp-1}$ is the index h obtained according to the 6-bit Gray mapping scheme 1.

In the first example, the mapping of the ma amplitude mapping bits is as follows:

when ma=1, the amplitude index i obtained from mapping the amplitude mapping bit(s) $c_{2,0}, c_{2,1}, \ldots, c_{2,ma-1}$ is the index h obtained according to the 1-bit Gray mapping scheme 1;

when ma=2, the amplitude index i obtained from mapping the amplitude mapping bits $c_{2,0}, c_{2,1}, \ldots, c_{2,ma-1}$ is the index h obtained according to the 2-bit Gray mapping scheme 1;

when ma=3, the amplitude index i obtained from mapping the amplitude mapping bits $c_{2,0}, c_{2,1}, \ldots, c_{2,ma-1}$ is the index h obtained according to the 3-bit Gray mapping scheme 1;

when ma=4, the amplitude index i obtained from mapping the amplitude mapping bits $c_{2,0}, c_{2,1}, \ldots, c_{2,ma-1}$ is the index h obtained according to the 4-bit Gray mapping scheme 1;

when ma=5, the amplitude index i obtained from mapping the amplitude mapping bits $c_{2,0}, c_{2,1}, \ldots, c_{2,ma-1}$ is the index h obtained according to the 5-bit Gray mapping scheme 1; and when ma=6, the amplitude index i obtained from mapping the amplitude mapping bits $c_{2,0}, c_{2,1}, \ldots, c_{2,ma-1}$ is the index h obtained according to the 6-bit Gray mapping scheme 1.

FIGS. 3a-3f respectively show schematic diagrams of modulation mapping with different values of Qm, mp, ma, and $\theta^*$ after determination of mp phase mapping bits and ma amplitude mapping bits in a certain way according to an embodiment in the first example of the fourth exemplary implementation. Specifically, in FIGS. 3a-3f, the mp phase mapping bits are determined according to Manner A1 in the second exemplary implementation described above, and the ma amplitude mapping bits are determined according to Manner B1 in the second exemplary implementation described above.

Figure 3C:
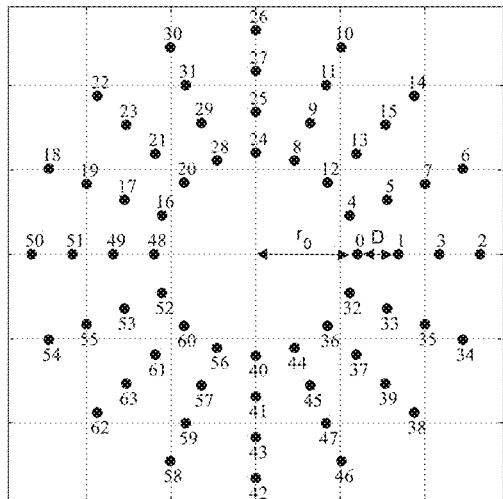
Figure 3D:
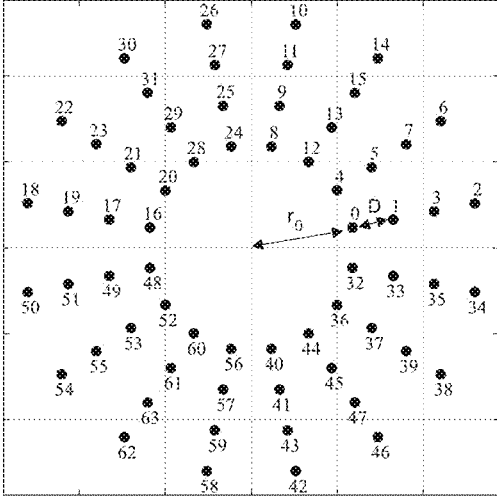
Figure 3E:
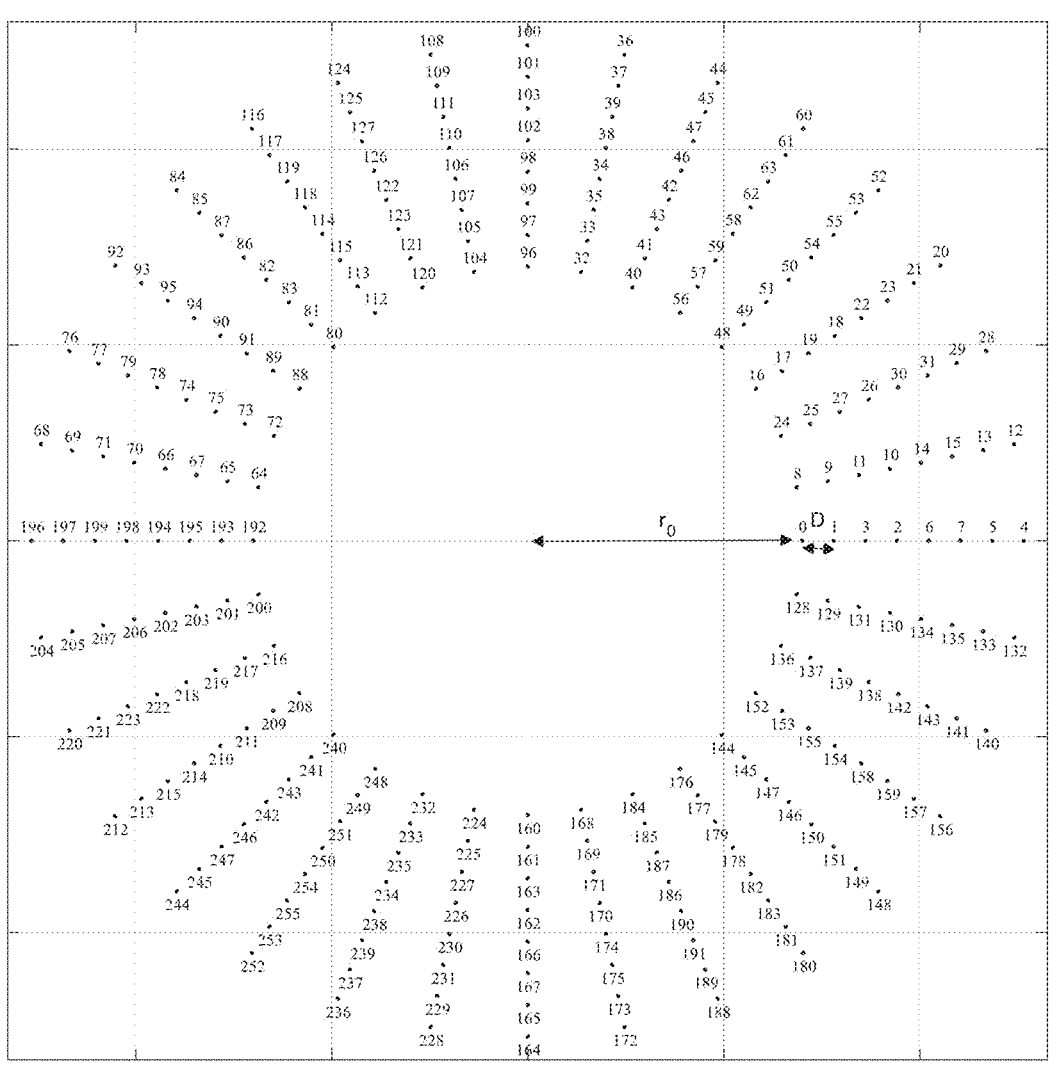
Figure 3F:
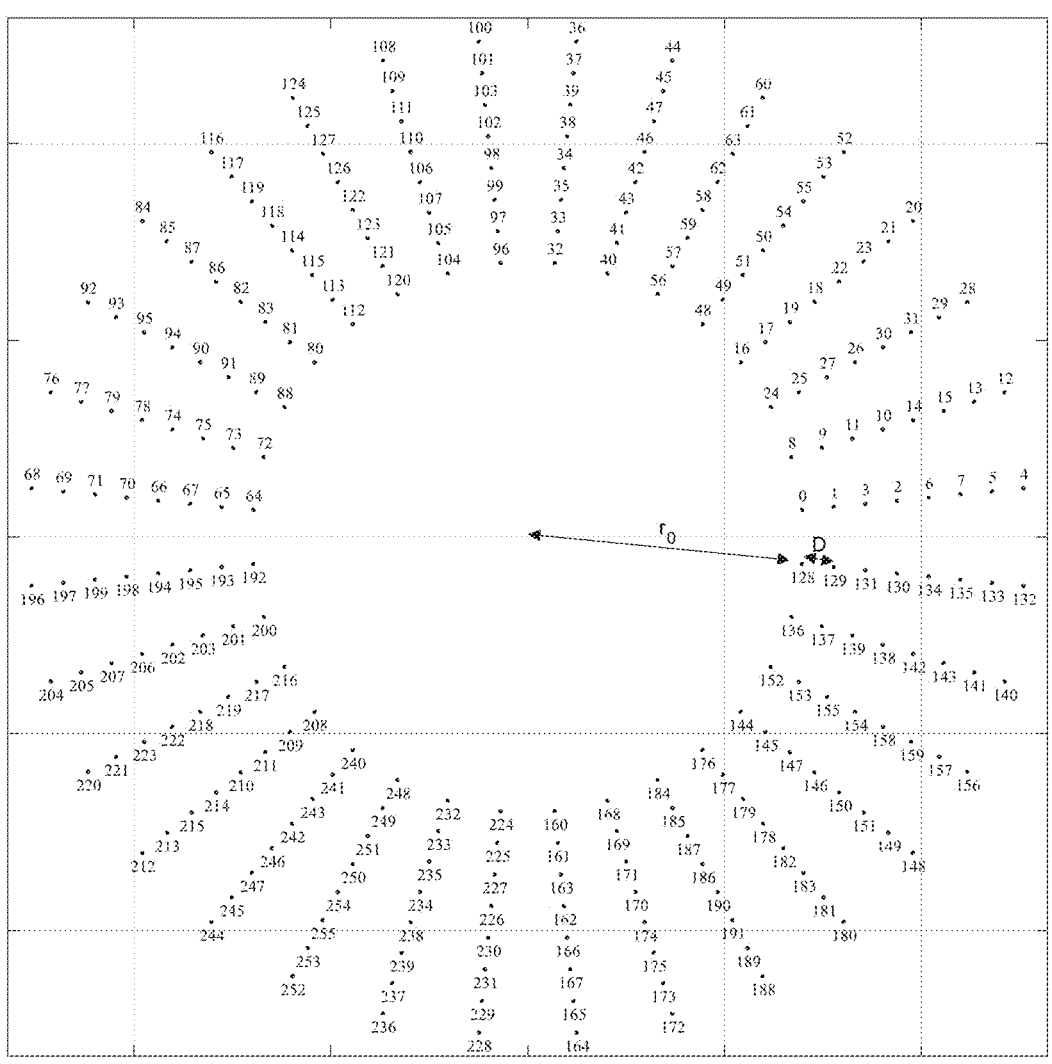

In FIG. 3a, Qm=4, mp=3, ma=1, $\theta^*$=0;

in FIG. 3b, Qm=4, mp=3, ma=1, $\theta^*$=π/8;

in FIG. 3c, Qm=6, mp=4, ma=2, $\theta^*$=0;

in FIG. 3d, Qm=6, mp=4, ma=2, $\theta^*$=π/16;

in FIG. 3e, Qm=8, mp=5, ma=3, $\theta^*$=0; and in FIG. 3f, Qm=8, mp=5, ma=3, $\theta^*$=π/32.

FIGS. 4a-4f respectively show schematic diagrams of modulation mapping with different values of Qm, mp, ma, and $\theta^*$ after determination of mp phase mapping bits and ma amplitude mapping bits in another way according to an embodiment in the first example of the fourth exemplary implementation. Specifically, in FIGS. 4a-4f, the mp phase mapping bits are determined according to Manner A2 in the second exemplary implementation described above, and the ma amplitude mapping bits are determined according to Manner B1 in the second exemplary implementation described above.

Figure 4A:
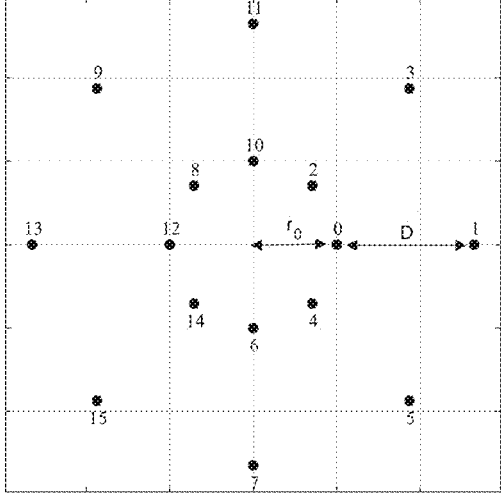
FIGS. 4a-4f are schematic diagrams of modulation mapping with different values of Qm, mp, ma, and θ* after determination of mp phase mapping bits and ma amplitude mapping bits in another way according to an embodiment in the first example of the fourth exemplary implementation.
Figure 4B:
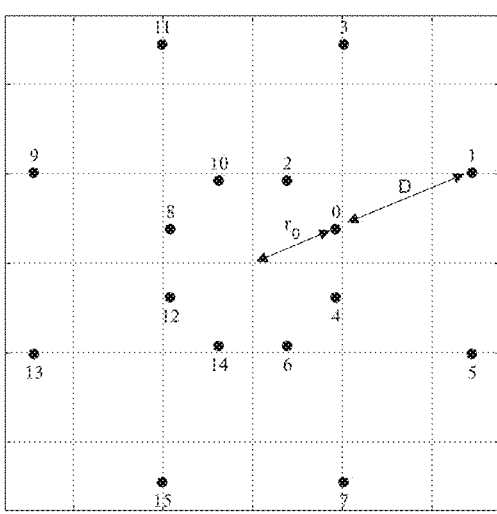
Figure 4C:
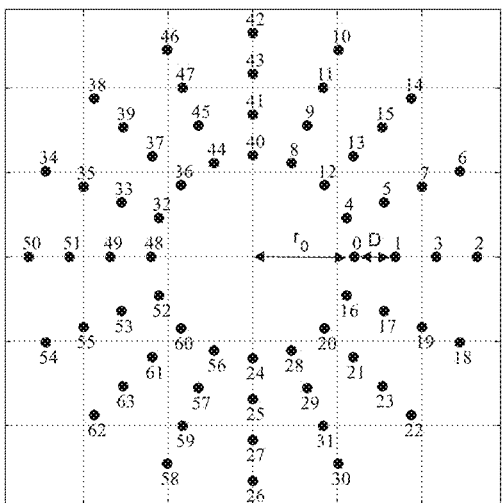
Figure 4D:
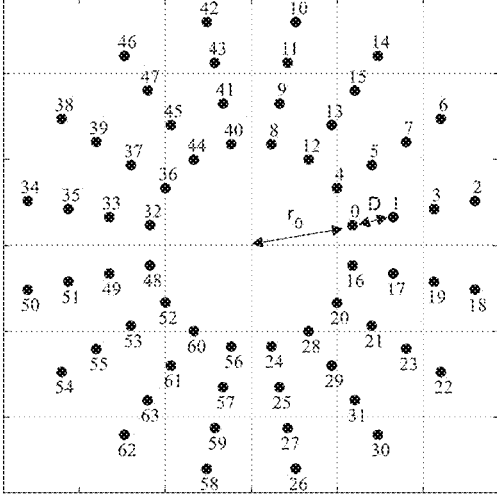
Figure 4E:
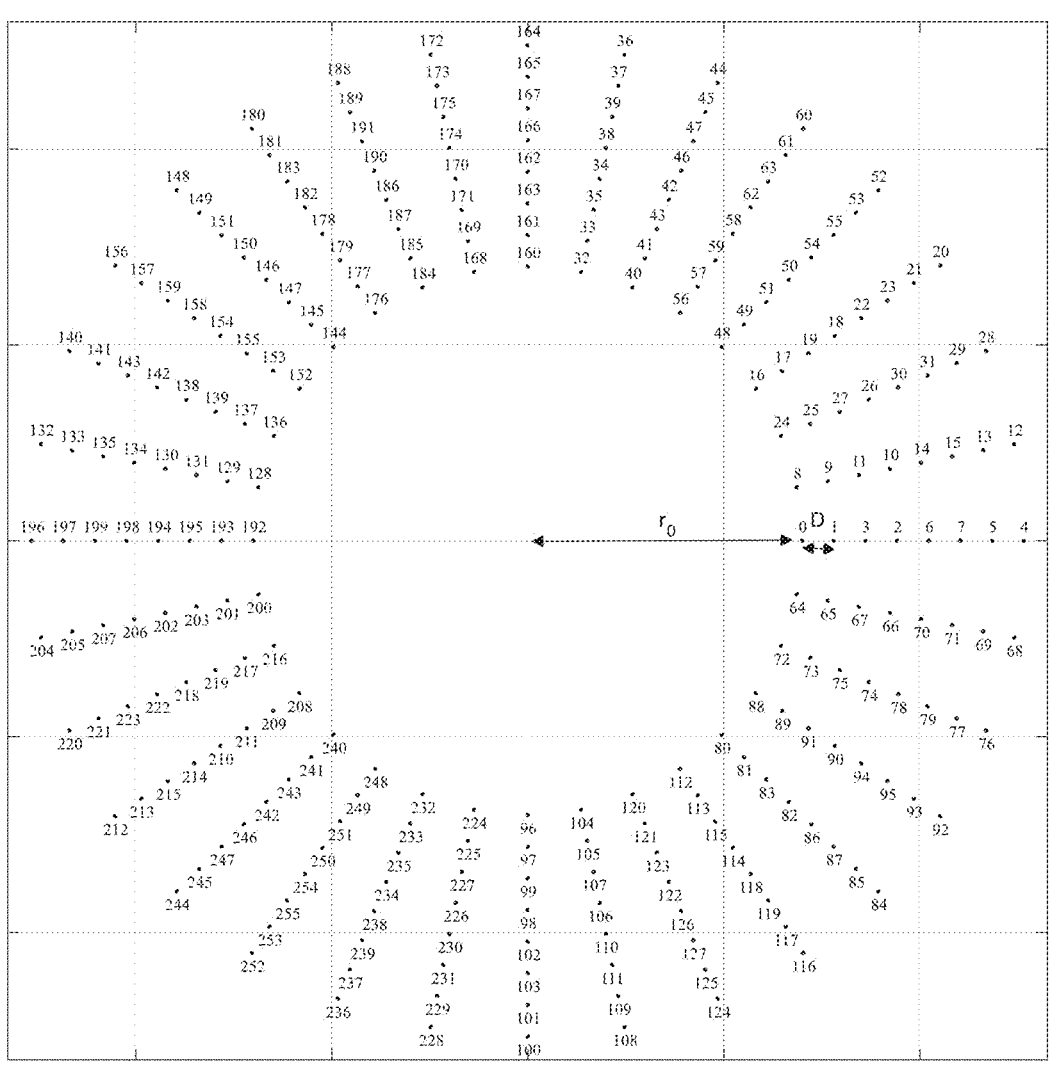
Figure 4F:
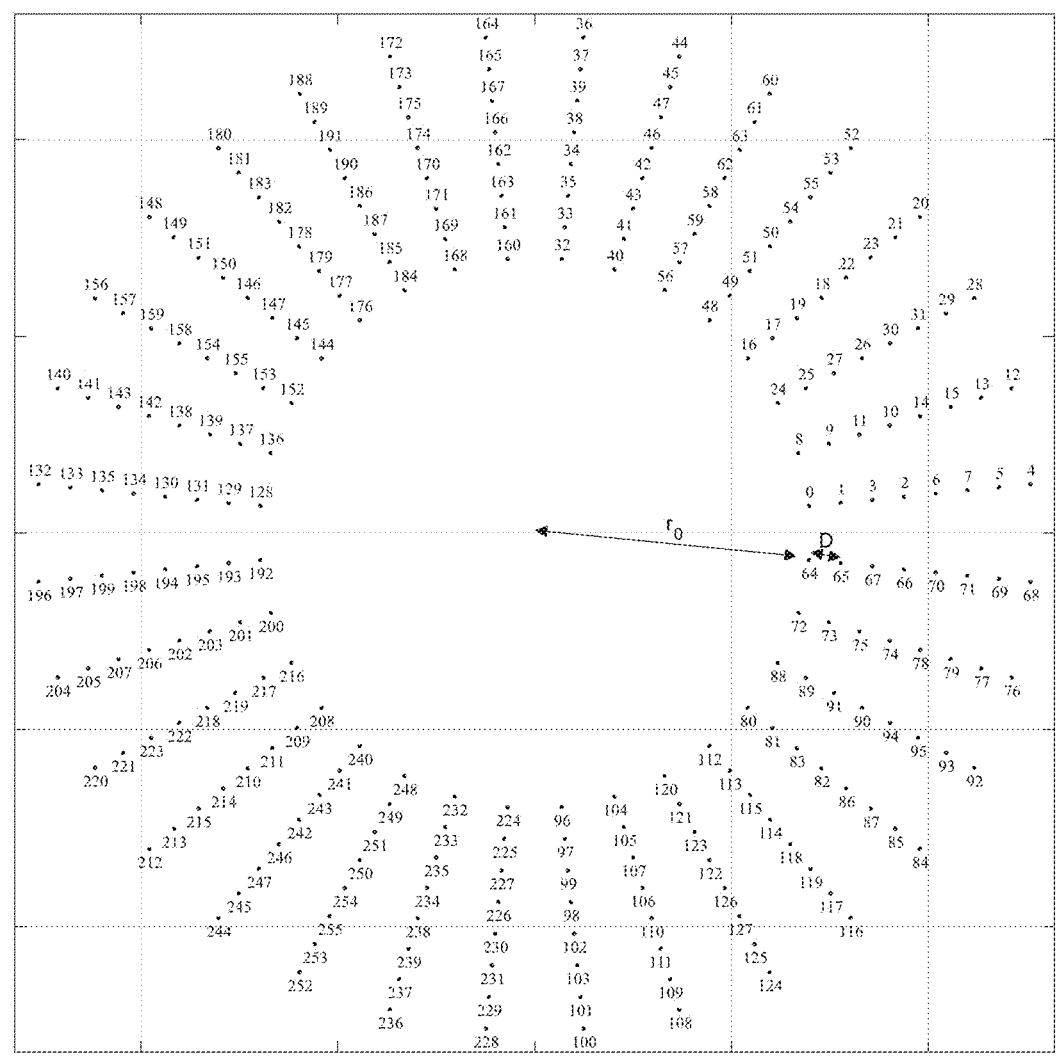

In FIG. 4a, Qm=4, mp=3, ma=1, $\theta^*$=0;

in FIG. 4b, Qm=4, mp=3, ma=1, $\theta^*$=π/8;

in FIG. 4c, Qm=6, mp=4, ma=2, $\theta^*$=0;

in FIG. 4d, Qm=6, mp=4, ma=2, $\theta$*=$\pi$/16;

in FIG. 4e, Qm=8, mp=5, ma=3, $\theta$*=0; and in FIG. 4f, Qm=8, mp=5, ma=3, $\theta$*=$\pi$/32.

FIGS. 5a-5f respectively show schematic diagrams of modulation mapping with different values of Qm, mp, ma, and $\theta$* after determination of mp phase mapping bits and ma amplitude mapping bits in yet another way according to an embodiment in the first example of the fourth exemplary implementation. Specifically, in FIGS. 5a-5f, the mp phase mapping bits are determined according to Manner A3 in the second exemplary implementation described above, and the ma amplitude mapping bits are determined according to Manner B2 in the second exemplary implementation described above.

Figure 5A:
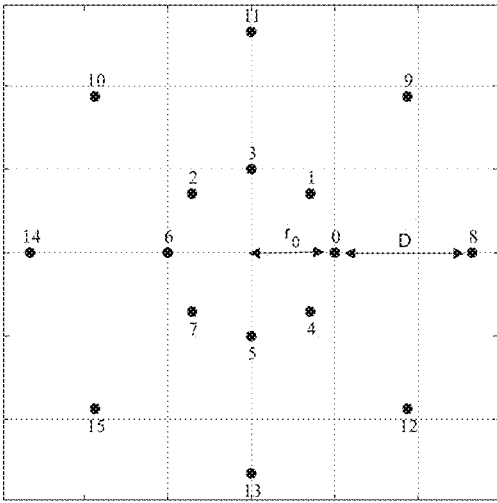
FIGS. 5a-5f are schematic diagrams of modulation mapping with different values of Qm, mp, ma, and θ* after determination of mp phase mapping bits and ma amplitude mapping bits in yet another way according to an embodiment in the first example of the fourth exemplary implementation.
Figure 5B:
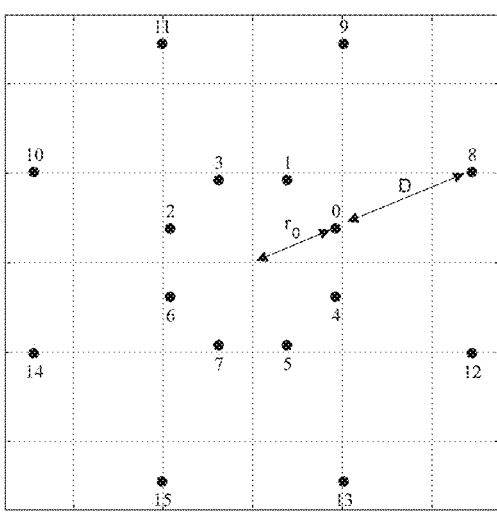
Figure 5C:
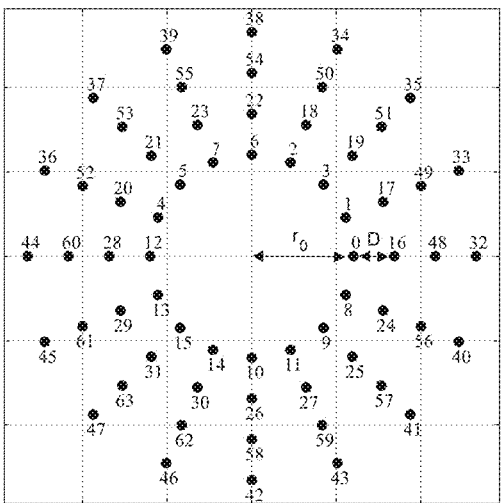
Figure 5D:
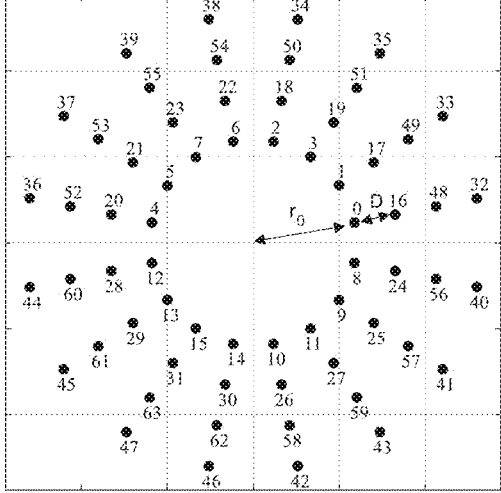
Figure 5E:
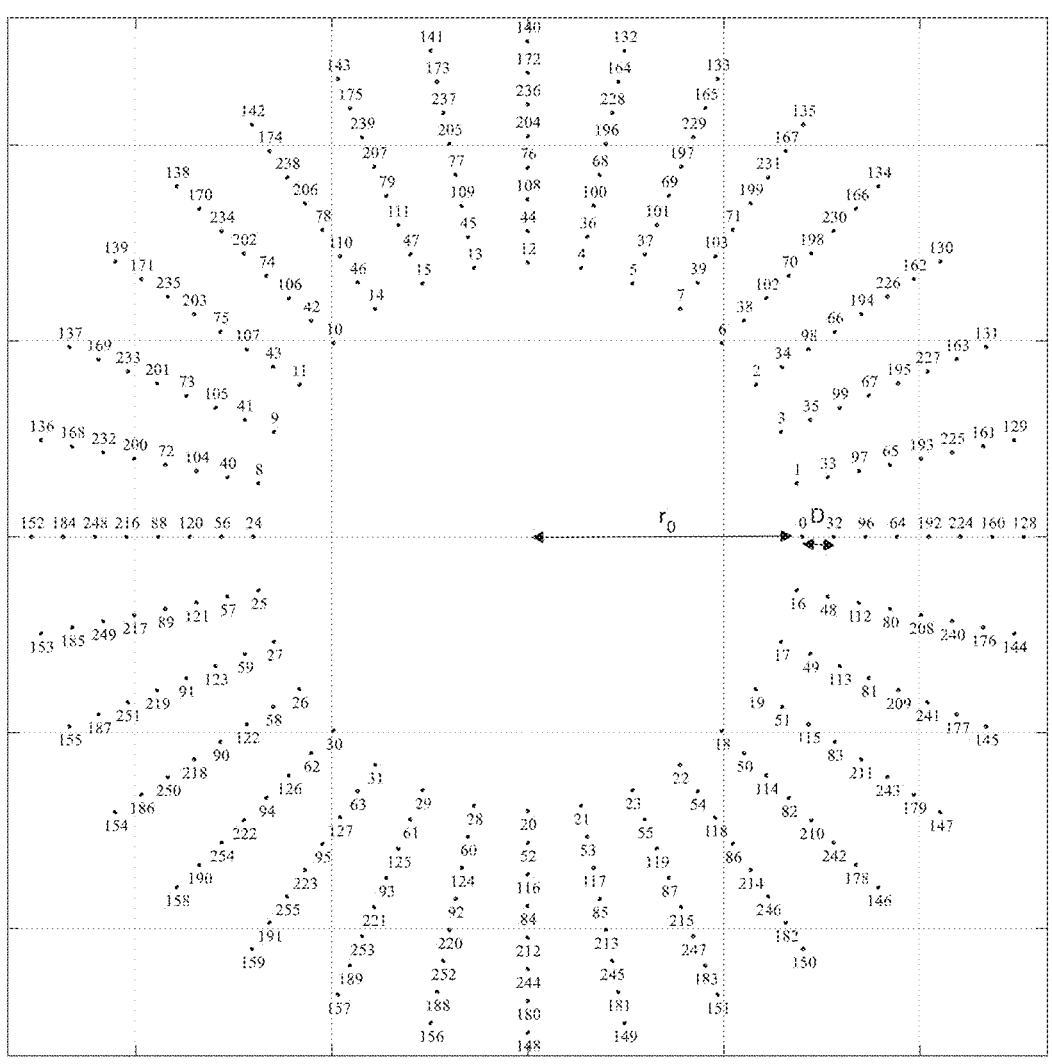
Figure 5F:
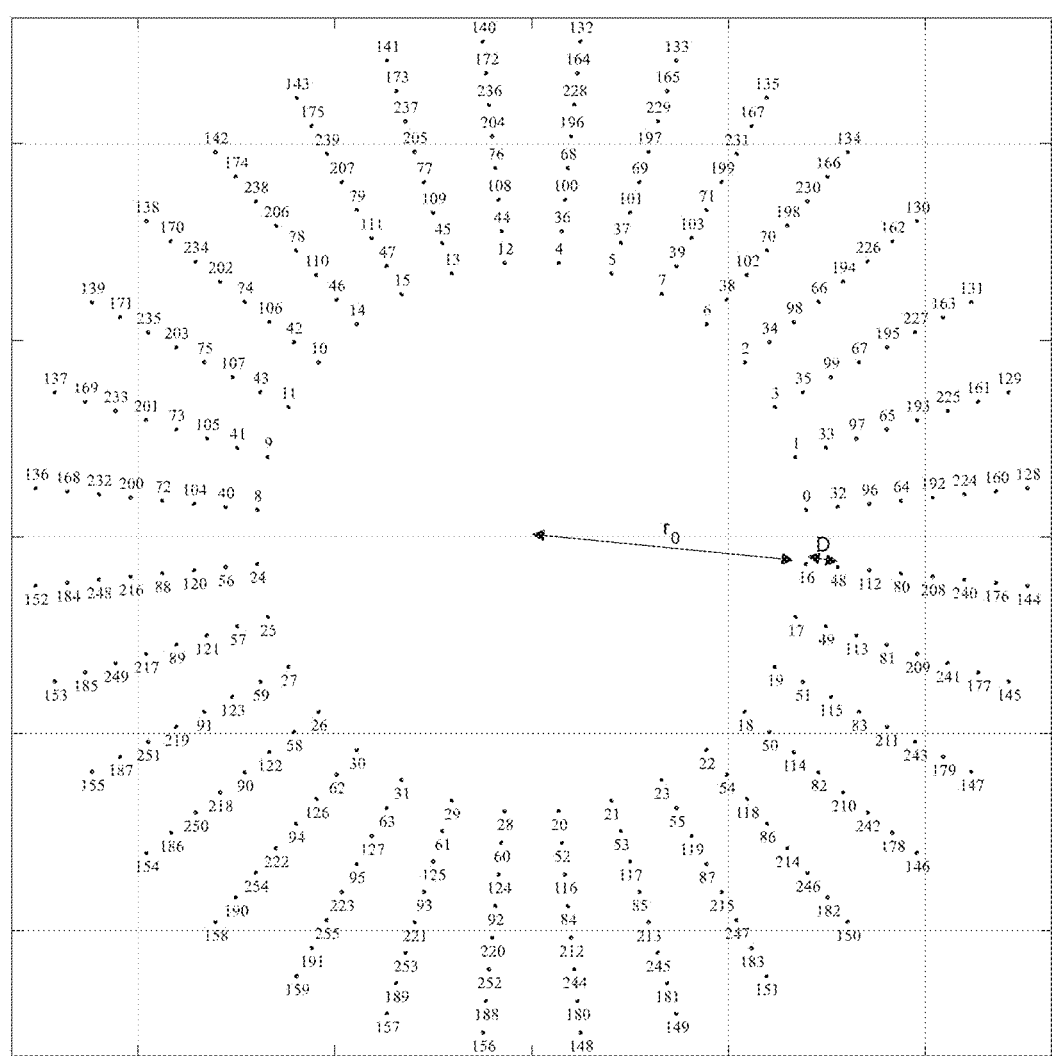

In FIG. 5a, Qm=4, mp=3, ma=1, $\theta$*=0;

in FIG. 5b, Qm=4, mp=3, ma=1, $\theta$*=$\pi$/8;

in FIG. 5c, Qm=6, mp=4, ma=2, $\theta$*=0;

in FIG. 5d, Qm=6, mp=4, ma=2, $\theta$*=$\pi$/16;

in FIG. 5e, Qm=8, mp=5, ma=3, $\theta$*=0; and in FIG. 5f, Qm=8, mp=5, ma=3, $\theta$*=$\pi$/32.

FIGS. 6a-6f respectively show schematic diagrams of modulation mapping with different values of Qm, mp, ma, and $\theta$* after determination of mp phase mapping bits and ma amplitude mapping bits in still another way according to an embodiment in the first example of the fourth exemplary implementation. Specifically, in FIGS. 6a-6f, the mp phase mapping bits are determined according to Manner A4 in the second exemplary implementation described above, and the ma amplitude mapping bits are determined according to Manner B3 in the second exemplary implementation described above.

Figure 6A:
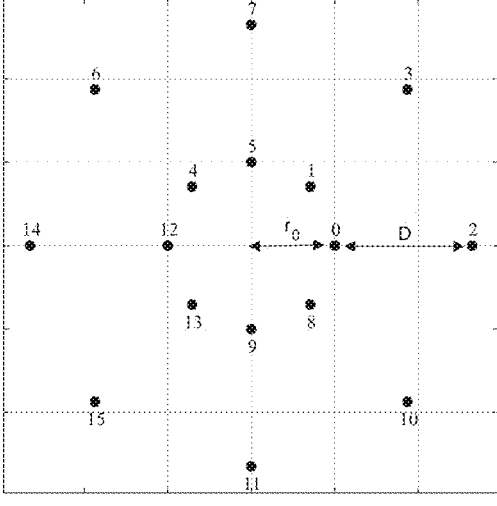
FIGS. 6a-6f are schematic diagrams of modulation mapping with different values of Qm, mp, ma, and θ* after determination of mp phase mapping bits and ma amplitude mapping bits in still another way according to an embodiment in the first example of the fourth exemplary implementation.
Figure 6B:
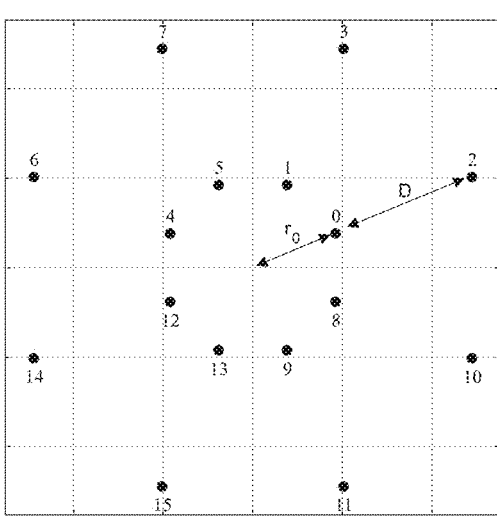
Figure 6C:
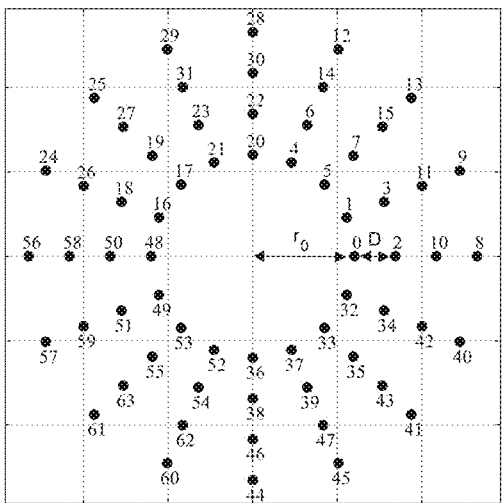
Figure 6D:
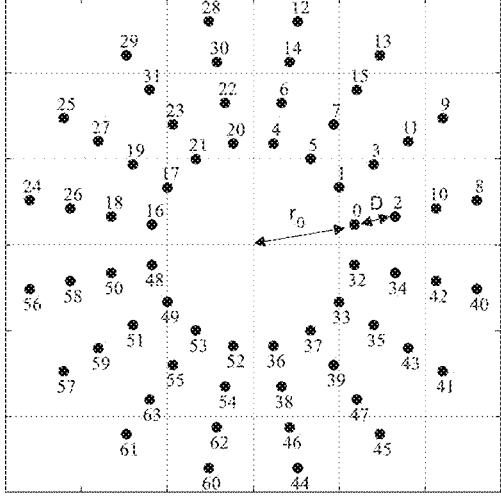
Figure 6E:
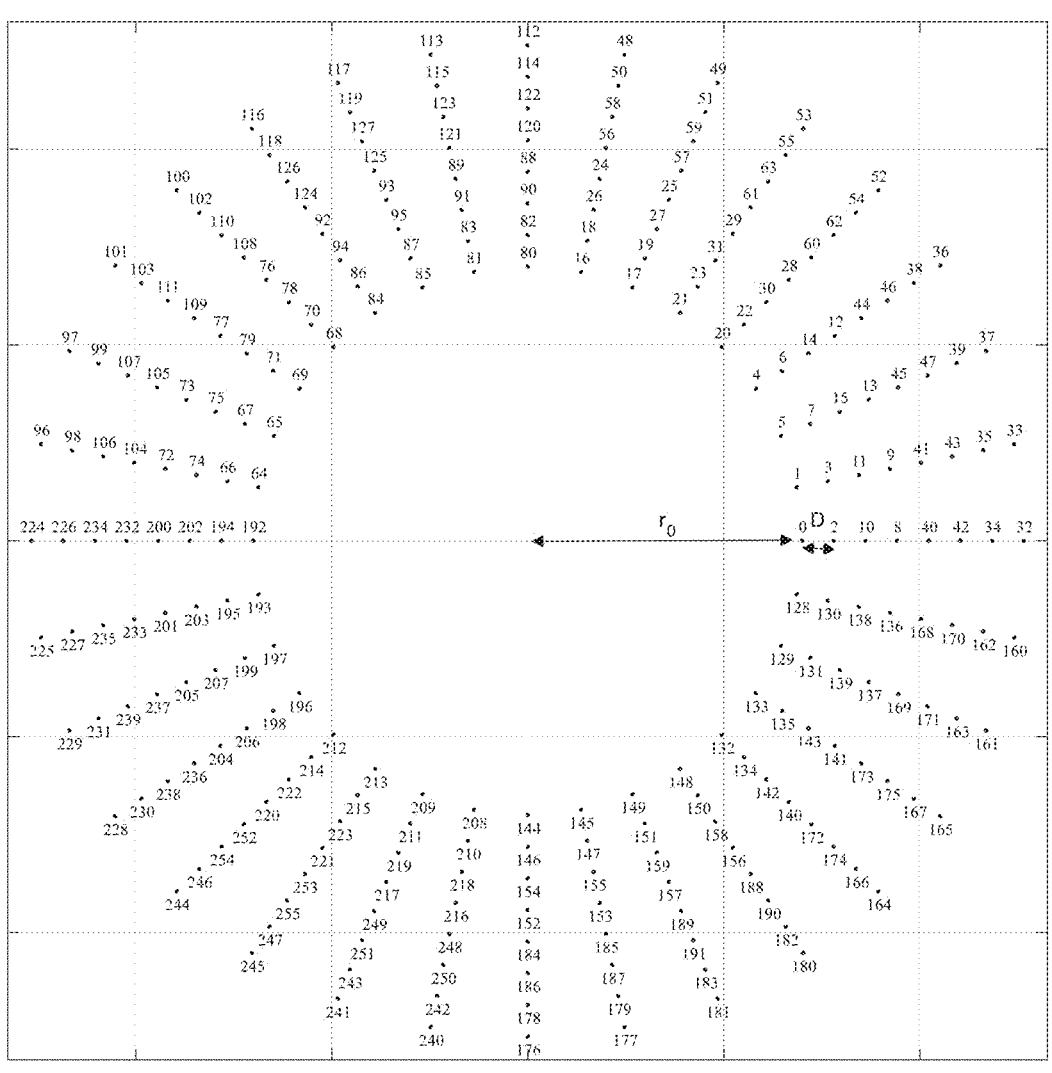
Figure 6F:
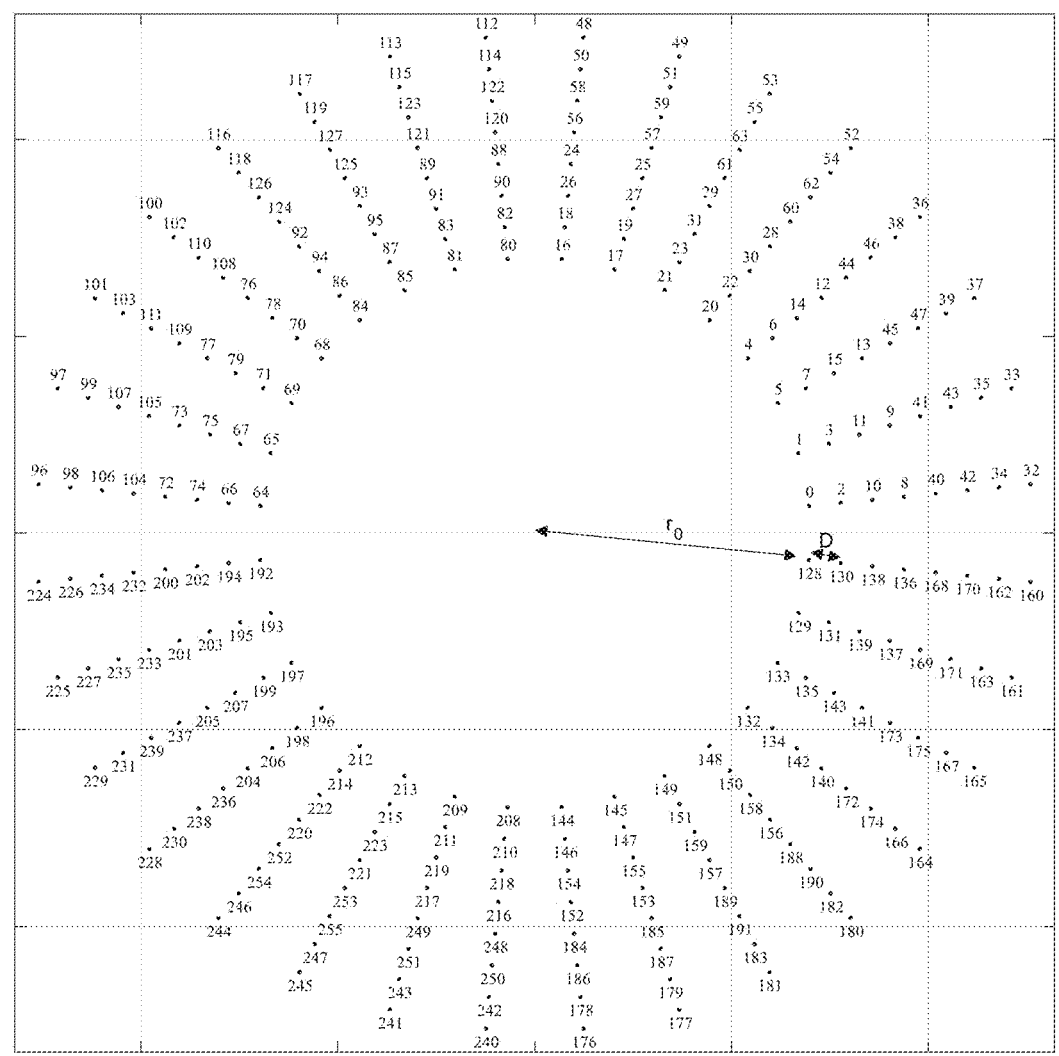

In FIG. 6a, Qm=4, mp=3, ma=1, $\theta$*=0;

in FIG. 6b, Qm=4, mp=3, ma=1, $\theta$*=$\pi$/8;

in FIG. 6c, Qm=6, mp=4, ma=2, $\theta$*=0;

in FIG. 6d, Qm=6, mp=4, ma=2, $\theta$*=$\pi$/16;

in FIG. 6e, Qm=8, mp=5, ma=3, $\theta$*=0; and in FIG. 6f, Qm=8, mp=5, ma=3, $\theta$*=$\pi$/32.

It should be noted that the numbers next to each constellation point in FIGS. 3a-3f, 4a-4f, 5a-5f and 6a-6f are decimal numbers obtained by converting $b_0$, $b_1$, . . . , $b_{Qm-1}$ according to the formula $$\sum_{i=0}^{Qm-1} 2^{Qm-1-i} \cdot b_i.$$

In a second example, the mapping of the mp phase mapping bits is as follows:

when mp=1, the phase index k obtained from mapping the phase mapping bit(s) $c_{1,0}$, $c_{1,1}$, . . . , $c_{1,mp-1}$ is the index h obtained according to the 1-bit Gray mapping scheme 1;

when mp=2, the phase index k obtained from mapping the phase mapping bits $c_{1,0}$, $c_{1,1}$, . . . , $c_{1,mp-1}$ is the index h obtained according to the 2-bit Gray mapping scheme 2; and when mp=3, the phase index k obtained from mapping the phase mapping bits $c_{1,0}$, $c_{1,1}$, . . . , $c_{1,mp-1}$ is the index h obtained according to the 3-bit Gray mapping scheme 2;

when mp=4, the phase index k obtained from mapping the phase mapping bits $c_{1,0}$, $c_{1,1}$, . . . , $c_{1,mp-1}$ is the index h obtained according to the 4-bit Gray mapping scheme 2;

when mp=5, the phase index k obtained from mapping the phase mapping bits $c_{1,0}$, $c_{1,1}$, . . . , $c_{1,mp-1}$ is the index h obtained according to the 5-bit Gray mapping scheme 2; and when mp=6, the phase index k obtained from mapping the phase mapping bits $c_{1,0}$, $c_{1,1}$, . . . , $c_{1,mp-1}$ is the index h obtained according to the 6-bit Gray mapping scheme 2.

In the second example, the mapping of the ma amplitude mapping bits is as follows:

when ma=1, the amplitude index i obtained from mapping the amplitude mapping bit(s) $c_{2,0}$, $c_{2,1}$, . . . , $c_{2,ma-1}$ is the index h obtained according to the 1-bit Gray mapping scheme 1;

when ma=2, the amplitude index i obtained from mapping the amplitude mapping bits $c_{2,0}$, $c_{2,1}$, . . . , $c_{2,ma-1}$ is the index h obtained according to the 2-bit Gray mapping scheme 2;

when ma=3, the amplitude index i obtained from mapping the amplitude mapping bits $c_{2,0}$, $c_{2,1}$, . . . , $c_{2,ma-1}$ is the index h obtained according to the 3-bit Gray mapping scheme 2;

when ma=4, the amplitude index i obtained from mapping the amplitude mapping bits $c_{2,0}$, $c_{2,1}$, . . . , $c_{2,ma-1}$ is the index h obtained according to the 4-bit Gray mapping scheme 2;

when ma=5, the amplitude index i obtained from mapping the amplitude mapping bits $c_{2,0}$, $c_{2,1}$, . . . , $c_{2,ma-1}$ is the index h obtained according to the 5-bit Gray mapping scheme 2; and when ma=6, the amplitude index i obtained from mapping the amplitude mapping bits $c_{2,0}$, $c_{2,1}$, . . . , $c_{2,ma-1}$ is the index h obtained according to the 6-bit Gray mapping scheme 2.

FIGS. 7a-7f respectively show schematic diagrams of modulation mapping with different values of Qm, mp, ma, and $\theta$* after determination of mp phase mapping bits and ma amplitude mapping bits in a certain way according to an embodiment in the second example of the fourth exemplary implementation. Specifically, in FIGS. 7a-7f, the mp phase mapping bits are determined according to Manner A1 in the second exemplary implementation described above, and the ma amplitude mapping bits are determined according to Manner B1 in the second exemplary implementation described above.

Figure 7A:
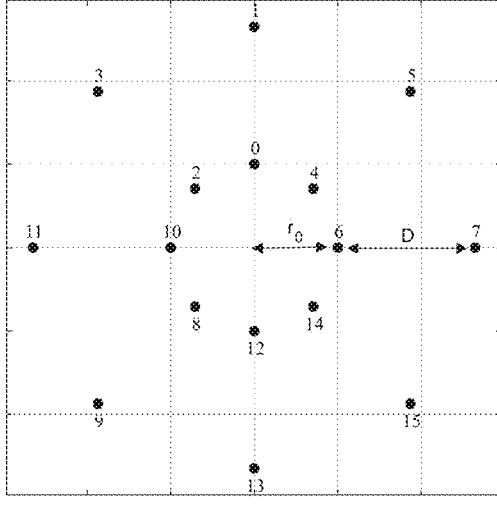
FIGS. 7a-7f are schematic diagrams of modulation mapping with different values of Qm, mp, ma, and θ* after determination of mp phase mapping bits and ma amplitude mapping bits in a certain way according to an embodiment in a second example of the fourth exemplary implementation.
Figure 7B:
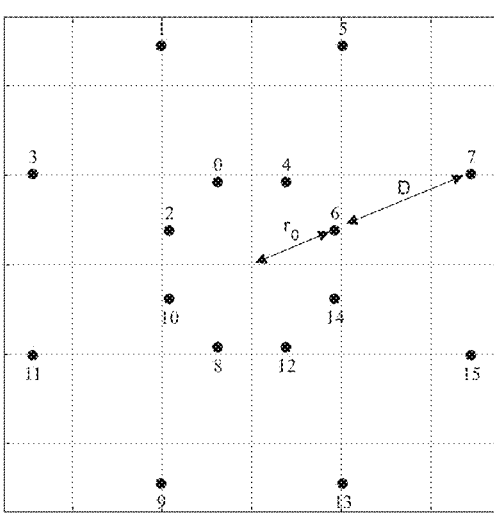
Figure 7C:
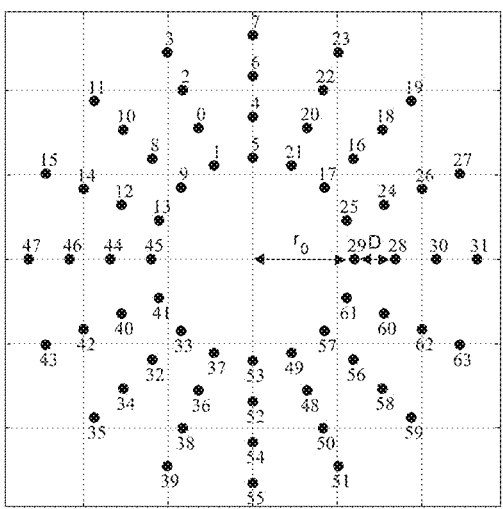
Figure 7D:
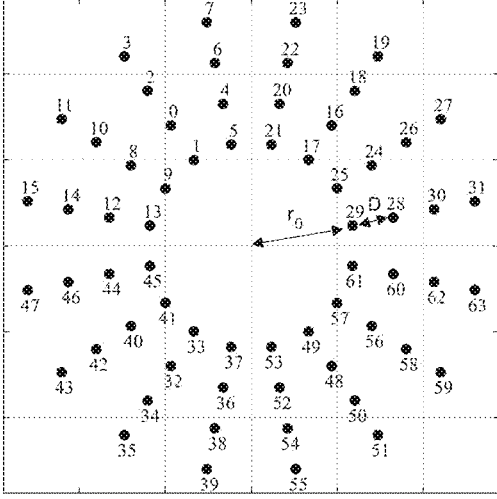
Figure 7E:
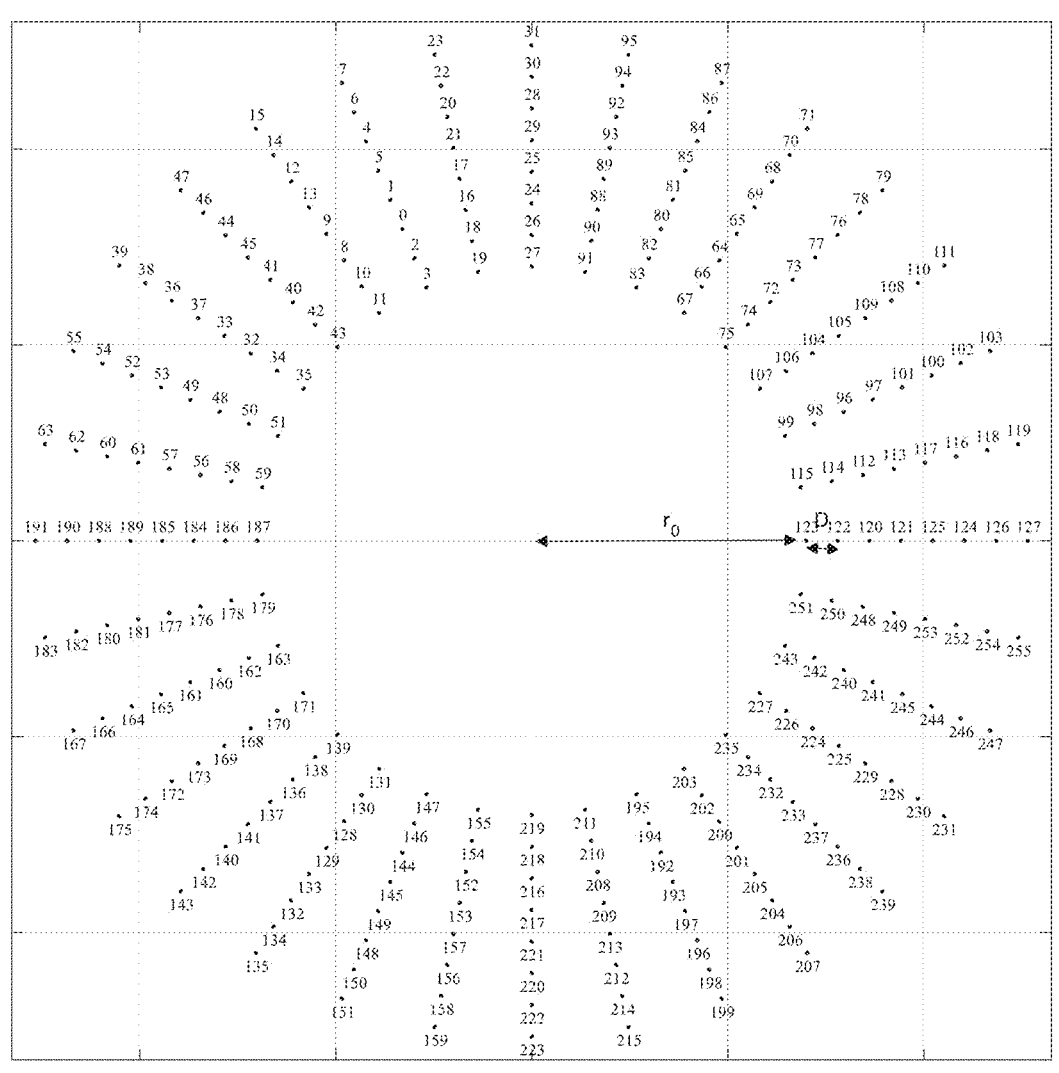
Figure 7F:
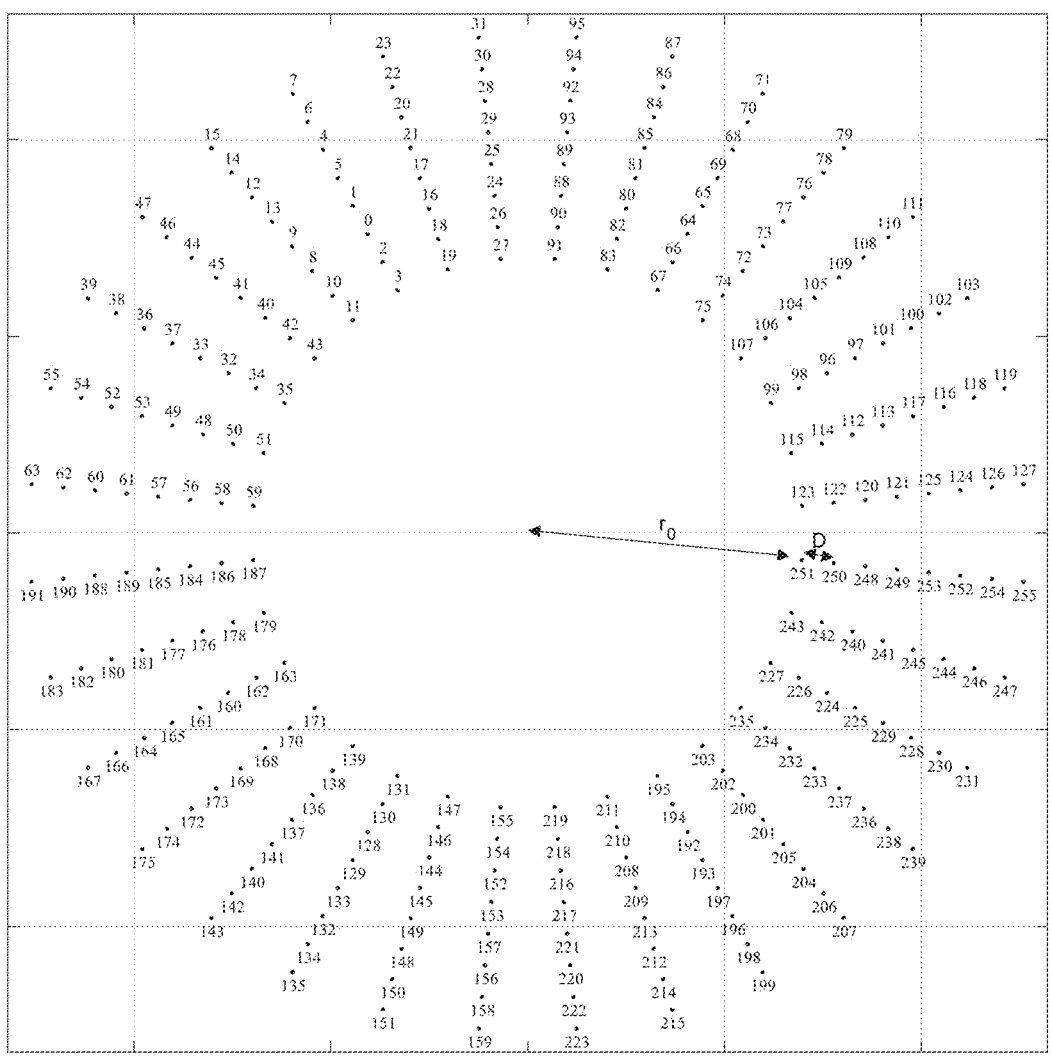

In FIG. 7a, Qm=4, mp=3, ma=1, $\theta$*=0;

in FIG. 7b, Qm=4, mp=3, ma=1, $\theta$*=$\pi$/8;

in FIG. 7c, Qm=6, mp=4, ma=2, $\theta$*=0;

in FIG. 7d, Qm=6, mp=4, ma=2, $\theta$*=$\pi$/16;

in FIG. 7e, Qm=8, mp=5, ma=3, $\theta$*=0; and in FIG. 7f, Qm=8, mp=5, ma=3, $\theta$*=$\pi$/32.

FIGS. 8a-8f respectively show schematic diagrams of modulation mapping with different values of Qm, mp, ma, and $\theta$* after determination of mp phase mapping bits and ma amplitude mapping bits in another way according to an embodiment in the second example of the fourth exemplary implementation. Specifically, in FIGS. 8a-8f, the mp phase mapping bits are determined according to Manner A2 in the second exemplary implementation described above, and the ma amplitude mapping bits are determined according to Manner B1 in the second exemplary implementation described above.

Figure 8A:
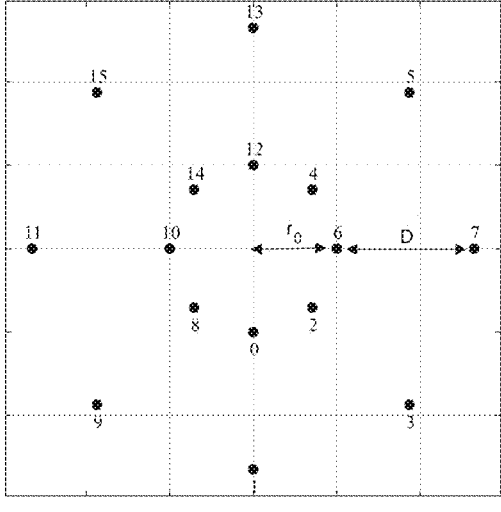
FIGS. 8a-8f are schematic diagrams of modulation mapping with different values of Qm, mp, ma, and θ* after determination of mp phase mapping bits and ma amplitude mapping bits in another way according to an embodiment in the second example of the fourth exemplary implementation.
Figure 8B:
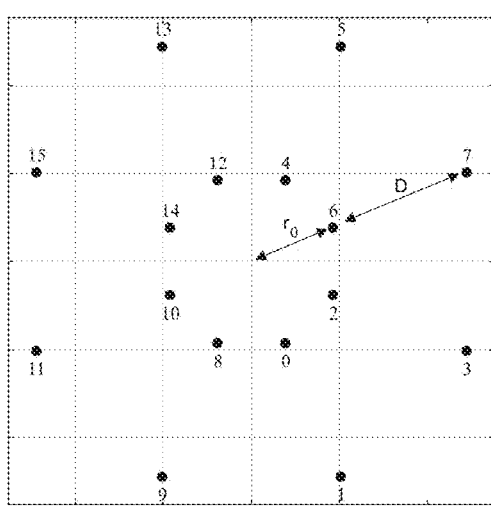
Figure 8C:
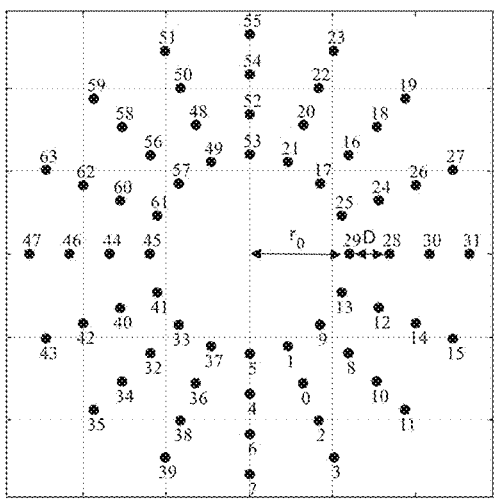
Figure 8D:
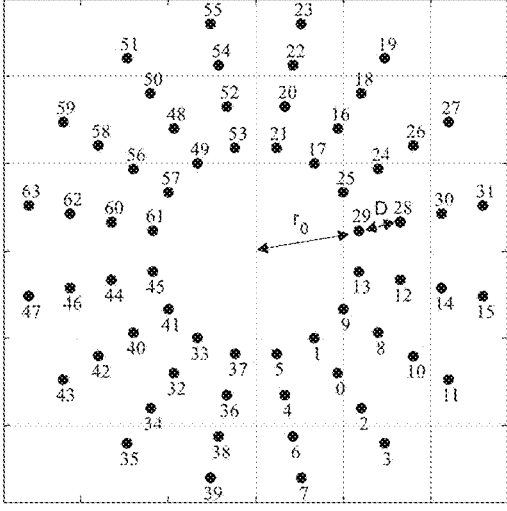
Figure 8E:
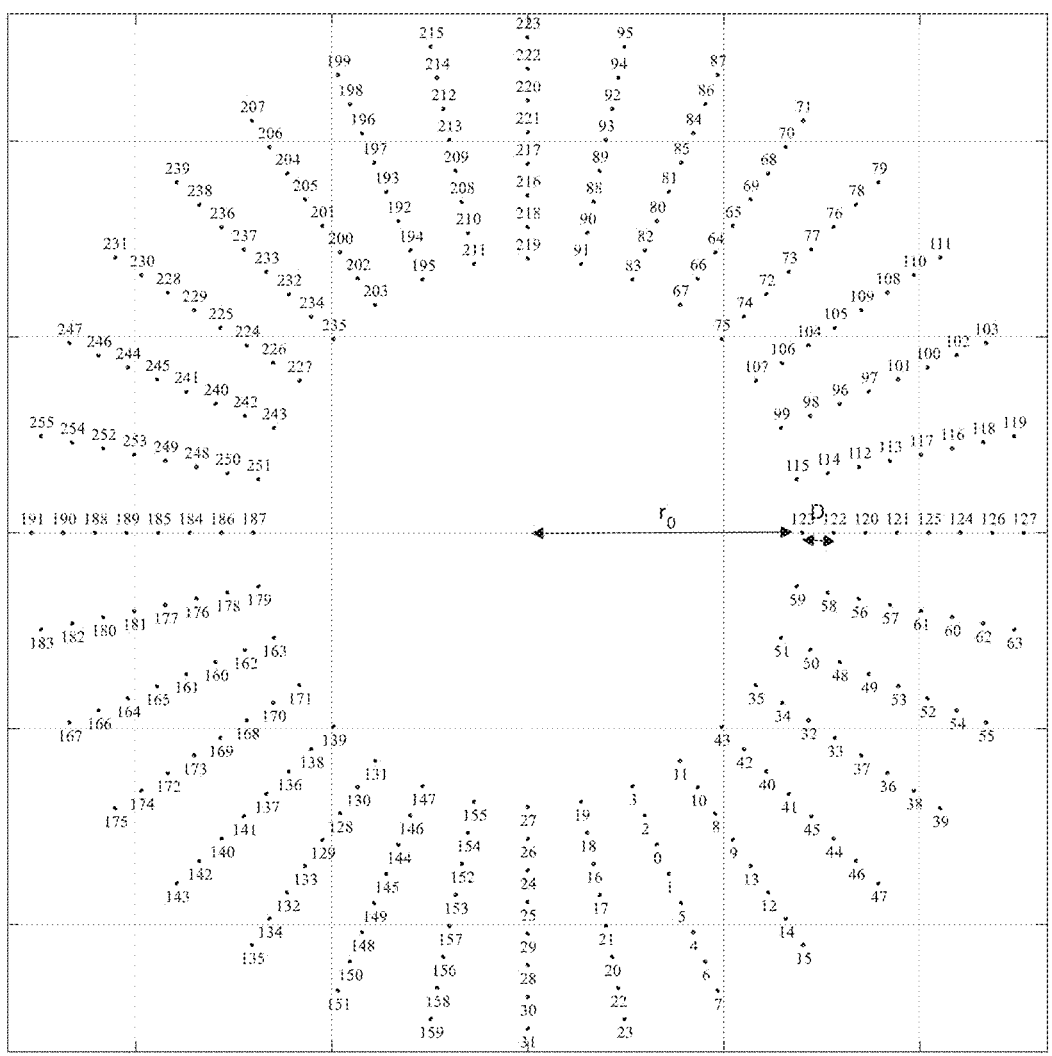
Figure 8F:
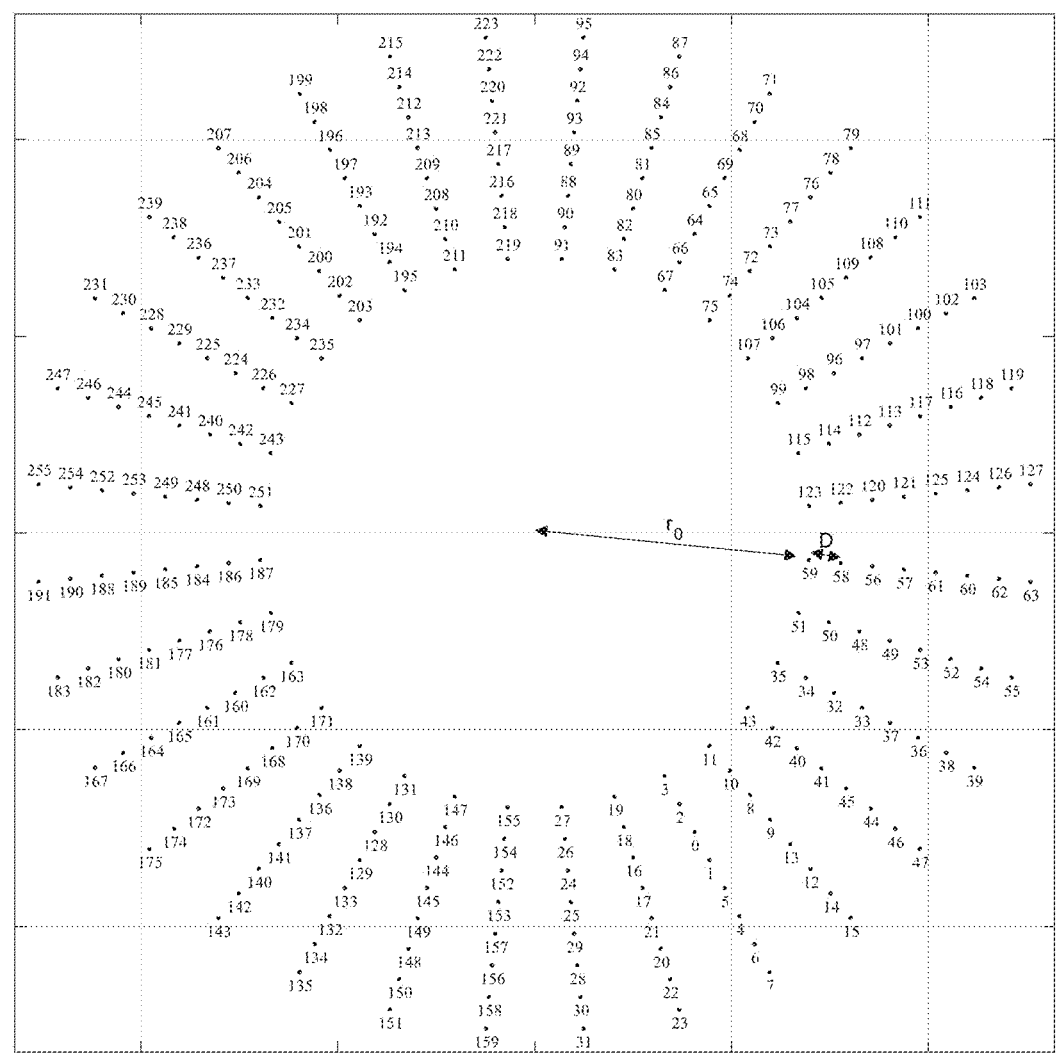

In FIG. 8a, Qm=4, mp=3, ma=1, $\theta$*=0;

in FIG. 8b, Qm=4, mp=3, ma=1, $\theta$*=$\pi$/8;

in FIG. 8c, Qm=6, mp=4, ma=2, $\theta$*=0;

in FIG. 8d, Qm=6, mp=4, ma=2, $\theta$*=$\pi$/16;

in FIG. 8e, Qm=8, mp=5, ma=3, $\theta$*=0; and in FIG. 8f, Qm=8, mp=5, ma=3, $\theta$*=$\pi$/32.

FIGS. 9a-9f respectively show schematic diagrams of modulation mapping with different values of Qm, mp, ma, and $\theta$* after determination of mp phase mapping bits and ma amplitude mapping bits in yet another way according to an embodiment in the second example of the fourth exemplary implementation. Specifically, in FIGS. 9a-9f, the mp phase mapping bits are determined according to Manner A3 in the second exemplary implementation described above, and the ma amplitude mapping bits are determined according to Manner B2 in the second exemplary implementation described above.

Figure 9A:
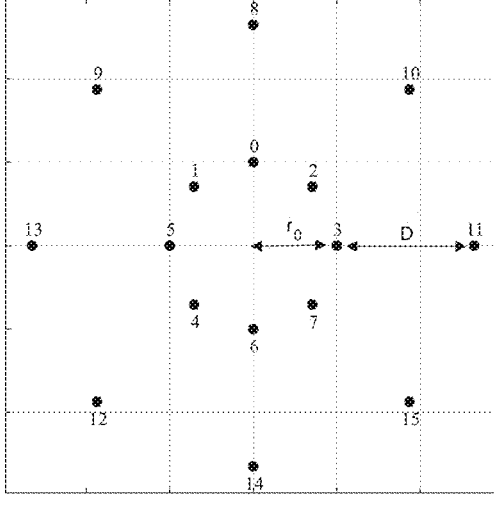
FIGS. 9a-9f are schematic diagrams of modulation mapping with different values of Qm, mp, ma, and θ* after determination of mp phase mapping bits and ma amplitude mapping bits in yet another way according to an embodiment in the second example of the fourth exemplary implementation.
Figure 9B:
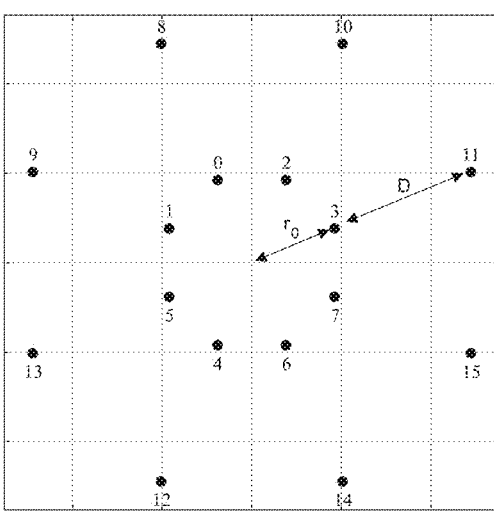
Figure 9C:
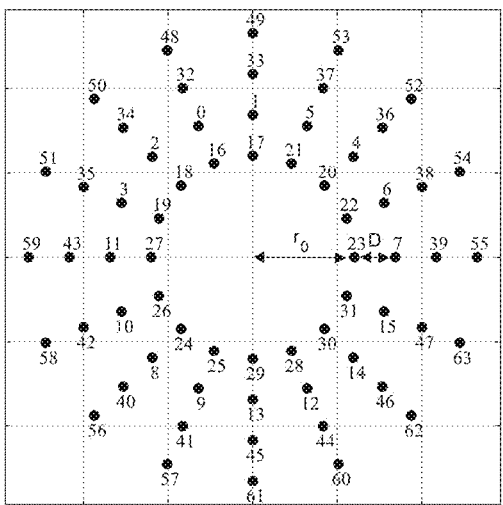
Figure 9D:
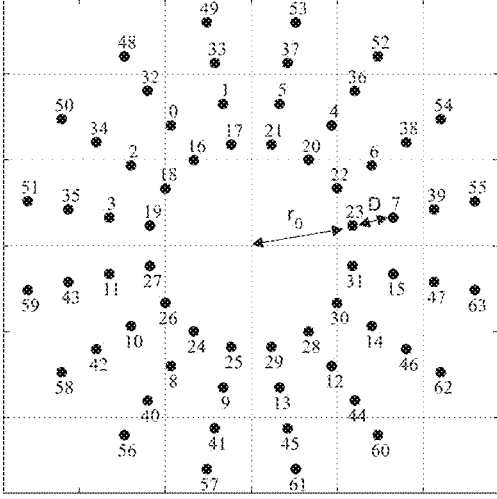
Figure 9E:
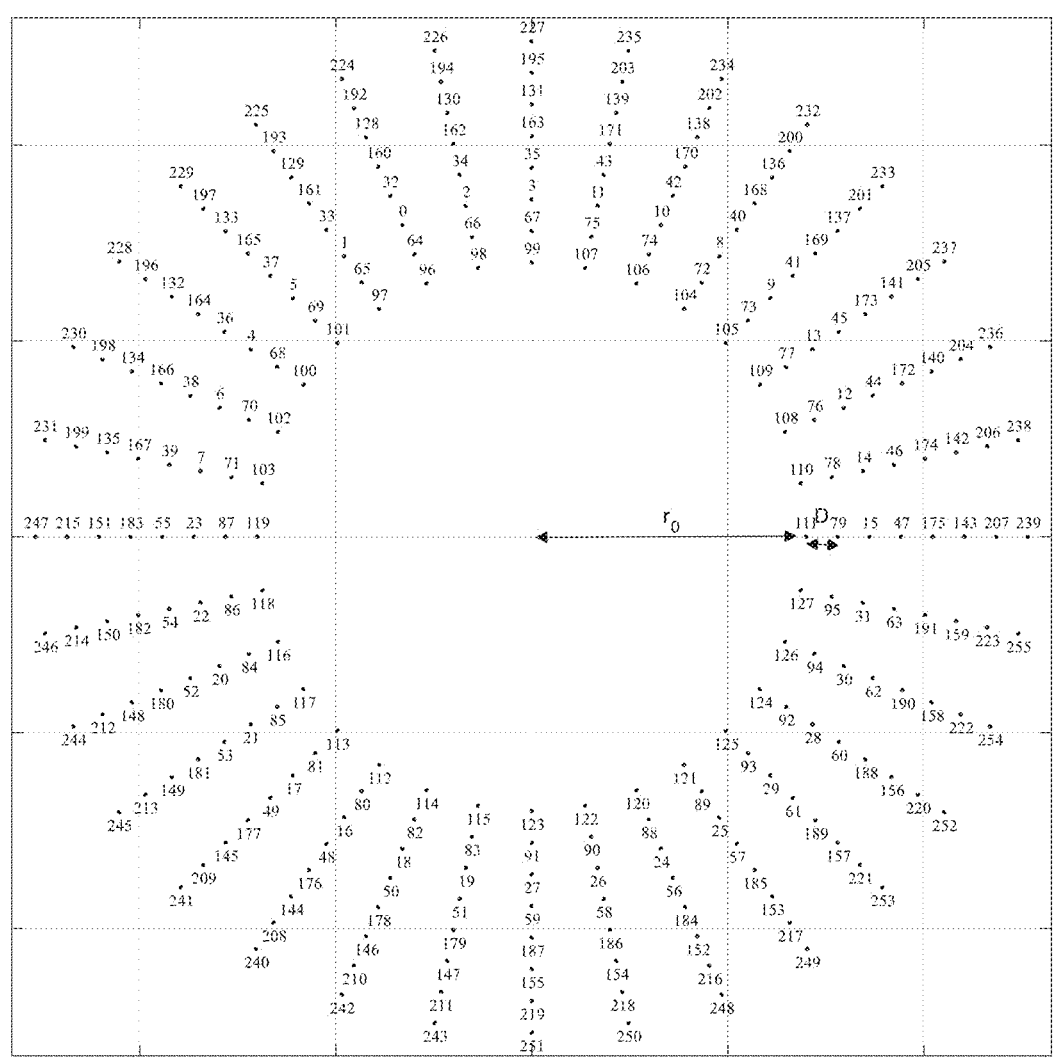
Figure 9F:
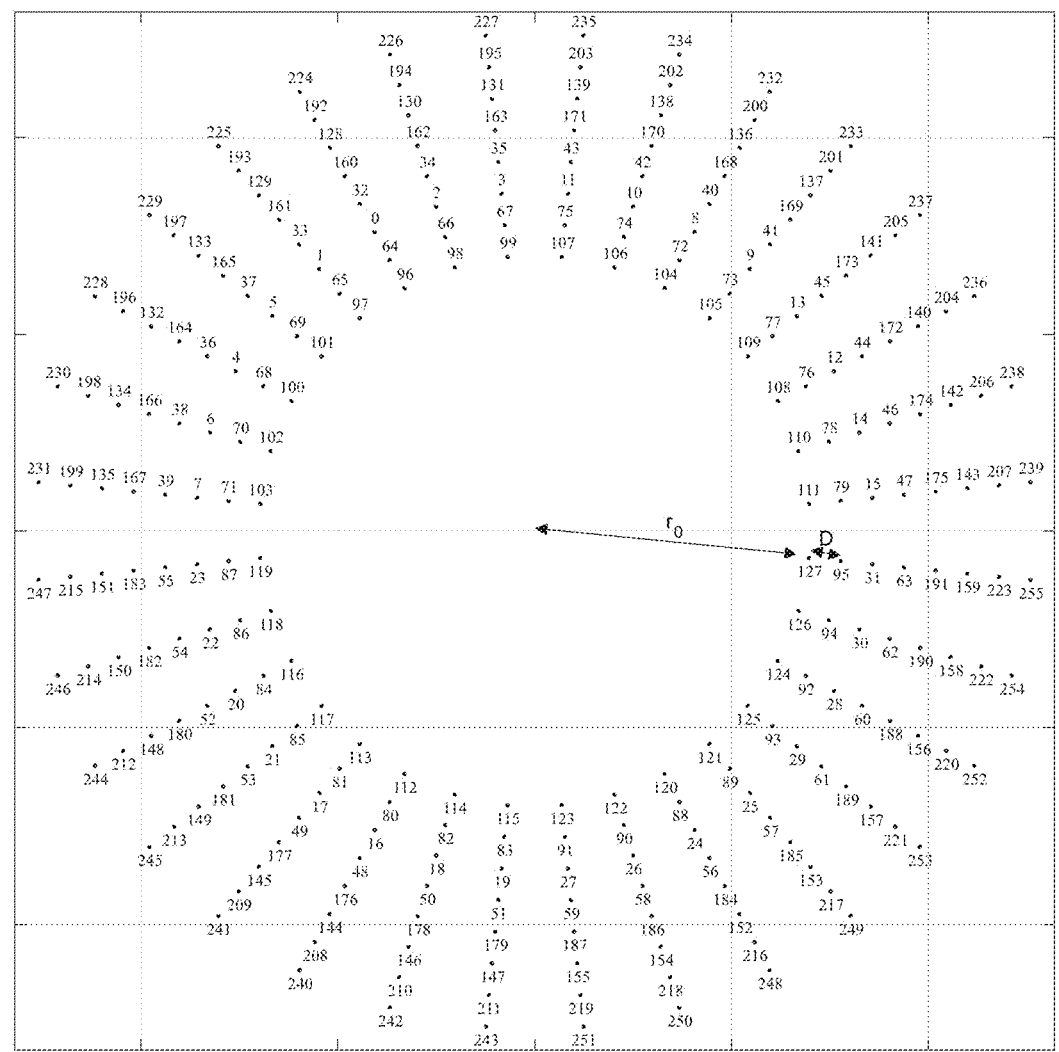

In FIG. 9a, Qm=4, mp=3, ma=1, $\theta^*=0$;
in FIG. 9b, Qm=4, mp=3, ma=1, $\theta^*=\pi/8$;
in FIG. 9c, Qm=6, mp=4, ma=2, $\theta^*=0$;
in FIG. 9d, Qm=6, mp=4, ma=2, $\theta^*=\pi/16$;
in FIG. 9e, Qm=8, mp=5, ma=3, $\theta^*=0$; and
in FIG. 9f, Qm=8, mp=5, ma=3, $\theta^*=\pi/32$.

FIGS. 10a-10f respectively show schematic diagrams of modulation mapping with different values of Qm, mp, ma, and $\theta^*$ after determination of mp phase mapping bits and ma amplitude mapping bits in still another way according to an embodiment in the second example of the fourth exemplary implementation. Specifically, in FIGS. 10a-10f, the mp phase mapping bits are determined according to Manner A4 in the second exemplary implementation described above, and the ma amplitude mapping bits are determined according to Manner B3 in the second exemplary implementation described above.

Figure 10A:
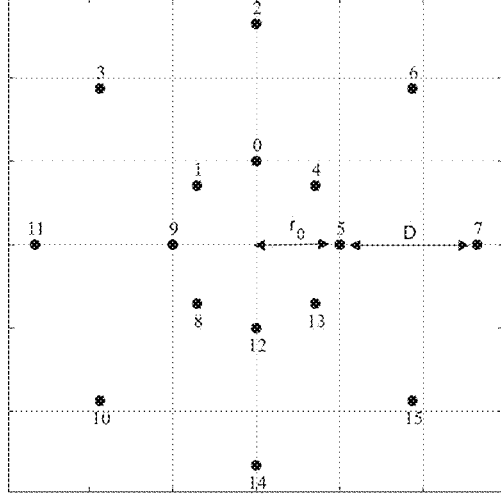
FIGS. 10a-10f are schematic diagrams of modulation mapping with different values of Qm, mp, ma, and θ* after determination of mp phase mapping bits and ma amplitude mapping bits in still another way according to an embodiment in the second example of the fourth exemplary implementation.
Figure 10B:
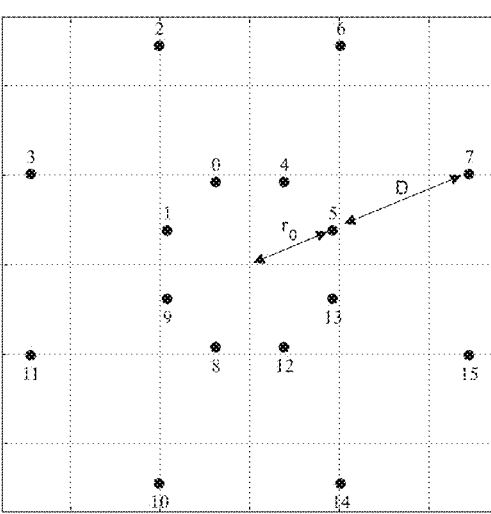
Figure 10C:
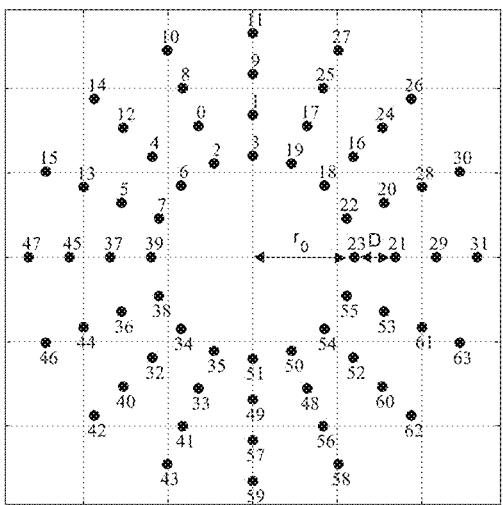
Figure 10D:
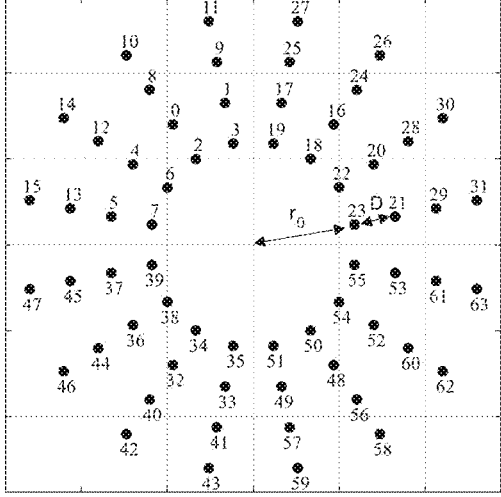
Figure 10E:
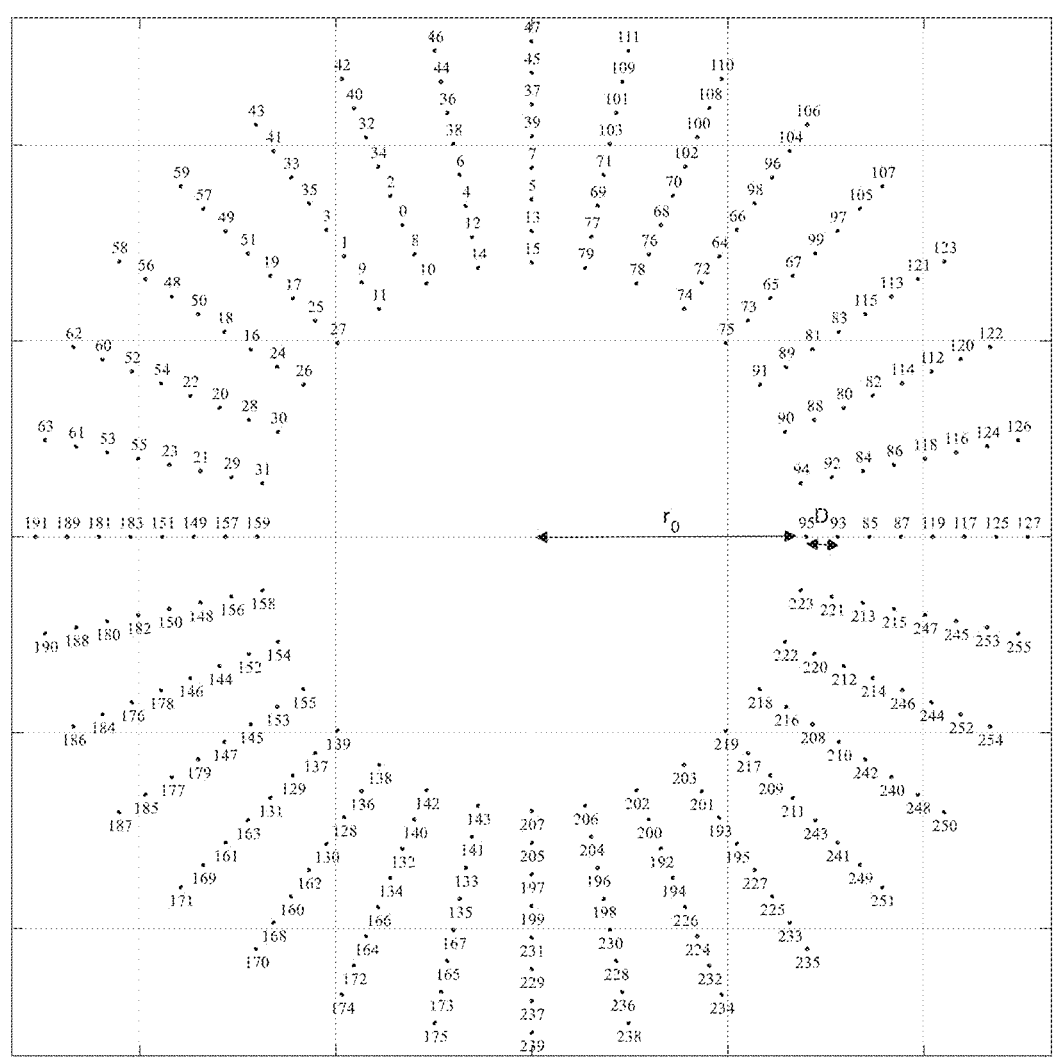
Figure 10F:
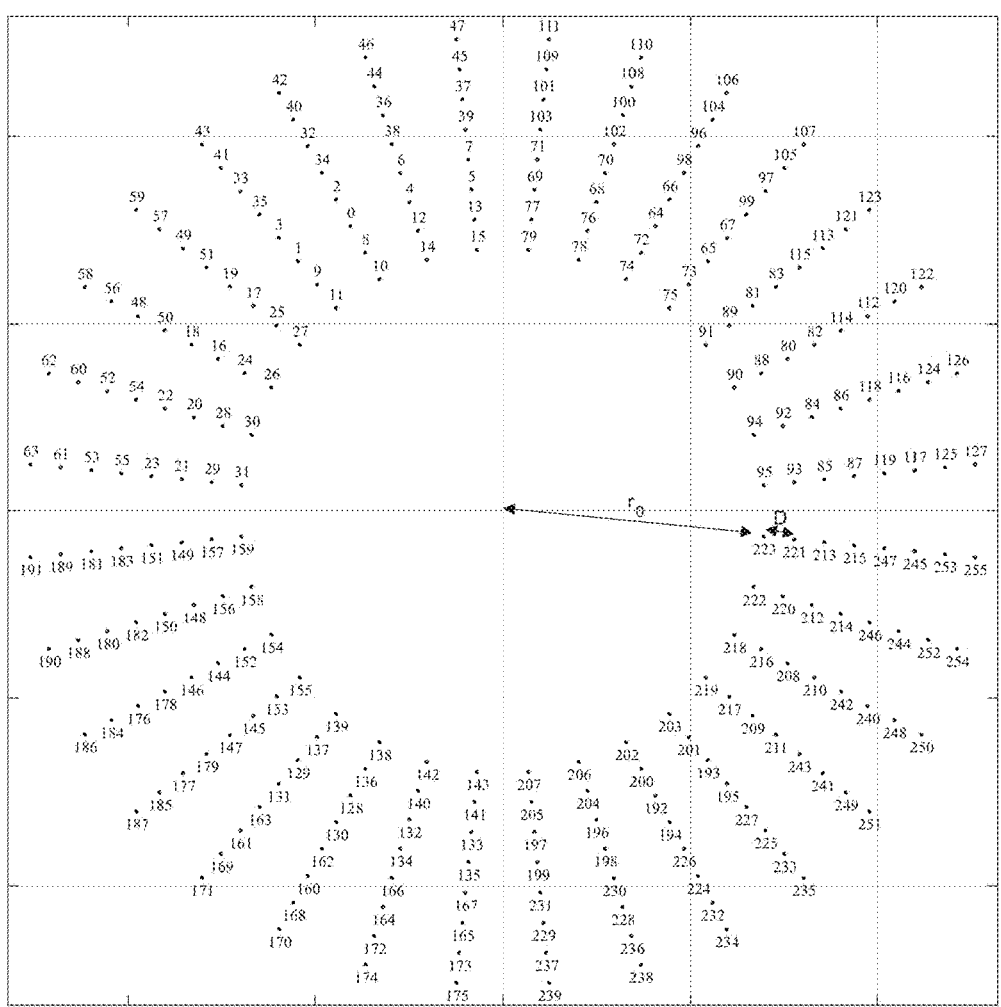

In FIG. 10a, Qm=4, mp=3, ma=1, $\theta^*=0$;
in FIG. 10b, Qm=4, mp=3, ma=1, $\theta^*=\pi/8$;
in FIG. 10c, Qm=6, mp=4, ma=2, $\theta^*=0$;
in FIG. 10d, Qm=6, mp=4, ma=2, $\theta^*=\pi/16$;
in FIG. 10e, Qm=8, mp=5, ma=3, $\theta^*=0$; and
in FIG. 10f, Qm=8, mp=5, ma=3, $\theta^*=\pi/32$.

It should be noted that the numbers next to each constellation point in FIGS. 7a-7f, 8a-8f, 9a-9f and 10a-10f are decimal numbers obtained by converting $b_0$, $b_1$, . . . , $b_{Qm-1}$ according to the formula $$\sum_{i=0}^{Qm-1} 2^{Qm-1-i} \cdot b_i.$$

In a fifth exemplary implementation, there is provided another RAPSK constellation modulation mapping method. In this implementation, the RAPSK constellation modulation mapping method is described on the basis of the third exemplary implementation described above. In this implementation, in a case where mp−2 or ma is greater than 1, mp−2 bits $d_{2,0}$, $d_{2,1}$, . . . , $d_{2,mp-3}$ and ma bits $d_{3,0}$, $d_{3,1}$, . . . , $d_{3,ma-1}$ use the same Gray mapping scheme.

When mp−2 or ma is greater than 1, this implementation also exemplarily provides two Gray mapping approaches, which differ from the fourth exemplary implementation described above in the following aspects:

In a first example of this implementation, the mapping of the mp−2 bits of the second segment is as follows:
when mp−2=1, the phase index k obtained from mapping the second segment of bit(s) $d_{2,0}$, $d_{2,1}$, . . . , $d_{2,mp-3}$ is the index h obtained according to the 1-bit Gray mapping scheme 1;
when mp−2=2, the phase index k obtained from mapping the second segment of bits $d_{2,0}$, $d_{2,1}$, . . . , $d_{2,mp-3}$ is the index h obtained according to the 2-bit Gray mapping scheme 1;
when mp−2=3, the phase index k obtained from mapping the second segment of bits $d_{2,0}$, $d_{2,1}$, . . . , $d_{2,mp-3}$ is the index h obtained according to the 3-bit Gray mapping scheme 1;

when mp−2=4, the phase index k obtained from mapping the second segment of bits $d_{2,0}$, $d_{2,1}$, . . . , $d_{2,mp-3}$ is the index h obtained according to the 4-bit Gray mapping scheme 1;
when mp−2=5, the phase index k obtained from mapping the second segment of bits $d_{2,0}$, $d_{2,1}$, . . . , $d_{2,mp-3}$ is the index h obtained according to the 5-bit Gray mapping scheme 1; and
when mp−2=6, the phase index k obtained from mapping the second segment of bits $d_{2,0}$, $d_{2,1}$, . . . , $d_{2,mp-3}$ is the index h obtained according to the 6-bit Gray mapping scheme 1.

In the first example of this implementation, the mapping of the ma bits of the third segment is as follows:
when ma=1, the amplitude index i obtained from mapping the third segment of bit(s) $d_{3,0}$, $d_{3,1}$, . . . , $d_{3,ma-1}$ is the index h obtained according to the 1-bit Gray mapping scheme 1;
when ma=2, the amplitude index i obtained from mapping the third segment of bits $d_{3,0}$, $d_{3,1}$, . . . , $d_{3,ma-1}$ is the index h obtained according to the 2-bit Gray mapping scheme 1;
when ma=3, the amplitude index i obtained from mapping the third segment of bits $d_{3,0}$, $d_{3,1}$, . . . , $d_{3,ma-1}$ is the index h obtained according to the 3-bit Gray mapping scheme 1;
when ma=4, the amplitude index i obtained from mapping the third segment of bits $d_{3,0}$, $d_{3,1}$, . . . , $d_{3,ma-1}$ is the index h obtained according to the 4-bit Gray mapping scheme 1;
when ma=5, the amplitude index i obtained from mapping the third segment of bit(s) $d_{3,0}$, $d_{3,1}$, . . . , $d_{3,ma-1}$ is the index h obtained according to the 5-bit Gray mapping scheme 1; and
when ma=6, the amplitude index i obtained from mapping the third segment of bits $d_{3,0}$, $d_{3,1}$, . . . , $d_{3,ma-1}$ is the index h obtained according to the 6-bit Gray mapping scheme 1.

Figure 11A:
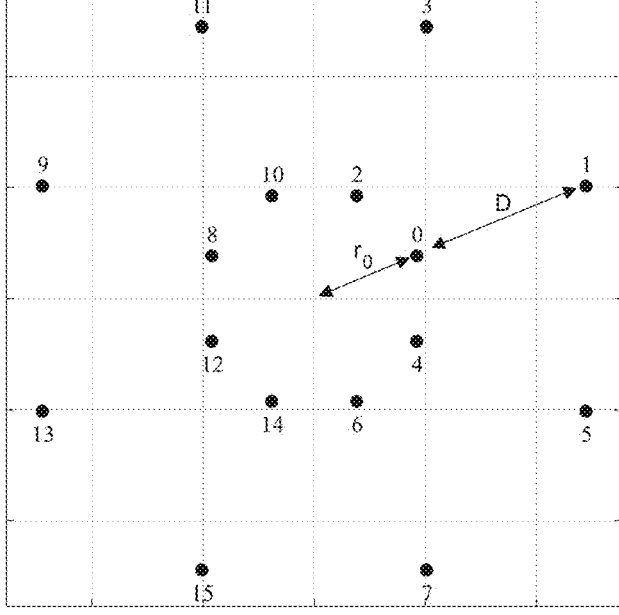
FIGS. 11a-11c are schematic diagrams of modulation mapping with different values of Qm, mp, and ma after determination of 2 sign mapping bits, mp−2 phase mapping bits, and ma amplitude mapping bits in a certain way according to an embodiment in a first example of a fifth exemplary implementation.
Figure 11B:
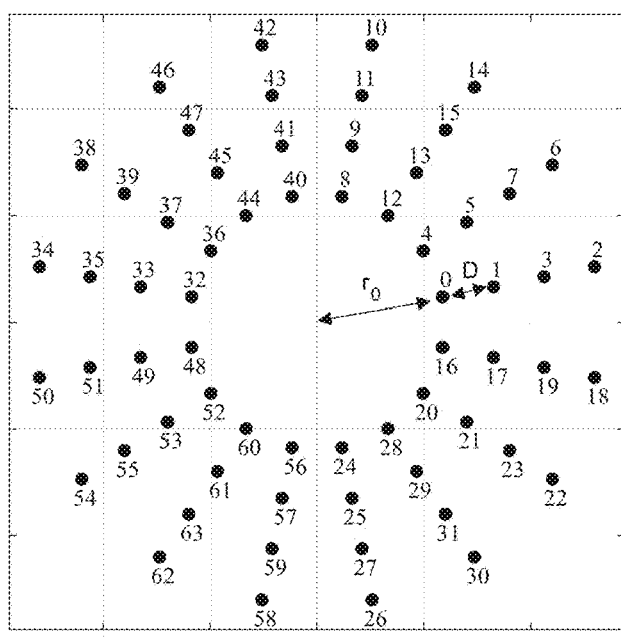
Figure 11C:
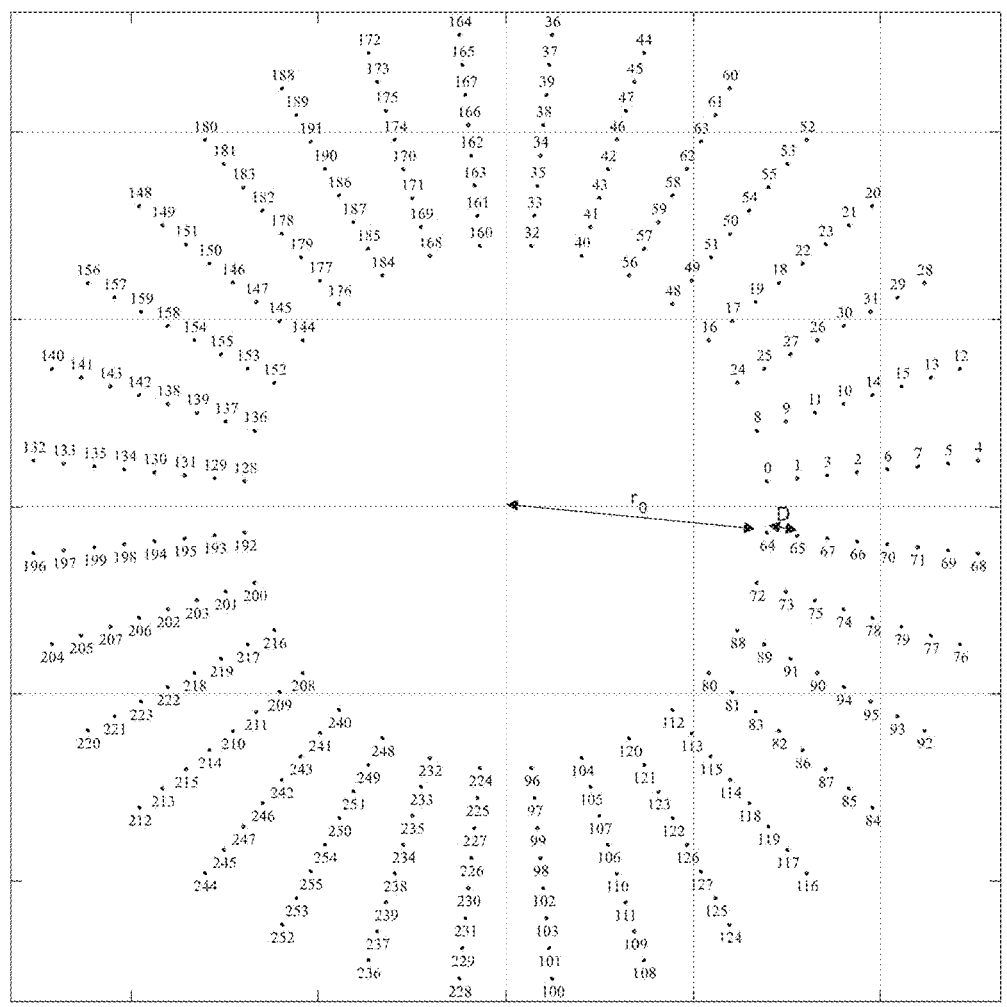

FIGS. 11a-11c respectively show schematic diagrams of modulation mapping with different values of Qm, mp, and ma after determination of 2 sign mapping bits, mp−2 phase mapping bits, and ma amplitude mapping bits in a certain way according to an embodiment in the first example of the fifth exemplary implementation. Specifically, in FIGS. 11a-11c, the 2 sign mapping bits are determined according to Manner E1 in the third exemplary implementation described above, the mp−2 phase mapping bits are determined according to Manner F1 in the third exemplary implementation described above, and the ma amplitude mapping bits are determined according to Manner G1 in the third exemplary implementation described above.

In FIG. 11a, Qm=4, mp=3, ma=1;
in FIG. 11b, Qm=6, mp=4, ma=2; and
in FIG. 11c, Qm=8, mp=5, ma=3.

Figure 12A:
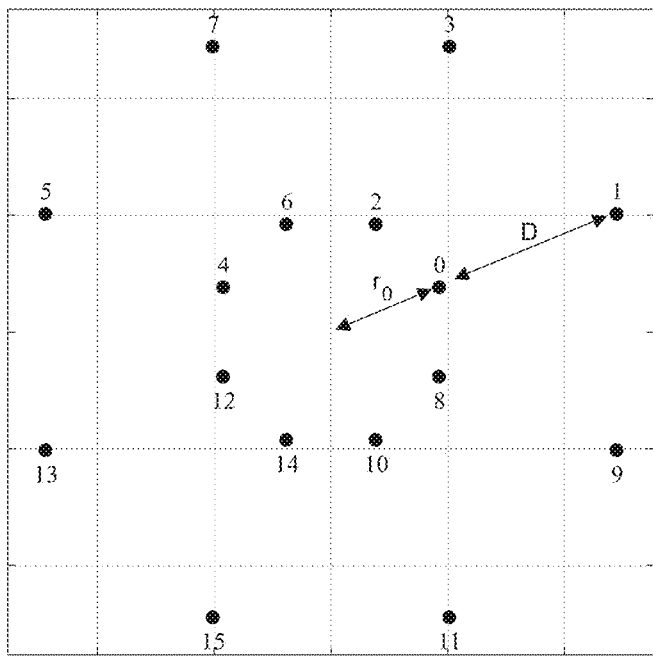
FIGS. 12a-12c are schematic diagrams of modulation mapping with different values of Qm, mp, and ma after determination of 2 sign mapping bits, mp−2 phase mapping bits, and ma amplitude mapping bits in another way according to an embodiment in the first example of the fifth exemplary implementation.
Figure 12B:
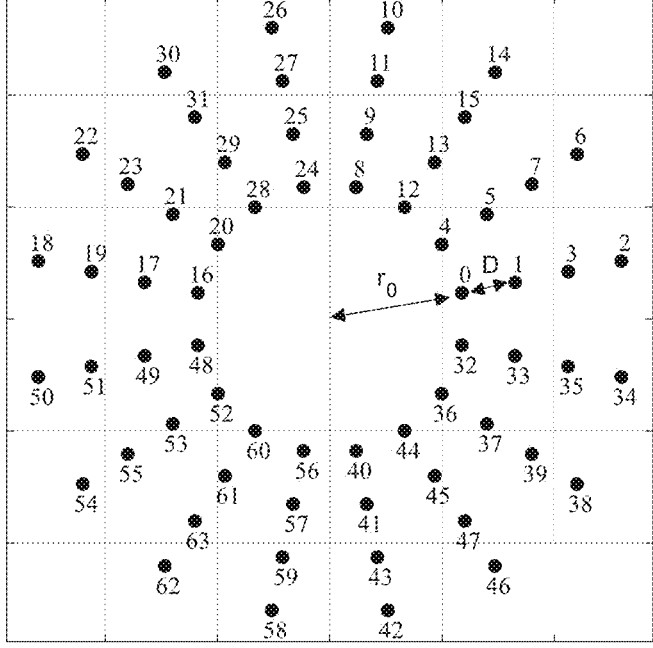
Figure 12C:
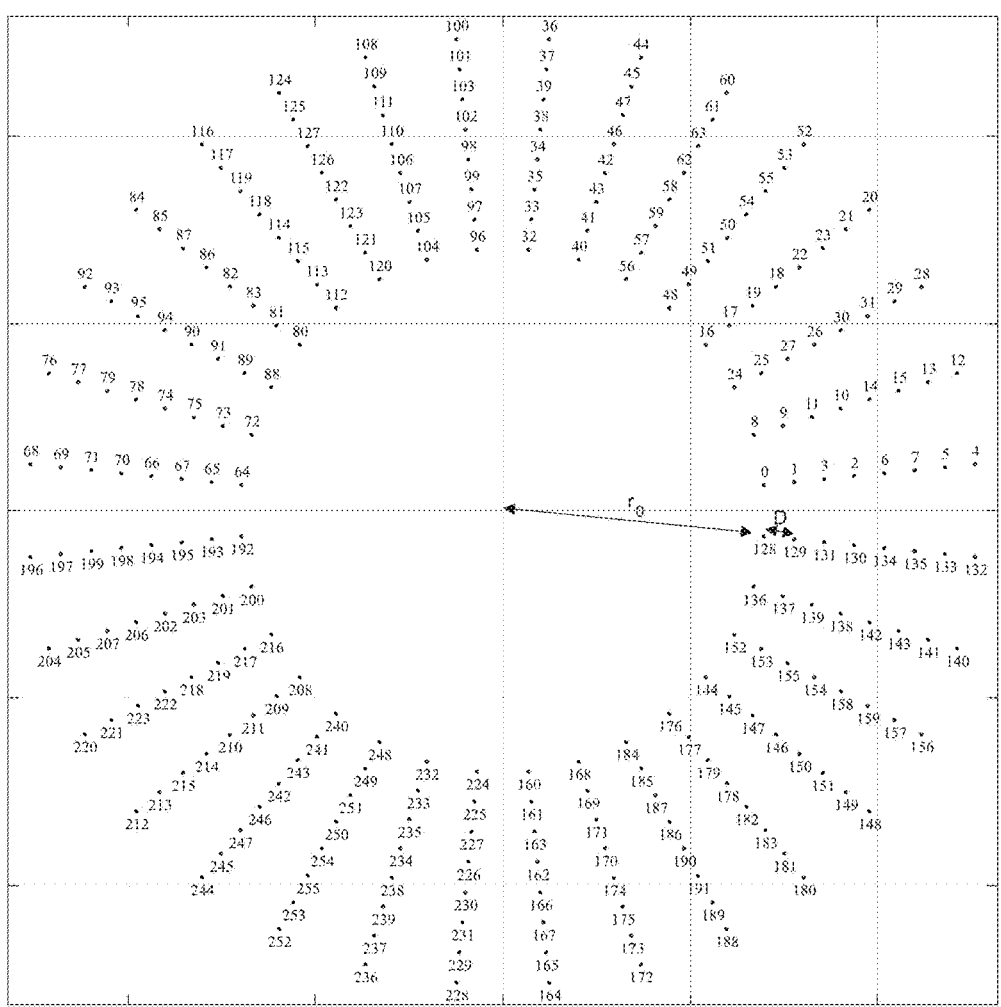

FIGS. 12a-12c respectively show schematic diagrams of modulation mapping with different values of Qm, mp, and ma after determination of 2 sign mapping bits, mp−2 phase mapping bits, and ma amplitude mapping bits in another way according to an embodiment in the first example of the fifth exemplary implementation. Specifically, in FIGS. 12a-12c, the 2 sign mapping bits are determined according to Manner E2 in the third exemplary implementation described above, the mp−2 phase mapping bits are determined according to Manner F1 in the third exemplary implementation described above, and the ma amplitude mapping bits are determined according to Manner G1 in the third exemplary implementation described above.

In FIG. 12*a*, Qm=4, mp=3, ma=1;

in FIG. 12*b*, Qm=6, mp=4, ma=2; and in FIG. 12*c*, Qm=8, mp=5, ma=3.

Figure 13A:
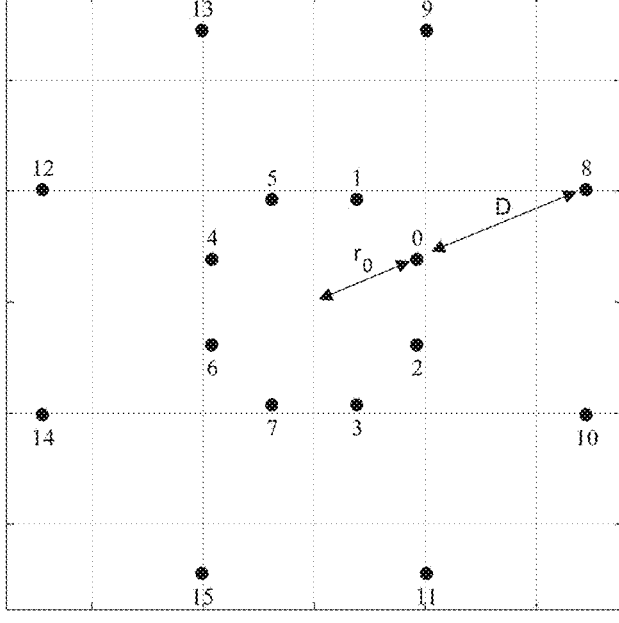
FIGS. 13a-13c are schematic diagrams of modulation mapping with different values of Qm, mp, and ma after determination of 2 sign mapping bits, mp−2 phase mapping bits, and ma amplitude mapping bits in yet another way according to an embodiment in the first example of the fifth exemplary implementation.
Figure 13B:
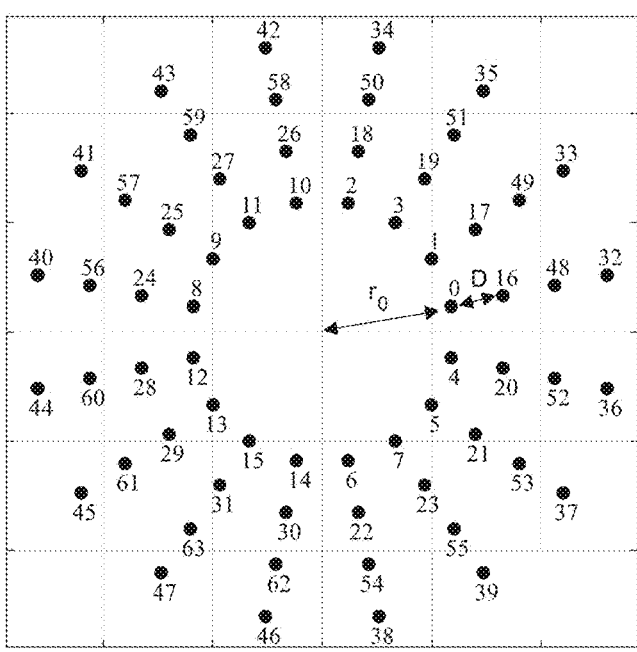
Figure 13C:
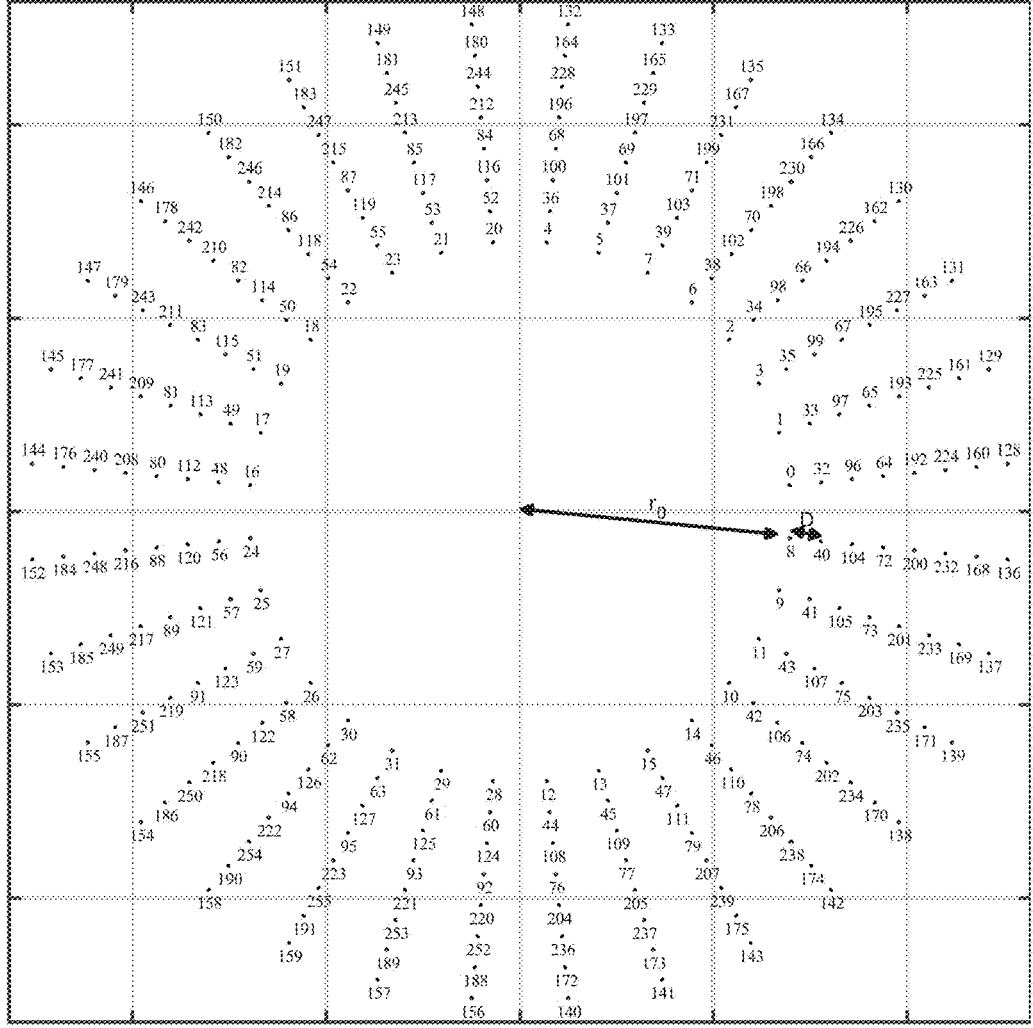

FIGS. 13*a*-13*c* respectively show schematic diagrams of modulation mapping with different values of Qm, mp, and ma after determination of 2 sign mapping bits, mp−2 phase mapping bits, and ma amplitude mapping bits in yet another way according to an embodiment in the first example of the fifth exemplary implementation. Specifically, in FIGS. 13*a*-13*c*, the 2 sign mapping bits are determined according to Manner E3 in the third exemplary implementation described above, the mp−2 phase mapping bits are determined according to Manner F2 in the third exemplary implementation described above, and the ma amplitude mapping bits are determined according to Manner G2 in the third exemplary implementation described above.

In FIG. 13*a*, Qm=4, mp=3, ma=1;

in FIG. 13*b*, Qm=6, mp=4, ma=2; and in FIG. 13*c*, Qm=8, mp=5, ma=3.

Figure 14A:
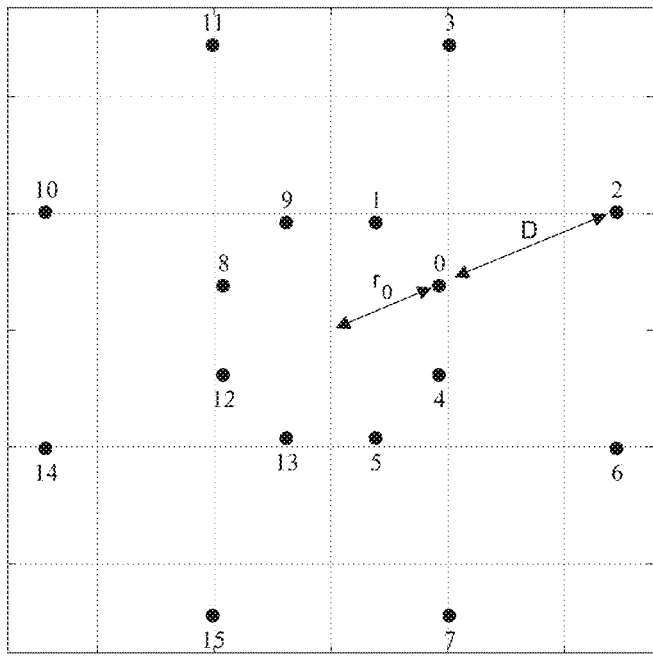
FIGS. 14a-14c are schematic diagrams of modulation mapping with different values of Qm, mp, and ma after determination of 2 sign mapping bits, mp−2 phase mapping bits, and ma amplitude mapping bits in still another way according to an embodiment in the first example of the fifth exemplary implementation.
Figure 14B:
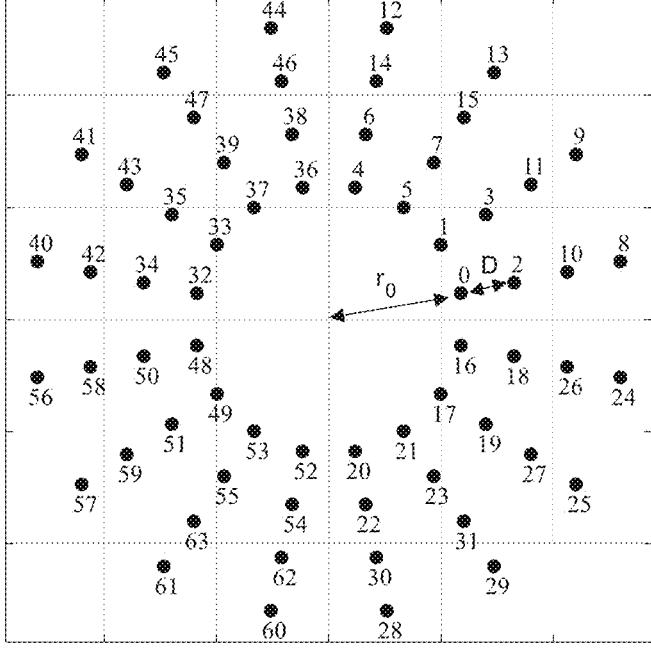
Figure 14C:
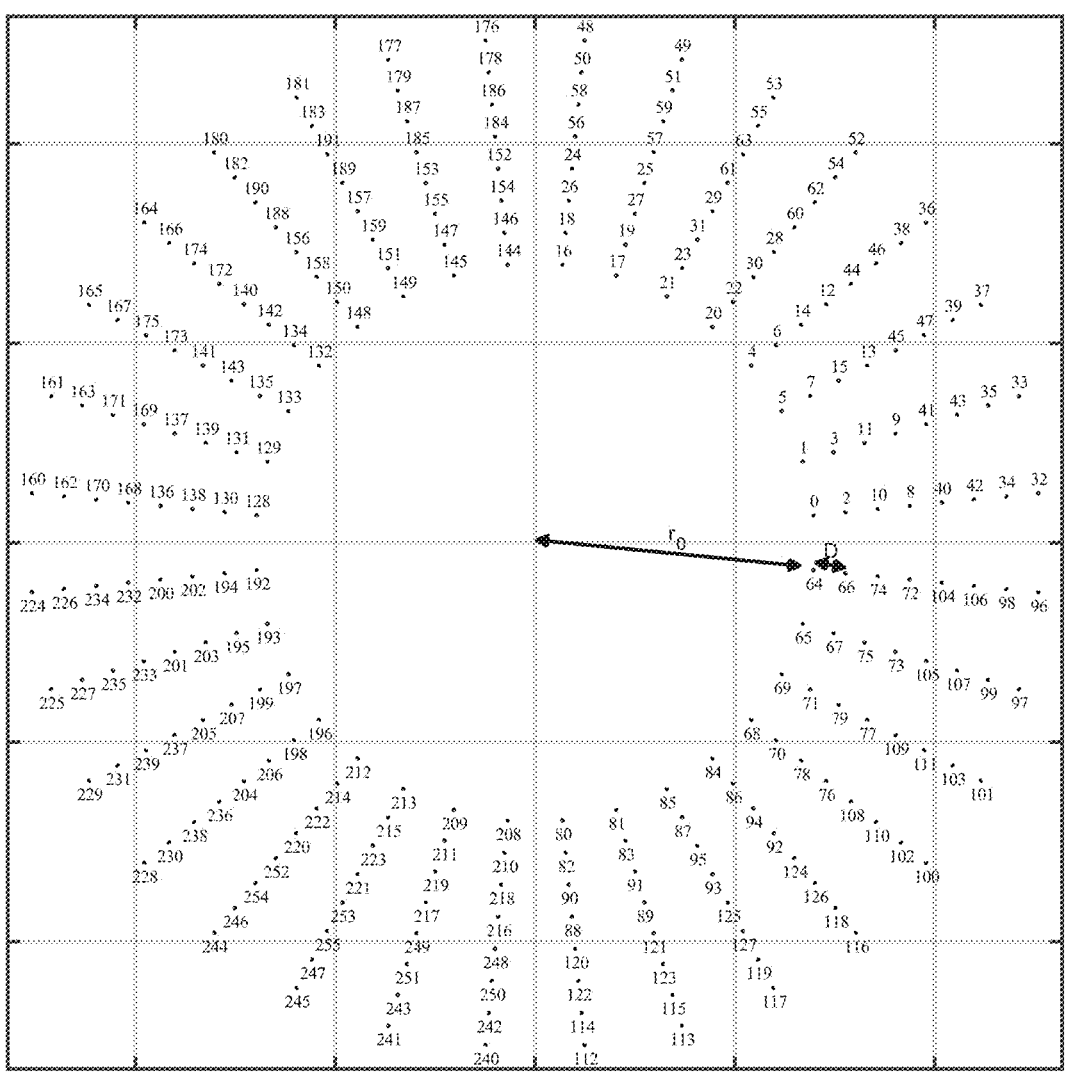

FIGS. 14*a*-14*c* respectively show schematic diagrams of modulation mapping with different values of Qm, mp, and ma after determination of 2 sign mapping bits, mp−2 phase mapping bits, and ma amplitude mapping bits in still another way according to an embodiment in the first example of the fifth exemplary implementation. Specifically, in FIGS. 14*a*-14*c*, the 2 sign mapping bits are determined according to Manner E1 in the third exemplary implementation described above, the mp−2 phase mapping bits are determined according to Manner F3 in the third exemplary implementation described above, and the ma amplitude mapping bits are determined according to Manner G3 in the third exemplary implementation described above.

In FIG. 14*a*, Qm=4, mp=3, ma=1;

in FIG. 14*b*, Qm=6, mp=4, ma=2; and in FIG. 14*c*, Qm=8, mp=5, ma=3.

It should be noted that when the sign mapping bit $d_{1,0}=0$, the real part is positive; when the sign mapping bit $d_{1,0=1}$, the real part is negative; when the sign mapping bit $d_{1,1}=0$, the imaginary part is positive; and when the sign mapping bit $d_{1,1=1}$, the imaginary part is negative. The numbers next to each constellation point in FIGS. 11*a*-11*c*, 12*a*-12*c*, 13*a*-13*c* and 14*a*-14*c* are decimal numbers obtained by converting $b_0, b_1, \ldots, b_{Qm-1}$ according to the formula $$\sum\nolimits_{i=0}^{Qm-1} 2^{Qm-1-i} \cdot b_i.$$

In a second example of this implementation, the mapping of the mp−2 bits of the second segment is as follows:

when mp−2=1, the phase index k obtained from mapping the second segment of bit(s) $d_{2,0}, d_{2,1}, \ldots, d_{2,mp-3}$ is the index h obtained according to the 1-bit Gray mapping scheme 1;

when mp−2=2, the phase index k obtained from mapping the second segment of bits $d_{2,0}, d_{2,1}, \ldots, d_{2,mp-3}$ is the index h obtained according to the 2-bit Gray mapping scheme 2;

when mp−2=3, the phase index k obtained from mapping the second segment of bits $d_{2,0}, d_{2,1}, \ldots, d_{2,mp-3}$ is the index h obtained according to the 3-bit Gray mapping scheme 2;

when mp−2=4, the phase index k obtained from mapping the second segment of bits $d_{2,0}, d_{2,1}, \ldots, d_{2,mp-3}$ is the index h obtained according to the 4-bit Gray mapping scheme 2;

when mp−2=5, the phase index k obtained from mapping the second segment of bits $d_{2,0}, d_{2,1}, \ldots, d_{2,mp-3}$ is the index h obtained according to the 5-bit Gray mapping scheme 2; and when mp−2=6, the phase index k obtained from mapping the second segment of bits $d_{2,0}, d_{2,1}, \ldots, d_{2,mp-3}$ is the index h obtained according to the 6-bit Gray mapping scheme 2.

In the second example of this implementation, the mapping of the ma bits of the third segment is as follows:

when ma=1, the amplitude index i obtained from mapping the third segment of bit(s) $d_{3,0}, d_{3,1}, \ldots, d_{3,ma-1}$ is the index h obtained according to the 1-bit Gray mapping scheme 1;

when ma=2, the amplitude index i obtained from mapping the third segment of bits $d_{3,0}, d_{3,1}, \ldots, d_{3,ma-1}$ is the index h obtained according to the 2-bit Gray mapping scheme 2;

when ma=3, the amplitude index i obtained from mapping the third segment of bits $d_{3,0}, d_{3,1}, \ldots, d_{3,ma-1}$ is the index h obtained according to the 3-bit Gray mapping scheme 2;

when ma=4, the amplitude index i obtained from mapping the third segment of bits $d_{3,0}, d_{3,1}, \ldots, d_{3,ma-1}$ is the index h obtained according to the 4-bit Gray mapping scheme 2;

when ma=5, the amplitude index i obtained from mapping the third segment of bits $d_{3,0}, d_{3,1}, \ldots, d_{3,ma-1}$ is the index h obtained according to the 5-bit Gray mapping scheme 2; and when ma=6, the amplitude index i obtained from mapping the third segment of bits $d_{3,0}, d_{3,1}, \ldots, d_{3,ma-1}$ is the index h obtained according to the 6-bit Gray mapping scheme 2.

Figure 15A:
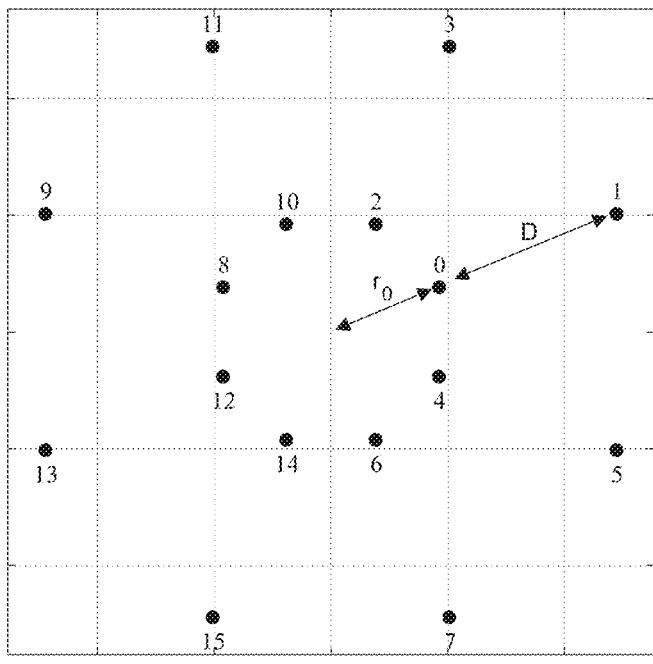
FIGS. 15a-15c are schematic diagrams of modulation mapping with different values of Qm, mp, and ma after determination of 2 sign mapping bits, mp−2 phase mapping bits, and ma amplitude mapping bits in a certain way according to an embodiment in a second example of the fifth exemplary implementation.
Figure 15B:
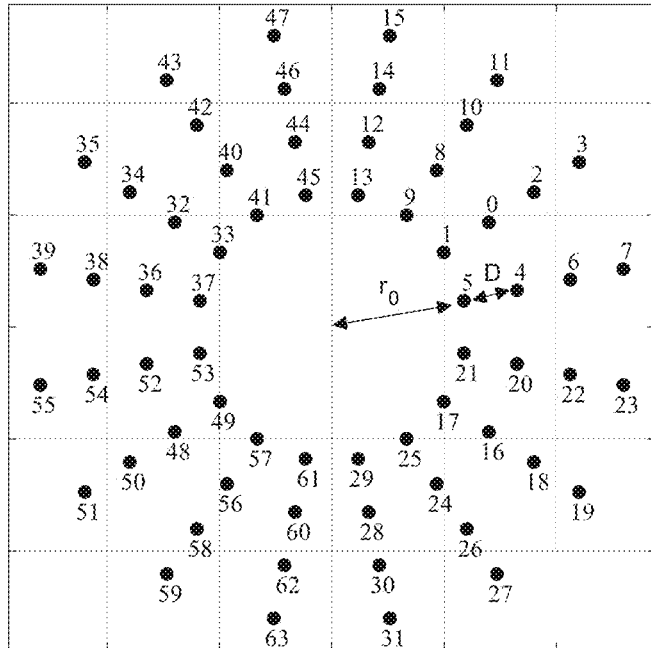
Figure 15C:
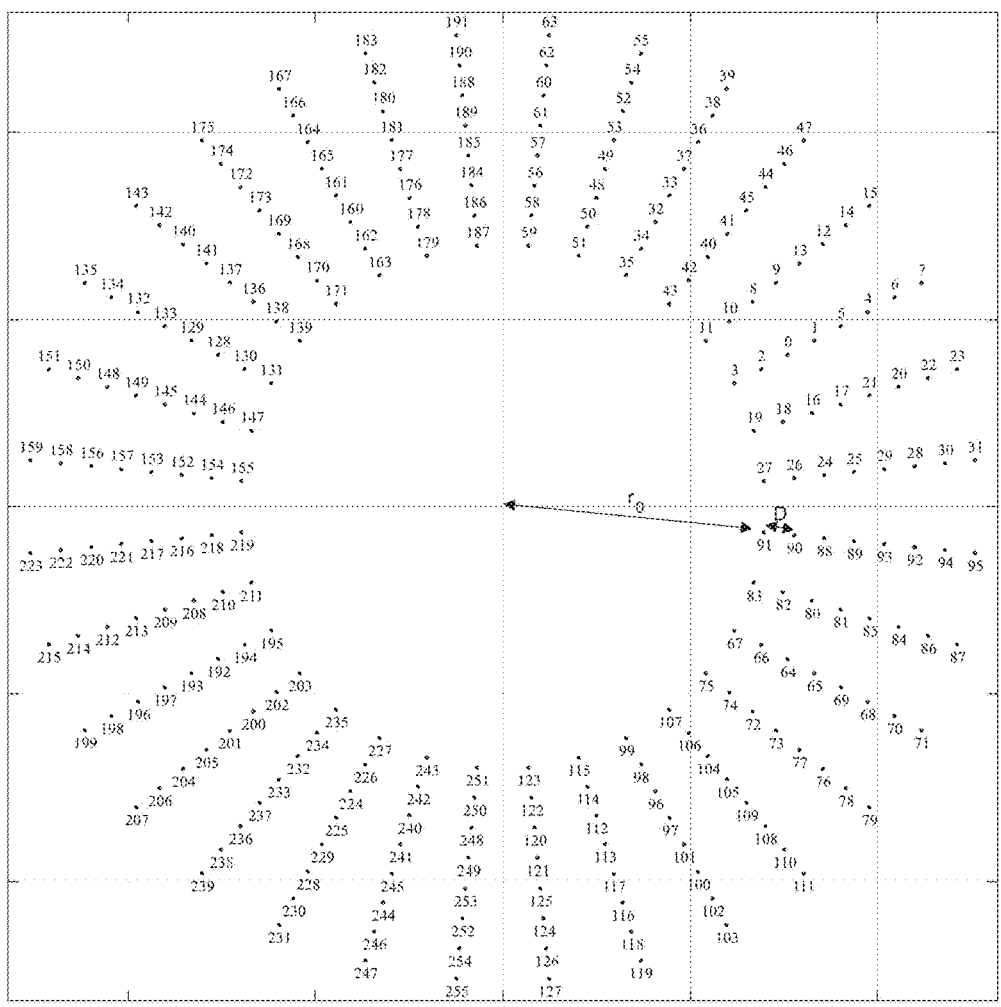

FIGS. 15*a*-15*c* respectively show schematic diagrams of modulation mapping with different values of Qm, mp, and ma after determination of 2 sign mapping bits, mp−2 phase mapping bits, and ma amplitude mapping bits in a certain way according to an embodiment in the second example of the fifth exemplary implementation. Specifically, in FIGS. 15*a*-15*c*, the 2 sign mapping bits are determined according to Manner E1 in the third exemplary implementation described above, the mp−2 phase mapping bits are determined according to Manner F1 in the third exemplary implementation described above, and the ma amplitude mapping bits are determined according to Manner G1 in the third exemplary implementation described above.

In FIG. 15*a*, Qm=4, mp=3, ma=1;

in FIG. 15*b*, Qm=6, mp=4, ma=2; and in FIG. 15*c*, Qm=8, mp=5, ma=3.

Figure 16A:
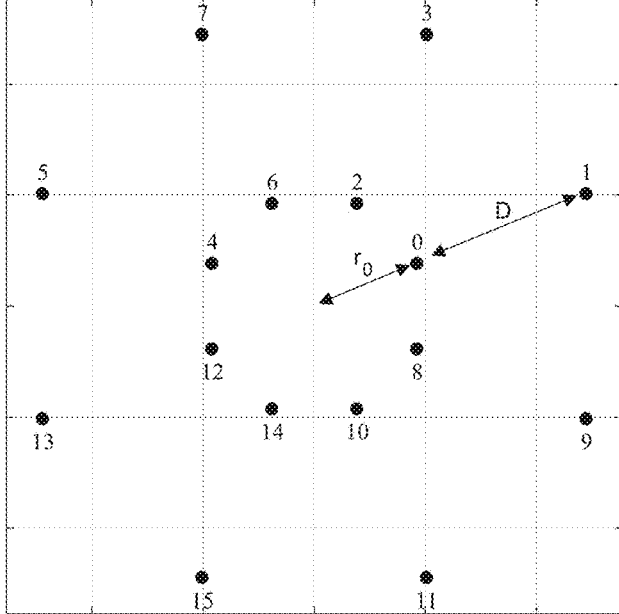
FIGS. 16a-16c are schematic diagrams of modulation mapping with different values of Qm, mp, and ma after determination of 2 sign mapping bits, mp−2 phase mapping bits, and ma amplitude mapping bits in another way according to an embodiment in the second example of the fifth exemplary implementation.
Figure 16B:
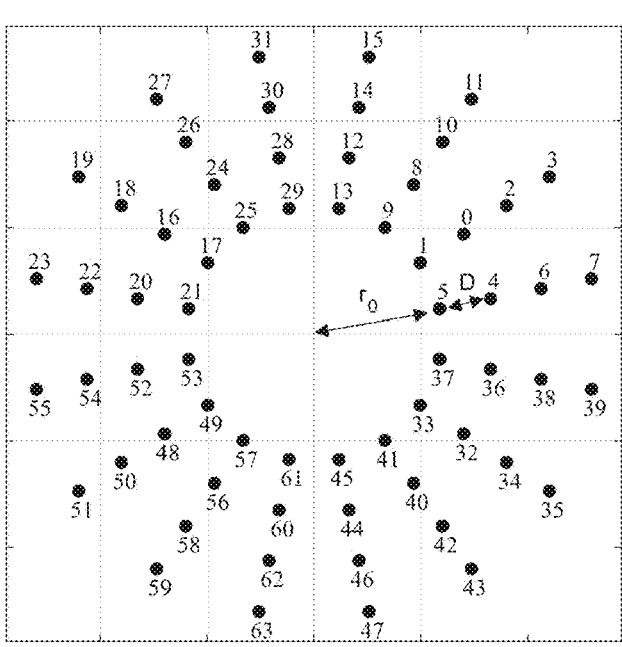
Figure 16C:
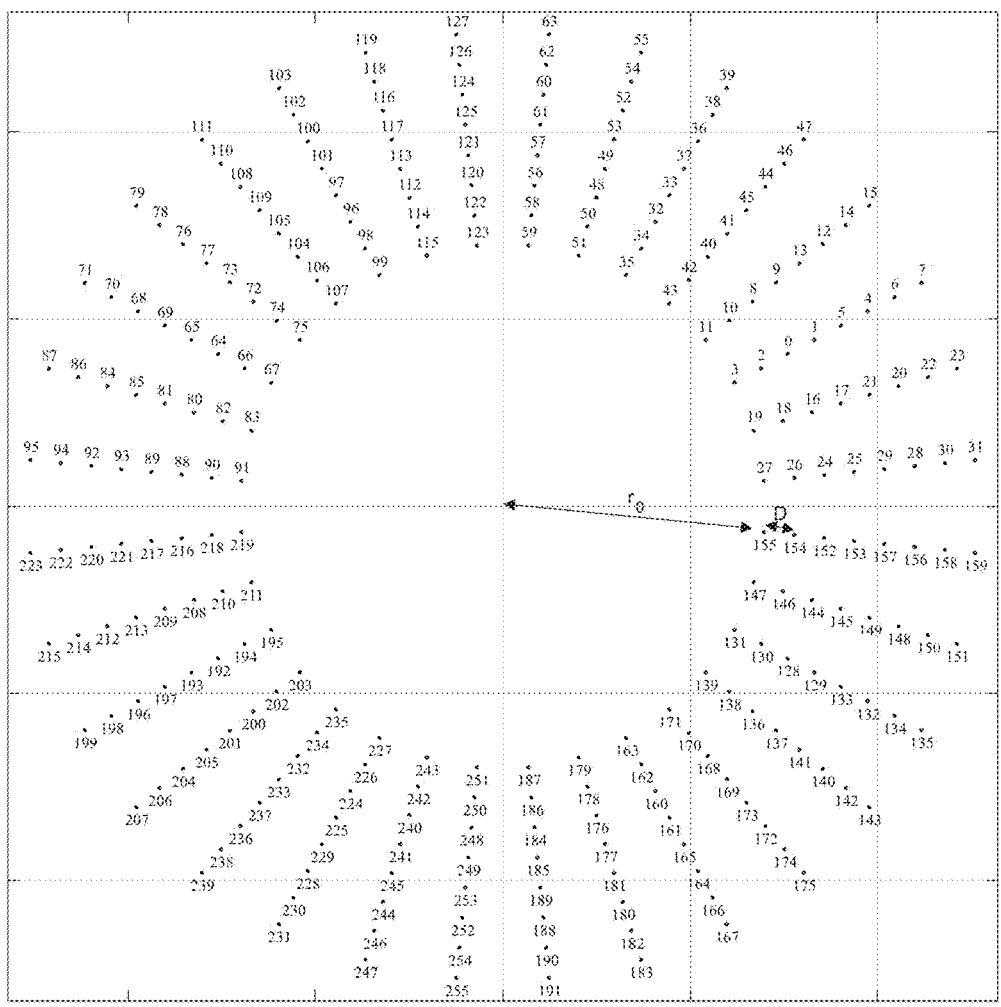

FIGS. 16*a*-16*c* respectively show schematic diagrams of modulation mapping with different values of Qm, mp, and ma after determination of 2 sign mapping bits, mp−2 phase mapping bits, and ma amplitude mapping bits in another way according to an embodiment in the second example of the fifth exemplary implementation. Specifically, in FIGS. 16*a*-16*c*, the 2 sign mapping bits are determined according to Manner E2 in the third exemplary implementation described above, the mp−2 phase mapping bits are determined according to Manner F1 in the third exemplary implementation described above, and the ma amplitude mapping bits are determined according to Manner G1 in the third exemplary implementation described above.

In FIG. 16*a*, Qm=4, mp=3, ma=1;

in FIG. 16*b*, Qm=6, mp=4, ma=2; and in FIG. 16*c*, Qm=8, mp=5, ma=3.

Figure 17A:
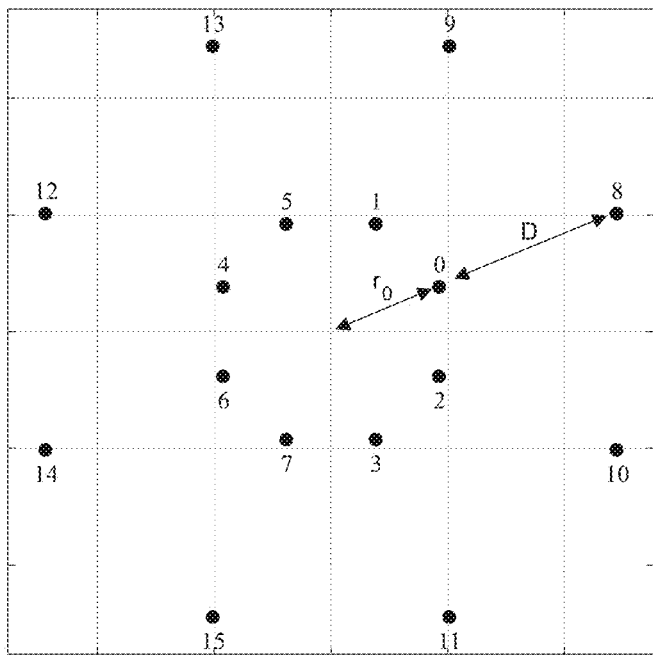
FIGS. 17a-17c are schematic diagrams of modulation mapping with different values of Qm, mp, and ma after determination of 2 sign mapping bits, mp−2 phase mapping bits, and ma amplitude mapping bits in yet another way according to an embodiment in the second example of the fifth exemplary implementation.
Figure 17B:
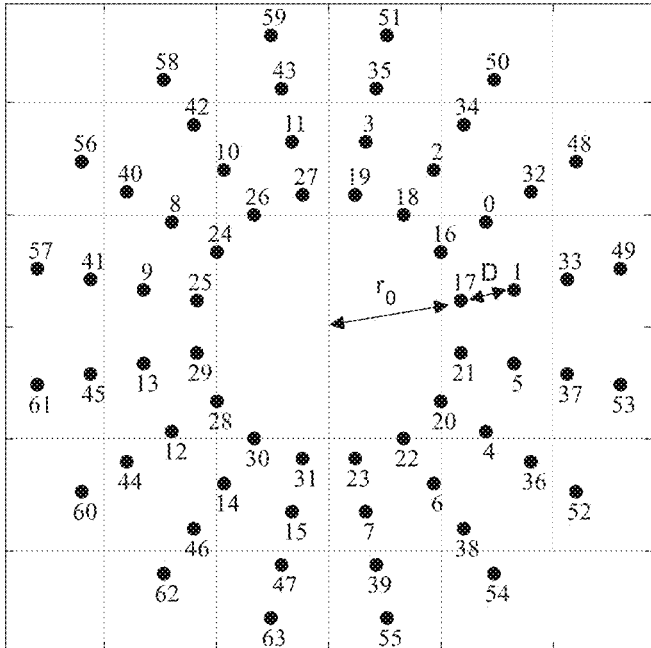
Figure 17C:
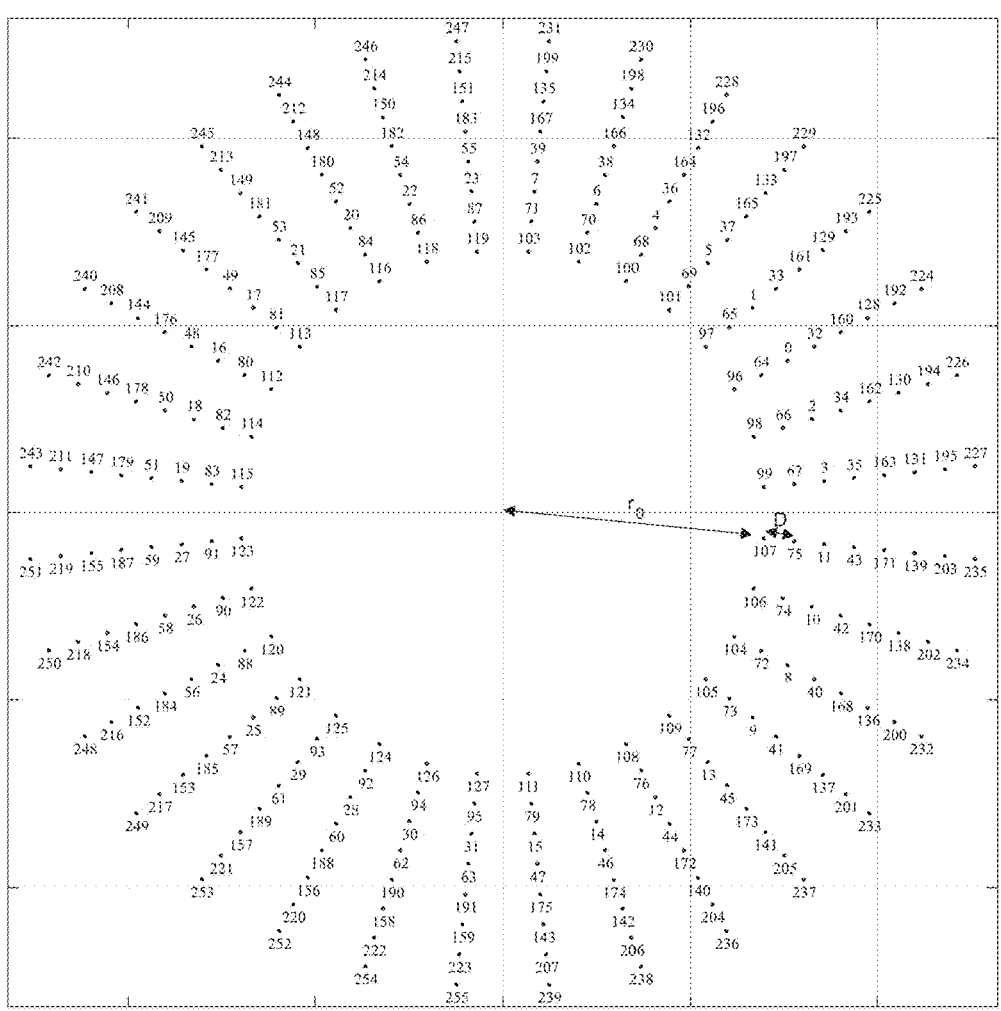

FIGS. 17a-17c respectively show schematic diagrams of modulation mapping with different values of Qm, mp, and ma after determination of 2 sign mapping bits, mp−2 phase mapping bits, and ma amplitude mapping bits in yet another way according to an embodiment in the second example of the fifth exemplary implementation. Specifically, in FIGS. 17a-17c, the 2 sign mapping bits are determined according to Manner E3 in the third exemplary implementation described above, the mp−2 phase mapping bits are determined according to Manner F2 in the third exemplary implementation described above, and the ma amplitude mapping bits are determined according to Manner G2 in the third exemplary implementation described above.

In FIG. 17a, Qm=4, mp=3, ma=1;

in FIG. 17b, Qm=6, mp=4, ma=2; and in FIG. 17c, Qm=8, mp=5, ma=3.

Figure 18A:
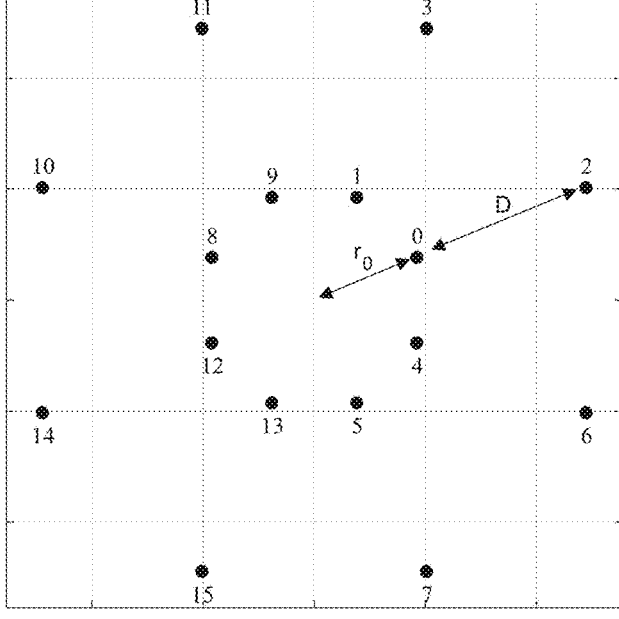
FIGS. 18a-18c are schematic diagrams of modulation mapping with different values of Qm, mp, and ma after determination of 2 sign mapping bits, mp−2 phase mapping bits, and ma amplitude mapping bits in still another way according to an embodiment in the second example of the fifth exemplary implementation.
Figure 18B:
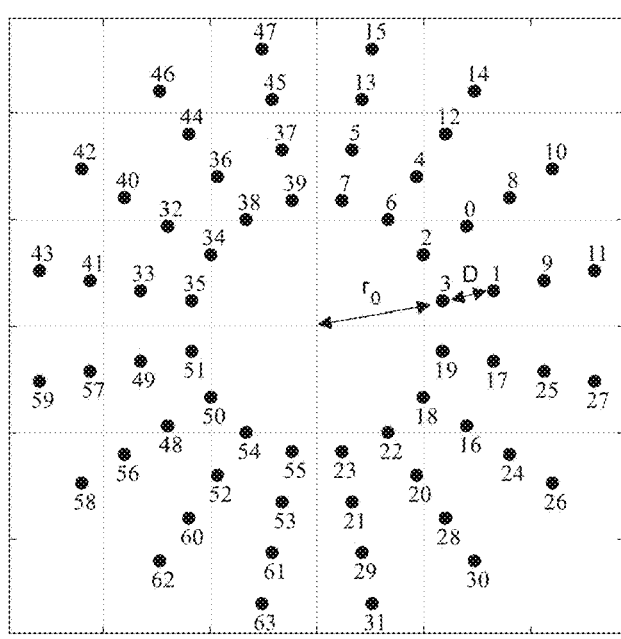
Figure 18C:
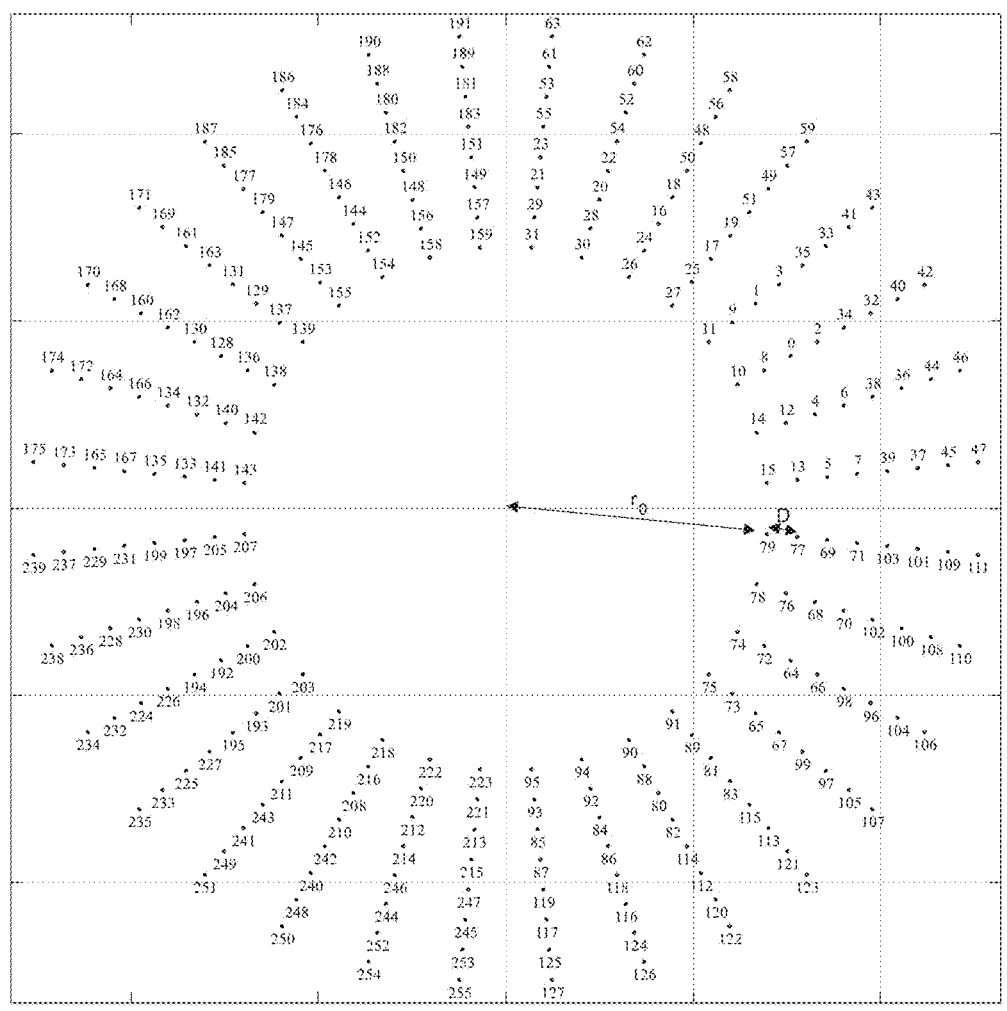

FIGS. 18a-18c respectively show schematic diagrams of modulation mapping with different values of Qm, mp, and ma after determination of 2 sign mapping bits, mp−2 phase mapping bits, and ma amplitude mapping bits in still another way according to an embodiment in the second example of the fifth exemplary implementation. Specifically, in FIGS. 18a-18c, the 2 sign mapping bits are determined according to Manner E1 in the third exemplary implementation described above, the mp−2 phase mapping bits are determined according to Manner F3 in the third exemplary implementation described above, and the ma amplitude mapping bits are determined according to Manner G3 in the third exemplary implementation described above.

In FIG. 18a, Qm=4, mp=3, ma=1;

in FIG. 18b, Qm=6, mp=4, ma=2; and in FIG. 18c, Qm=8, mp=5, ma=3.

It should be noted that when the sign mapping bit $d_{1,0}=0$, the real part is positive; when the sign mapping bit $d_{1,0}=1$, the real part is negative; when the sign mapping bit $d_{1,1}=0$, the imaginary part is positive; and when the sign mapping bit $d_{1,1}=1$, the imaginary part is negative. The numbers next to each constellation point in FIGS. 15a-15c, 16a-16c, 17a-17c and 18a-18c are decimal numbers obtained by converting $b_0, b_1, \ldots, b_{Qm-1}$ according to the formula $$\sum\nolimits_{i=0}^{Qm-1} 2^{Qm-1-i} \cdot b_i.$$

In a sixth exemplary implementation, there is provided an explanation of the characteristics of the bit sequence to be modulated.

In an embodiment, a bit sequence $e_0, e_1, e_2, \ldots, e_{E-1}$ of a transport block is interleaved into a bit sequence $f_0, f_1, f_2, \ldots, f_{E-1}$ according to the following method.

```
for j = 0 to E/Qm−1
    for i = 0 to Qm−1
        f_{i+j·Qm} = e_{i·E/Qm+j}
    end
end for
```

The aforementioned interleaving process arranges the bit sequence $e_0, e_1, e_2, \ldots, e_{E-1}$ in a row-by-row fashion into a matrix with Qm rows and E/Qm columns. Then, the corresponding elements are mapped one-to-one to the bit sequence $f_0, f_1, f_2, \ldots, f_{E-1}$ which is arranged in a column-by-column fashion into a matrix with Qm rows and E/Qm columns.

For example, if Qm=4 and E=24, the aforementioned bit interleaving process can be represented using a matrix as follows:

$$\begin{bmatrix} f_0 & f_4 & f_8 & f_{12} & f_{16} & f_{20} \\ f_1 & f_5 & f_9 & f_{13} & f_{17} & f_{21} \\ f_2 & f_6 & f_{10} & f_{14} & f_{18} & f_{22} \\ f_3 & f_7 & f_{11} & f_{15} & f_{19} & f_{23} \end{bmatrix} = \begin{bmatrix} e_o & e_1 & e_2 & e_3 & e_4 & e_5 \\ e_6 & e_7 & e_8 & e_9 & e_{10} & e_{11} \\ e_{12} & e_{13} & e_{14} & e_{15} & e_{16} & e_{17} \\ e_{18} & e_{19} & e_{20} & e_{21} & e_{22} & e_{23} \end{bmatrix}.$$

In an embodiment, the first K bits of a bit sequence $e_0, e_1, e_2, \ldots, e_{E-1}$ from a transport block are input bits of channel coding, where 0<K<E.

In an embodiment, the first m bits or the first m−1 bits of the Qm bits $f_{k \cdot Qm}, f_{1+k \cdot Qm}, f_{2+k \cdot Qm}, \ldots, f_{Qm-1+k \cdot Qm}$ in the bit sequence $f_0, f_1, f_2, \ldots, f_{E-1}$ are input bits of channel coding, where 1≤m<Qm, and k=0, 1, 2, . . . , E/Qm−1.

For example, if Qm=4, E=24, K=14, then m=3, and when k=0, 1, the first m=3 bits of the Qm bits $f_{k \cdot Qm}, f_{1+k \cdot Qm}, f_{2+k \cdot Qm}, \ldots, f_{Qm-1+k \cdot Qm}$ in the bit sequence $f_0, f_1, f_2, \ldots, f_{E-1}$ are input bits of channel coding; and when k=2, 3, 4, 5, the first m−1=2 bits of the Qm bits $f_{k \cdot Qm}, f_{1+k \cdot Qm}, f_{2+k \cdot Qm}, \ldots f_{Qm-1+k \cdot Qm}$ in the bit sequence $f_0, f_1, f_2, \ldots, f_{E-1}$ are input bits of channel coding.

In an embodiment, at least the first m bits of the Qm bits $f_{k \cdot Qm}, f_{1+k \cdot Qm}, f_{2+k \cdot Qm}, \ldots, f_{Qm-1+k \cdot Qm}$ in the bit sequence $f_0, f_1, f_2, \ldots, f_{E-1}$ are input bits of channel coding, where m=floor (K/(E/Qm)), k=0, 1, 2, . . . , E/Qm−1, and floor represents the floor function, which rounds down to the nearest integer.

For example, if Qm=4, E=24, and K=14, then m=floor (14/(24/4))=2.

An embodiment of the present disclosure provides a data transmission method, including: acquiring a first bit sequence $f_0, f_1, f_2, \ldots, f_{E-1}$; mapping every Qm bits in the first bit sequence $f_0, f_1, f_2, \ldots, f_{E-1}$ to one complex-valued modulation symbol based on a regular amplitude phase shift keying (RAPSK) constellation to obtain a symbol sequence $x_0, x_1, x_2, \ldots, x_{E/Qm-1}$, where E denotes a length of the first bit sequence and is a positive integer, Qm denotes a modulation order of RAPSK modulation, and the RAPSK constellation has $2^{Qm}$ constellation points; and transmitting the symbol sequence $x_0, x_1, x_2, \ldots, x_{E/Qm-1}$ to a second communication node. Compared to the current 5G technology, the present disclosure combines RAPSK constellation with Gray mapping to achieve Gray mapped RAPSK. By designing the constellation point coordinates, the mapping from bits to constellation points (also known as modulation mapping), and bit interleaving, it enables a reduction in the required receiver signal-to-noise ratio for achieving the same block error rate under the same transmission spectral efficiency conditions, compared to QAM constellation signaling. Furthermore, as the modulation order increases, the reduction in required receiver signal-to-noise ratio becomes more significant. Furthermore, the constellations involved in the present disclosure utilize a low-complexity max-log demodulation algorithm that is well-suited for high-speed transmission in future cellular communications.

Figure 19:
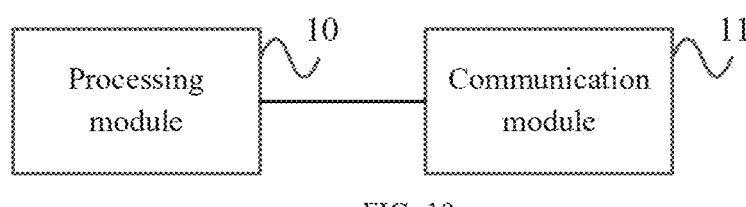
FIG. 19 is a schematic diagram of a data transmission apparatus according to an embodiment.

FIG. 19 shows a schematic diagram of a data transmission apparatus according to an embodiment. The apparatus can be configured in a base station or a UE. As shown in FIG. 19, the apparatus includes: a processing module 10 and a communication module 11.

The processing module 10 is configured to acquire a first bit sequence $f_0, f_1, f_2, \ldots, f_{E-1}$; and map every Qm bits in the first bit sequence $f_0, f_1, f_2, \ldots, f_{E-1}$ to one complex-valued modulation symbol based on a regular amplitude phase shift keying (RAPSK) constellation to obtain a symbol sequence $x_0$, $x_1$, $x_2$, . . . , $x_{E/Qm-1}$, where E denotes a length of the first bit sequence and is a positive integer, Qm denotes a modulation order of RAPSK modulation, and the RAPSK constellation has $2^{Qm}$ constellation points.

The communication module 11 is configured to transmit the symbol sequence $x_0$, $x_1$, $x_2$, . . . , $x_{E/Qm-1}$ to a second communication node.

The data transmission apparatus provided by this embodiment is configured to implement the data transmission method of the embodiment shown in FIG. 1. The implementation principle and technical effect of the data transmission apparatus according to this embodiment are similar to those of the above embodiment, and therefore, details are not repeated herein again.

In an embodiment, the RAPSK constellation includes at least one of the following features:

all the constellation points in the RAPSK constellation are located on $Na=2^{ma}$ concentric circles, where ma denotes a number of amplitude mapping bits, and $ma=Qm/2-1$;

all the constellation points in the RAPSK constellation are located on $Na=2^{ma}$ concentric circles, and there are $Np=2^{mp}$ constellation points on each concentric circle, where ma denotes a number of amplitude mapping bits, mp denotes a number of phase mapping bits, and $mp=Qm-ma$;

there are $Np=2^{mp}$ constellation points on each concentric circle of the RAPSK constellation, where mp denotes a number of phase mapping bits, and $mp=Qm/2+1$;

all the constellation points in the RAPSK constellation are located on $Na=2^{ma}$ concentric circles, and a concentric circle labeled i has a radius of $r_i=r_0+i\cdot D$, where i=0, 1, . . . , Na−1, ma denotes a number of amplitude mapping bits, $r_0$ denotes a minimum radius, D denotes an interval between adjacent concentric circles, and $r_0$ has a value range which is a function of Qm; or all the constellation points in the RAPSK constellation are located on $Na=2^{ma}$ concentric circles, and a concentric circle labeled i has a radius of $r_i=r_0+i\cdot D$, where i=0, 1, . . . , Na−1, ma denotes a number of amplitude mapping bits, $r_0$ denotes a minimum radius, D denotes an interval between adjacent concentric circles, and D has a value range which is a function of Qm.

In an embodiment, every Qm bits $[f_{k\cdot Qm}, f_{1+k\cdot Qm}, f_{2+k\cdot Qm}, . . . , f_{Qm-1+k\cdot Qm}]=[b_0, b_1, . . . , b_{Qm-1}]$ in the first bit sequence $f_0$, $f_1$, $f_2$, . . . , $f_{E-1}$ are mapped to one complex-valued modulation symbol $x_k=x$, where k=0, 1, . . . , E/Qm−1; and the mp phase mapping bits $c_{1,0}$, $c_{1,1}$, . . . , $c_{1,mp-1}$ are determined in any one of the following manners:

the phase mapping bits $c_{1,0}$, $c_{1,1}$, . . . , $c_{1,mp-1}$ are the first mp bits of the Qm bits $b_0$, $b_1$, . . . , $b_{Qm-1}$;

the phase mapping bits $c_{1,0}$, $c_{1,1}$, . . . , $c_{1,mp-1}$ are the first mp bits of the Qm bits $b_0$, $b_1$, . . . , $b_{Qm-1}$ with positions of the bits $b_0$ and $b_1$ exchanged;

the phase mapping bits $c_{1,0}$, $c_{1,1}$, . . . , $c_{1,mp-1}$ are the last mp bits of the Qm bits $b_0$, $b_1$, . . . , $b_{Qm-1}$; or the phase mapping bits $c_{1,0}$, $c_{1,1}$, . . . , $c_{1,mp-1}$ are the first 2 bits and the odd-indexed bits in the last Qm−2 bits of the Qm bits $b_0$, $b_1$, . . . , $b_{Qm-1}$.

In an embodiment, every Qm bits $[f_{k\cdot Qm}, f_{1+k\cdot Qm}, f_{2+k\cdot Qm}, . . . , f_{Qm-1+k\cdot Qm}]=[b_0, b_1, . . . , b_{Qm-1}]$ in the first bit sequence $f_0$, $f_1$, $f_2$, . . . , $f_{E-1}$ are mapped to one complex-valued modulation symbol $x_k=x$, where k=0, 1, . . . , E/Qm−1; and the ma amplitude mapping bits $c_{2,0}$, $c_{2,1}$, . . . , $c_{2,ma-1}$ are determined in any one of the following manners:

the amplitude mapping bits $c_{2,0}$, $c_{2,1}$, . . . , $c_{2,ma-1}$ are the last ma bits of the Qm bits $b_0$, $b_1$, . . . , $b_{Qm-1}$;

the amplitude mapping bits $c_{2,0}$, $c_{2,1}$, . . . , $c_{2,ma-1}$ are the first ma bits of the Qm bits $b_0$, $b_1$, . . . , $b_{Qm-1}$; or the amplitude mapping bits $c_{2,0}$, $c_{2,1}$, . . . , $c_{2,ma-1}$ are the even-indexed bits in the last Qm−2 bits of the Qm bits $b_0$, $b_1$, . . . , $b_{Qm-1}$.

In an embodiment, every Qm bits $[f_{k\cdot Qm}, f_1+k\cdot Qm, f_2+k\cdot Qm, . . . , f_{Qm-1+k\cdot Qm}]=[b_0, b_1, . . . , b_{Qm-1}]$ in the first bit sequence $f_0$, $f_1$, $f_2$, . . . , $f_{E-1}$ are mapped to one complex-valued modulation symbol $x_k=x$, where k=0, 1, . . . , E/Qm−1;

the Qm bits of one complex-valued modulation symbol x include a first segment of bits, a second segment of bits, and a third segment of bits; and the first segment of bits includes two sign mapping bits $d_{1,0}$ and $d_{1,1}$, the second segment of bits includes mp−2 bits $d_{2,0}$, $d_{2,1}$, . . . , $d_{2,mp-3}$, and the third segment of bits include ma=Qm−mp bits $d_{3,0}$, $d_{3,1}$, . . . , $d_{3,ma-1}$, where 2≤mp<Qm.

In an embodiment, the first segment of bits $d_{1,0}$ and $d_{1,1}$ are determined in any one of the following manners:

the first segment of bits $d_{1,0}$ and $d_{1,1}$ are the first 2 bits of the Qm bits $b_0$, $b_1$, . . . , $b_{Qm-1}$;

the first segment of bits $d_{1,0}$ and $d_{1,1}$ are the first 2 bits of the Qm bits $b_0$, $b_1$, . . . , $b_{Qm-1}$ with positions of the bits $b_0$ and $b_1$ exchanged; or the first segment of bits $d_{1,0}$ and $d_{1,1}$ are the two bits with indexes ma and ma+1 in the Qm bits $b_0$, $b_1$, . . . , $b_{Qm-1}$.

In an embodiment, the second segment of bits $d_{2,0}$, $d_{2,1}$, . . . , $d_{2,mp-3}$ are determined in any one of the following manners:

the second segment of bits $d_{2,0}$, $d_{2,1}$, . . . , $d_{2,mp-3}$ are the bits with indexes from 2 to mp−1 in the Qm bits $b_0$, $b_1$, . . . , $b_{Qm-1}$;

the second segment of bits $d_{2,0}$, $d_{2,1}$, . . . , $d_{2,mp-3}$ are the last mp−2 bits of the Qm bits $b_0$, $b_1$, . . . , $b_{Qm-1}$; or the second segment of bits $d_{2,0}$, $d_{2,1}$, . . . , $d_{2,mp-3}$ are the odd-indexed bits in the last Qm−2 bits of the Qm bits $b_0$, $b_1$, . . . , $b_{Qm-1}$.

In an embodiment, the third segment of bits $d_{3,0}$, $d_{3,1}$, . . . , $d_{3,ma-1}$ are determined in any one of the following manners:

the third segment of bits $d_{3,0}$, $d_{3,1}$, . . . , $d_{3,ma-1}$ are the last ma bits of the Qm bits $b_0$, $b_i$, . . . , $b_{Qm-1}$;

the third segment of bits $d_{3,0}$, $d_{3,1}$, . . . , $d_{3,ma-1}$ are the first ma bits of the Qm bits $b_0$, $b_1$, . . . , $b_{Qm-1}$; or the third segment of bits $d_{3,0}$, $d_{3,1}$, . . . , $d_{3,ma-1}$ are the even-indexed bits in the last Qm−2 bits of the Qm bits $b_0$, $b_1$, . . . , $b_{Qm-1}$.

In an embodiment, in a case where mp or ma is greater than 1, mp phase mapping bits $c_{1,0}$, $c_{1,1}$, . . . , $c_{1,mp-1}$ and ma amplitude mapping bits $c_{2,0}$, $c_{2,1}$, . . . , $c_{2,ma-1}$ use the same Gray mapping scheme.

In an embodiment, in a case where mp−2 or ma is greater than 1, mp−2 bits $d_{2,0}$, $d_{2,1}$, . . . , $d_{2,mp-3}$ and ma bits $d_{3,0}$, $d_{3,1}$, . . . , $d_{3,ma-1}$ use the same Gray mapping scheme.

In an embodiment, the processing module 10 is configured to acquire a second bit sequence $e_0$, $e_1$, $e_2$, . . . , $e_{E-1}$ from a transport block; and subject the second bit sequence $e_0$, $e_1$, $e_2$, . . . , $e_{E-1}$ to bit interleaving to obtain the first bit sequence $f_0$, $f_1$, $f_2$, . . . , $f_{E-1}$.

In an embodiment, the first K bits of the second bit sequence $e_0$, $e_1$, $e_2$, . . . , $e_{E-1}$ are input bits of channel coding, where $0<K<E$.

Figure 20:
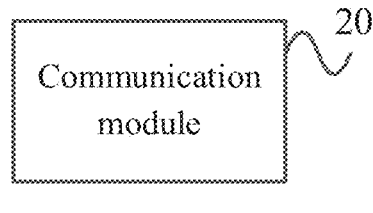
FIG. 20 is a schematic diagram of another data transmission apparatus according to an embodiment.

FIG. 20 shows a schematic diagram of another data transmission apparatus according to an embodiment. The apparatus can be configured in a UE or a base station. As shown in FIG. 20, the apparatus includes: a communication module 20.

The communication module 20 is configured to receive a symbol sequence $x_0$, $x_1$, $x_2$, . . . , $x_{E/Qm-1}$ transmitted by a first communication node, the symbol sequence $x_0$, $x_1$, $x_2$, . . . , $x_{E/Qm-1}$ being obtained by the first communication node mapping every Qm bits in a first bit sequence $f_0$, $f_1$, $f_2$, . . . , $f_{E-1}$ to one complex-valued modulation symbol based on a regular amplitude phase shift keying (RAPSK) constellation, where E denotes a length of the first bit sequence and is a positive integer, Qm denotes a modulation order of RAPSK modulation, and the RAPSK constellation has $2^{Qm}$ constellation points.

The data transmission apparatus provided by this embodiment is configured to implement the data transmission method of the embodiment shown in FIG. 2. The implementation principle and technical effect of the data transmission apparatus according to this embodiment are similar to those of the above embodiment, and therefore, details are not repeated herein again.

In an embodiment, the RAPSK constellation includes at least one of the following features:

all the constellation points in the RAPSK constellation are located on $Na=2^{ma}$ concentric circles, where ma denotes a number of amplitude mapping bits, and $ma=Qm/2-1$;

all the constellation points in the RAPSK constellation are located on $Na=2^{ma}$ concentric circles, and there are $Np=2^{mp}$ constellation points on each concentric circle, where ma denotes a number of amplitude mapping bits, mp denotes a number of phase mapping bits, and $mp=Qm-ma$;

there are $Np=2^{mp}$ constellation points on each concentric circle of the RAPSK constellation, where mp denotes a number of phase mapping bits, and $mp=Qm/2+1$;

all the constellation points in the RAPSK constellation are located on $Na=2^{ma}$ concentric circles, and a concentric circle labeled i has a radius of $r_i=r_0+i\cdot D$, where i=0, 1, . . . , Na−1, ma denotes a number of amplitude mapping bits, $r_0$ denotes a minimum radius, D denotes an interval between adjacent concentric circles, and $r_0$ has a value range which is a function of Qm; or all the constellation points in the RAPSK constellation are located on $Na=2^{ma}$ concentric circles, and a concentric circle labeled i has a radius of $r_i=r_0+i\cdot D$, where i=0, 1, . . . , Na−1, ma denotes a number of amplitude mapping bits, $r_0$ denotes a minimum radius, D denotes an interval between adjacent concentric circles, and D has a value range which is a function of Qm.

In an embodiment, every Qm bits $[f_{k\cdot Qm}$, $f_{1+k\cdot Qm}$, $f_2+k\cdot Qm$, . . . $f_{Qm-1+k\cdot Qm}]=[b_0$, $b_1$, . . . , $b_{Qm-1}]$ in the first bit sequence $f_0$, $f_1$, $f_2$, . . . , $f_{E-1}$ are mapped to one complex-valued modulation symbol $x_k=x$, where k=0, 1, . . . , E/Qm−1; and the mp phase mapping bits $c_{1,0}$, $c_{1,1}$, . . . , $c_{1,mp-1}$ are determined in any one of the following manners:

the phase mapping bits $c_{1,0}$, $c_{1,1}$, . . . , $c_{1,mp-1}$ are the first mp bits of the Qm bits $b_0$, $b_1$, . . . , $b_{Qm-1}$;

the phase mapping bits $c_{1,0}$, $c_{1,1}$, . . . , $c_{1,mp-1}$ are the first mp bits of the Qm bits $b_0$, $b_1$, . . . , $b_{Qm-1}$ with positions of the bits $b_0$ and $b_1$ exchanged;

the phase mapping bits $c_{1,0}$, $c_{1,1}$, . . . , $c_{1,mp-1}$ are the last mp bits of the Qm bits $b_0$, $b_1$, . . . , $b_{Qm-1}$; or the phase mapping bits $c_{1,0}$, $c_{1,1}$, . . . , $c_{1,mp-1}$ are the first 2 bits and the odd-indexed bits in the last Qm−2 bits of the Qm bits $b_0$, $b_1$, . . . , $b_{Qm-1}$.

In an embodiment, every Qm bits $[f_{k\cdot Qm}$, $f_{1+k\cdot Qm}$, $f_2+k\cdot Qm$, . . . , $f_{Qm-1+k\cdot Qm}]=[b_0$, $b_1$, . . . , $b_{Qm-1}]$ in the first bit sequence $f_0$, $f_1$, $f_2$, . . . , $f_{E-1}$ are mapped to one complex-valued modulation symbol $x_k=x$, where k=0, 1, . . . , E/Qm−1; and the ma amplitude mapping bits $c_{2,0}$, $c_{2,1}$, . . . , $c_{2,ma-1}$ are determined in any one of the following manners:

the amplitude mapping bits $c_{2,0}$, $c_{2,1}$, . . . , $c_{2,ma-1}$ are the last ma bits of the Qm bits $b_0$, $b_1$, . . . , $b_{Qm-1}$;

the amplitude mapping bits $c_{2,0}$, $c_{2,1}$, . . . , $c_{2,ma-1}$ are the first ma bits of the Qm bits $b_0$, $b_1$, . . . , $b_{Qm-1}$; or the amplitude mapping bits $c_{2,0}$, $c_{2,1}$, . . . , $c_{2,ma-1}$ are the even-indexed bits in the last Qm−2 bits of the Qm bits $b_0$, $b_1$, . . . , $b_{Qm-1}$.

In an embodiment, every Qm bits $[f_{k\cdot Qm}$, $f_1+k\cdot Qm$, $f_2+k\cdot Qm$, . . . , $f_{Qm-1+k\cdot Qm}]=[b_0$, $b_1$, . . . , $b_{Qm-1}]$ in the first bit sequence $f_0$, $f_1$, $f_2$, . . . , $f_{E-1}$ are mapped to one complex-valued modulation symbol $x_k=x$, where k=0, 1, . . . , E/Qm−1;

the Qm bits of one complex-valued modulation symbol x include a first segment of bits, a second segment of bits, and a third segment of bits; and the first segment of bits includes two sign mapping bits $d_{1,0}$ and $d_{1,1}$, the second segment of bits includes mp−2 bits $d_{2,0}$, $d_{2,1}$, . . . , $d_{2,mp-3}$, and the third segment of bits include $ma=Qm-mp$ bits $d_{3,0}$, $d_{3,1}$, . . . , $d_{3,ma-1}$, where $2 \le mp<Qm$.

In an embodiment, the first segment of bits $d_{1,0}$ and $d_{1,1}$ are determined in any one of the following manners:

the first segment of bits $d_{1,0}$ and $d_{1,1}$ are the first 2 bits of the Qm bits $b_0$, $b_1$, . . . , $b_{Qm-1}$;

the first segment of bits $d_{1,0}$ and $d_{1,1}$ are the first 2 bits of the Qm bits $b_0$, $b_1$, . . . , $b_{Qm-1}$ with positions of the bits $b_0$ and $b_i$ exchanged; or the first segment of bits $d_{1,0}$ and $d_{1,1}$ are the two bits with indexes ma and ma+1 in the Qm bits $b_0$, $b_1$, . . . , $b_{Qm-1}$.

In an embodiment, the second segment of bits $d_{2,0}$, $d_{2,1}$, . . . , $d_{2,mp-3}$ are determined in any one of the following manners:

the second segment of bits $d_{2,0}$, $d_{2,1}$, . . . , $d_{2,mp-3}$ are the bits with indexes from 2 to mp−1 in the Qm bits $b_0$, $b_1$, . . . , $b_{Qm-1}$;

the second segment of bits $d_{2,0}$, $d_{2,1}$, . . . , $d_{2,mp-3}$ are the last mp−2 bits of the Qm bits $b_0$, $b_1$, . . . , $b_{Qm-1}$; or the second segment of bits $d_{2,0}$, $d_{2,1}$, . . . , $d_{2,mp-3}$ are the odd-indexed bits in the last Qm−2 bits of the Qm bits $b_0$, $b_1$, . . . , $b_{Qm-1}$.

In an embodiment, the third segment of bits $d_{3,0}$, $d_{3,1}$, . . . , $d_{3,ma-1}$ are determined in any one of the following manners:

the third segment of bits $d_{3,0}$, $d_{3,1}$, . . . , $d_{3,ma-1}$ are the last ma bits of the Qm bits $b_0$, $b_1$, . . . , $b_{Qm-1}$;

the third segment of bits $d_{3,0}$, $d_{3,1}$, . . . , $d_{3,ma-1}$ are the first ma bits of the Qm bits $b_0$, $b_1$, . . . , $b_{Qm-1}$; or the third segment of bits $d_{3,0}$, $d_{3,1}$, . . . , $d_{3,ma-1}$ are the even-indexed bits in the last Qm−2 bits of the Qm bits $b_0$, $b_1$, . . . , $b_{Qm-1}$.

In an embodiment, in a case where mp or ma is greater than 1, mp phase mapping bits $c_{1,0}$, $c_{1,1}$, . . . , $c_{1,mp-1}$ and ma amplitude mapping bits $c_{2,0}$, $c_{2,1}$, . . . , $c_{2,ma-1}$ use the same Gray mapping scheme.

In an embodiment, in a case where mp−2 or ma is greater than 1, mp−2 bits $d_{2,0}$, $d_{2,1}$, ..., $d_{2,mp-3}$ and ma bits $d_{3,0}$, $d_{3,1}$, ..., $d_{3,ma-1}$ use the same Gray mapping scheme.

A further embodiment of the present disclosure provides a communication node, including: a processor for implementing a method according to any embodiment of the present disclosure when executing a computer program. Specifically, the device may be the first communication node (such as a base station or a UE) provided by any embodiment of the present disclosure, or the second communication node (such as a UE or a base station) provided by any embodiment of the present disclosure, which is not specifically limited in the present disclosure.

By way of example, the following embodiments provide schematic diagrams of the communication node being a base station and UE.

Figure 21:
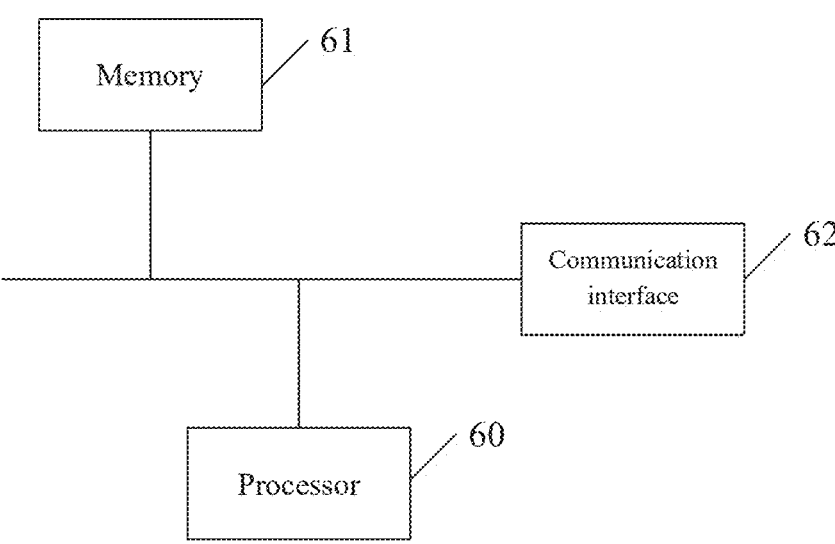
FIG. 21 is a schematic diagram of a base station according to an embodiment.

FIG. 21 shows a schematic diagram of a base station according to an embodiment. As shown in FIG. 21, the base station includes a processor 60, a memory 61, and a communication interface 62. The number of processor(s) 60 in the base station can be one or more, and one processor 60 is shown as an example in FIG. 21. The processor 60, the memory 61, and the communication interface 62 in the base station may be connected by a bus or by other means. In FIG. 21, the connection is realized by a bus as an example. The bus refers to one or more of several types of bus structures, including a memory bus or a memory controller, a peripheral bus, an accelerated graphics port, a processor or a local bus using any of a variety of bus structures.

As a computer-readable storage medium, the memory 61 may be configured to store a software program, a computer-executable program and a module, for example, the program instructions/modules corresponding to the method of the embodiments of the present disclosure. The processor 60 executes at least one functional application of the base station as well as data processing by running the software programs, instructions, and modules stored in the memory 61, i.e., to implement any of the transmission methods described above.

The memory 61 may include a storage program area and a storage data area, where the storage program area may store an operating system and application program(s) required by at least one function, and the storage data area may store data created according to the use of a terminal device, etc. In addition, the memory 61 may include a high-speed random access memory and a non-volatile memory, for example, at least one magnetic disk storage device, a flash memory device, or other non-volatile solid-state storage devices. In some examples, the memory 61 may include memories remotely located with respect to the processor 60, and these remote memories may be connected to the base station via a network. Examples of the above-mentioned network include the Internet, an intranet, a network, a mobile communication network, and a combination thereof.

The communication interface 62 may be configured to receive and transmit data.

Figure 22:
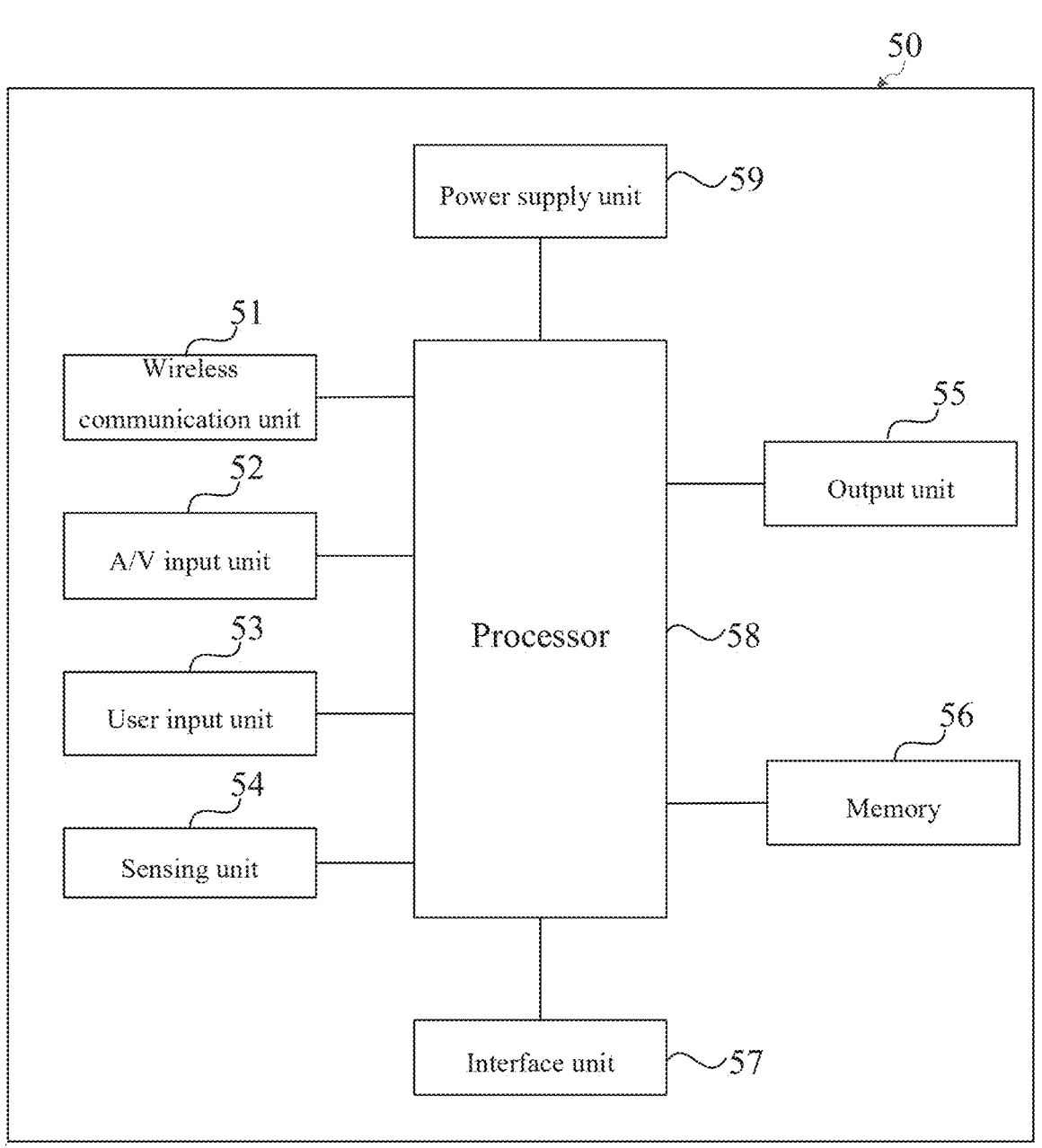
FIG. 22 is a schematic diagram of a UE according to an embodiment.

FIG. 22 shows a schematic diagram of a UE according to an embodiment. The UE may be implemented in various forms. The UE in the present disclosure may include, but is not limited to, mobile terminal devices such as mobile phones, smart phones, notebook computers, digital broadcast receivers, Personal Digital Assistants (PDAs), Portable Devices (PADs), portable media players (PMPs), navigation devices, vehicle-mounted terminal devices, vehicle-mounted display terminal devices, and vehicle-mounted electronic rearview mirrors, and also fixed terminal devices such as digital televisions (TVs), and desktop computers.

As shown in FIG. 22, UE 50 may include a wireless communication unit 51, an audio/video (A/V) input unit 52, a user input unit 53, a sensing unit 54, an output unit 55, a memory 56, an interface unit 57, a processor 58, a power supply unit 59, etc. FIG. 22 shows the UE including a plurality of components, but it should be understood that it is not necessary to implement all the components shown. Alternatively, more or fewer components can be implemented.

In this embodiment, the wireless communication unit 51 allows radio communication between the UE 50 and a base station or network. The A/V input unit 52 is configured to receive an audio or video signal. The user input unit 53 may generate key input data according to a command input by the user to control a plurality of operations of the UE 50. The sensing unit 54 detects a current state of the UE 50, a position of the UE 50, presence or absence of a touch input to the UE 50 from a user, orientation of the UE 50, acceleration or deceleration movement and direction of the UE 50, etc., and generates a command or a signal for controlling operation of the UE 50. The interface unit 57 serves as an interface through which at least one external device can connect with the UE 50. The output unit 55 is configured to provide an output signal through visual, audio, and/or tactile means. The memory 56 may store software programs and other related data for processing and control operations performed by the processor 58 or may temporarily store data that has been output or is about to be output. The memory 56 may include at least one type of storage medium. Also, the UE 50 may cooperate with a network storage apparatus that performs a storage function of the memory 56 over a network connection. The processor 58 generally controls the overall operation of the UE 50. The power supply unit 59, under the control of the processor 58, receives external power or internal power and provides appropriate power required to operate a plurality of elements and components.

By running the programs stored in the memory 56, the processor 58 performs at least one functional application and data processing, for example, implementing the method according to the embodiments of the present disclosure.

A further embodiment of the present disclosure provides a computer-readable storage medium storing a computer program which, when executed by a processor, causes the processor to perform the method according to any of the embodiments of the present disclosure.

The computer storage medium of this embodiment may be any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any suitable combination thereof. Examples of the computer-readable storage medium (a non-exhaustive list thereof) include: an electrical connection with one or more wires, a portable computer disk, a hard disk, a Random Access Memory (RAM), a Read-Only Memory (ROM), an erasable programmable read-only memory, EPROM), a flash memory, an optical fiber, a Compact Disc Read-Only Memory (CD-ROM), an optical storage device, a magnetic storage device or any proper combination thereof. Herein, the computer-readable storage medium may be any tangible medium including or storing a program, and the program may be used by or used in combination with an instruction execution system, apparatus or device.

The computer-readable signal medium may include a data signal propagated in a baseband or propagated as a part of a carrier, and the data signal carries the computer-readable program code. Such a propagated signal may take any of a variety of forms, including, but not limited to, electromagnetic, optical, or any suitable combination thereof. The computer-readable signal medium may alternatively be any computer-readable storage medium other than the computer-readable medium. The computer-readable storage medium may send, propagate or transmit a program used by or used in combination with an instruction execution system, apparatus or device.

The program code embodied on the computer-readable medium may be transmitted using any appropriate medium, including but not limited to wireless means, wired means, optical fiber cables, radio frequency (RF), etc., or any suitable combination of the foregoing.

The computer program code for executing the operations in the present disclosure may be compiled by using one or more programming languages or a combination of several programming languages. The programming languages include object oriented programming languages (such as Java, Smalltalk, C++, Ruby, and Go) and also conventional procedural programming languages (such as C or similar programming languages). The program code may be executed fully on a client computer, executed partially on a client computer, executed as an independent software package, executed partially on a client computer and partially on a remote computer, or executed fully on a remote computer or a server. In scenarios involving a remote computer, the remote computer may be connected to a client computer via any type of network, including a Local Area Network (LAN) or a Wide Area Network (WAN), or may be connected to an external computer (for example, connected via the Internet by using an Internet service provider).

Those of ordinary skill in the art should understand that the term "user equipment" covers any suitable type of wireless user equipment, such as mobile phones, portable data processing equipment, portable web browsers or vehicle-mounted mobile stations.

Generally speaking, various embodiments of the present disclosure may be implemented in hardware or dedicated circuits, software, logic, or any combination thereof. For example, some aspects may be implemented in hardware, while other aspects may be implemented in firmware or software that may be executed by a controller, a microprocessor or another computing device. However, the present disclosure is not limited thereto.

Embodiments of the present disclosure may be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure may represent program steps, or may represent interconnected logic circuits, modules and functions, or may represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A data transmission method, performed by a first communication node, the method comprising:

acquiring a first bit sequence $f_0, f_1, f_2, \ldots, f_{E-1}$;

mapping every Qm bits in the first bit sequence $f_0, f_1, f_2, \ldots, f_{E-1}$ to one complex-valued modulation symbol based on a Regular Amplitude Phase Shift Keying (RAPSK) constellation to obtain a symbol sequence $x_0, x_1, x_2, \ldots, x_{E/Qm-1}$, wherein E denotes a length of the first bit sequence and is a positive integer, Qm denotes a modulation order of RAPSK modulation, and the RAPSK constellation has $2^{Qm}$ constellation points; and transmitting the symbol sequence $x_0, x_1, x_2, \ldots, x_{E/Qm-1}$ to a second communication node;

wherein the RAPSK constellation comprises at least one of the following features:

all the constellation points in the RAPSK constellation are located on $Na=2^{ma}$ concentric circles, wherein ma denotes a number of amplitude mapping bits, and ma=Qm/2−1;

all the constellation points in the RAPSK constellation are located on $Na=2^{ma}$ concentric circles, and there are $Np=2^{mp}$ constellation points on each concentric circle, wherein ma denotes a number of amplitude mapping bits, mp denotes a number of phase mapping bits, and mp=Qm−ma;

there are $Np=2^{mp}$ constellation points on each concentric circle of the RAPSK constellation, wherein mp denotes a number of phase mapping bits, and mp=Qm/2+1;

all the constellation points in the RAPSK constellation are located on $Na=2^{ma}$ concentric circles, and a concentric circle labeled i has a radius of $r_i=r_0+i \cdot D$, wherein i=0, 1, . . . , Na−1, ma denotes a number of amplitude mapping bits, $r_0$ denotes a minimum radius, D denotes an interval between adjacent concentric circles, and $r_0$ has a value range which is a function of Qm; or all the constellation points in the RAPSK constellation are located on $Na=2^{ma}$ concentric circles, and a concentric circle labeled i has a radius of $r_i=r_0+i \cdot D$, wherein i=0, 1, . . . , Na−1, ma denotes a number of amplitude mapping bits, $r_0$ denotes a minimum radius, D denotes an interval between adjacent concentric circles, and D has a value range which is a function of Qm.

2. The method of claim 1, wherein every Qm bits $[f_{k \cdot Qm}, f_{1+k \cdot Qm}, f_{2+k \cdot Qm}, \ldots f_{Qm-1+k \cdot Qm}]=[b_0, b_1, \ldots, b_{Qm-1}]$ in the first bit sequence $f_0, f_1, f_2, \ldots, f_{E-1}$ are mapped to one complex-valued modulation symbol $x_k=x$, where k=0, 1, . . . , E/Qm−1; and the mp phase mapping bits $c_{1,0}, c_{1,1}, \ldots, c_{1,mp-1}$ are determined in any one of the following manners:

the phase mapping bits $c_{1,0}, c_{1,1}, \ldots, c_{1,mp-1}$ are the first mp bits of the Qm bits $b_0, b_1, \ldots, b_{Qm-1}$;

the phase mapping bits $c_{1,0}$, $c_{1,1}$, ..., $c_{1,mp-1}$ are the first mp bits of the Qm bits $b_0$, $b_1$, ..., $b_{Qm-1}$ with positions of the bits $b_0$ and $b_1$ exchanged;

the phase mapping bits $c_{1,0}$, $c_{1,1}$, ..., $c_{1,mp-1}$ are the last mp bits of the Qm bits $b_0$, $b_1$, ..., $b_{Qm-1}$; or the phase mapping bits $c_{1,0}$, $c_{1,1}$, ..., $c_{1,mp-1}$ are the first 2 bits and the odd-indexed bits in the last Qm−2 bits of the Qm bits $b_0$, $b_1$, ..., $b_{Qm-1}$.

3. The method of claim 1, wherein every Qm bits $[f_{k \cdot Qm}, f_{1+k \cdot Qm}, f_{2+k \cdot Qm}, ..., f_{Qm-1+k \cdot Qm}]=[b_0, b_1, ..., b_{Qm-1}]$ in the first bit sequence $f_0$, $f_1$, $f_2$, ..., $f_{E-1}$ are mapped to one complex-valued modulation symbol $x_k=x$, where k=0, 1, ..., E/Qm−1; and the ma amplitude mapping bits $c_{2,0}$, $c_{2,1}$, ..., $c_{2,ma-1}$ are determined in any one of the following manners:

the amplitude mapping bits $c_{2,0}$, $c_{2,1}$, ..., $c_{2,ma-1}$ are the last ma bits of the Qm bits $b_0$, $b_1$, ..., $b_{Qm-1}$;

the amplitude mapping bits $c_{2,0}$, $c_{2,1}$, ..., $c_{2,ma-1}$ are the first ma bits of the Qm bits $b_0$, $b_1$, ..., $b_{Qm-1}$; or the amplitude mapping bits $c_{2,0}$, $c_{2,1}$, ..., $c_{2,ma-1}$ are the even-indexed bits in the last Qm−2 bits of the Qm bits $b_0$, $b_1$, ..., $b_{Qm-1}$.

4. The method of claim 1, wherein every Qm bits $[f_{k \cdot Qm}, f_{1+k \cdot Qm}, f_{2+k \cdot Qm}, ... f_{Qm-1+k \cdot Qm}]=[b_0, b_1, ..., b_{Qm-1}]$ in the first bit sequence $f_0$, $f_1$, $f_2$, ..., $f_{E-1}$ are mapped to one complex-valued modulation symbol $x_k=x$, where k=0, 1, ..., E/Qm−1;

the Qm bits of one complex-valued modulation symbol x comprise a first segment of bits, a second segment of bits, and a third segment of bits; and the first segment of bits comprises two sign mapping bits $d_{1,0}$ and $d_{1,1}$, the second segment of bits comprises mp−2 bits $d_{2,0}$, $d_{2,1}$, ..., $d_{2,mp-3}$, and the third segment of bits comprise ma=Qm−mp bits $d_{3,0}$, $d_{3,1}$, ..., $d_{3,ma-1}$, wherein 2≤mp<Qm.

5. The method of claim 4, wherein the first segment of bits $d_{1,0}$ and $d_{1,1}$ are determined in any one of the following manners:

the first segment of bits $d_{1,0}$ and $d_{1,1}$ are the first 2 bits of the Qm bits $b_0$, $b_1$, ..., $b_{Qm-1}$;

the first segment of bits $d_{1,0}$ and $d_{1,1}$ are the first 2 bits of the Qm bits $b_0$, $b_1$, ..., $b_{Qm-1}$ with positions of the bits $b_0$ and $b_1$ exchanged; or the first segment of bits $d_{1,0}$ and $d_{1,1}$ are the two bits with indexes ma and ma+1 in the Qm bits $b_0$, $b_1$, ..., bd.

6. The method of claim 4, wherein the second segment of bits $d_{2,0}$, $d_{2,1}$, ..., $d_{2,mp-3}$ are determined in any one of the following manners:

the second segment of bits $d_{2,0}$, $d_{2,1}$, ..., $d_{2,mp-3}$ are the bits with indexes from 2 to mp−1 in the Qm bits $b_0$, $b_1$, ..., $b_{Qm-1}$;

the second segment of bits $d_{2,0}$, $d_{2,1}$, ..., $d_{2,mp-3}$ are the last mp−2 bits of the Qm bits $b_0$, $b_1$, ..., $b_{Qm-1}$; or the second segment of bits $d_{2,0}$, $d_{2,1}$, ..., $d_{2,mp-3}$ are the odd-indexed bits in the last Qm−2 bits of the Qm bits $b_0$, $b_1$, ..., $b_{Qm-1}$.

7. The method of claim 4, wherein the third segment of bits $d_{3,0}$, $d_{3,1}$, ..., $d_{3,ma-1}$ are determined in any one of the following manners:

the third segment of bits $d_{3,0}$, $d_{3,1}$, ..., $d_{3,ma-1}$ are the last ma bits of the Qm bits $b_0$, $b_1$, ..., $b_{Qm-1}$;

the third segment of bits $d_{3,0}$, $d_{3,1}$, ..., $d_{3,ma-1}$ are the first ma bits of the Qm bits $b_0$, $b_1$, ..., $b_{Qm-1}$; or the third segment of bits $d_{3,0}$, $d_{3,1}$, ..., $d_{3,ma-1}$ are the even-indexed bits in the last Qm−2 bits of the Qm bits $b_0$, $b_1$, ..., $b_{Qm-1}$.

8. The method of claim 1, wherein, in a case where mp or ma is greater than 1, mp phase mapping bits $c_{1,0}$, $c_{1,1}$, ..., $c_{1,mp-1}$ and ma amplitude mapping bits $c_{2,0}$, $c_{2,1}$, ..., $c_{2,ma-1}$ use the same Gray mapping scheme.

9. The method of claim 1, wherein, in a case where mp−2 or ma is greater than 1, mp−2 bits $d_{2,0}$, $d_{2,1}$, ..., $d_{2,mp-3}$ and ma bits $d_{3,0}$, $d_{3,1}$, ..., $d_{3,ma-1}$ use the same Gray mapping scheme.

10. The method of claim 1, wherein acquiring a first bit sequence $f_0$, $f_1$, $f_2$, ..., $f_{E-1}$ comprises:

acquiring a second bit sequence $e_0$, $e_1$, $e_2$, ..., $e_{E-1}$ from a transport block; and subjecting the second bit sequence $e_0$, $e_1$, $e_2$, ..., $e_{E-1}$ to bit interleaving to obtain the first bit sequence $f_0$, $f_1$, $f_2$, ..., $f_{E-1}$.

11. The method of claim 10, wherein the first K bits of the second bit sequence $e_0$, $e_1$, $e_2$, ..., $e_{E-1}$ are input bits of channel coding, wherein 0<K<E.

12. A communication node, comprising a processor, wherein the processor is configured to perform the data transmission method of claim 1 when executing a computer program.

13. A non-transitory computer-readable storage medium storing a computer program which, when executed by a processor, causes the processor to perform the data transmission method of claim 1.

14. A data transmission method, performed by a second communication node, the method comprising:

receiving a symbol sequence $x_0$, $x_1$, $x_2$, ..., $x_{E/Qm-1}$ transmitted by a first communication node, the symbol sequence $x_0$, $x_1$, $x_2$, ..., $x_{E/Qm-1}$ being obtained by the first communication node mapping every Qm bits in a first bit sequence $f_0$, $f_1$, $f_2$, ..., $f_{E-1}$ to one complex-valued modulation symbol based on a Regular Amplitude Phase Shift Keying (RAPSK) constellation, wherein E denotes a length of the first bit sequence and is a positive integer, Qm denotes a modulation order of RAPSK modulation, and the RAPSK constellation has $2^{Qm}$ constellation points;

wherein the RAPSK constellation comprises at least one of the following features:

all the constellation points in the RAPSK constellation are located on Na=$2^{ma}$ concentric circles, wherein ma denotes a number of amplitude mapping bits, and ma=Qm/2−1;

all the constellation points in the RAPSK constellation are located on Na=$2^{ma}$ concentric circles, and there are Np=$2^{mp}$ constellation points on each concentric circle, wherein ma denotes a number of amplitude mapping bits, mp denotes a number of phase mapping bits, and mp=Qm−ma;

there are Np=$2^{mp}$ constellation points on each concentric circle of the RAPSK constellation, wherein mp denotes a number of phase mapping bits, and mp=Qm/2+1;

all the constellation points in the RAPSK constellation are located on Na=$2^{ma}$ concentric circles, and a concentric circle labeled i has a radius of $r_i=r_0+i \cdot D$, wherein i=0, 1, ..., Na−1, ma denotes a number of amplitude mapping bits, $r_0$ denotes a minimum radius, D denotes an interval between adjacent concentric circles, and $r_0$ has a value range which is a function of Qm; or all the constellation points in the RAPSK constellation are located on Na=$2^{ma}$ concentric circles, and a concentric circle labeled i has a radius of $r_i=r_0+i \cdot D$, wherein i=0, 1, ..., Na−1, ma denotes a number of amplitude mapping bits, $r_0$ denotes a minimum radius, D denotes an interval between adjacent concentric circles, and D has a value range which is a function of Qm.

15. The method of claim 14, wherein every Qm bits $[f_{k \cdot Qm}, f_{1+k \cdot Qm}, f_{2+k \cdot Qm}, \ldots, f_{Qm-1+k \cdot Qm}] = [b_0, b_1, \ldots, b_{Qm-1}]$ in the first bit sequence $f_0, f_1, f_2, \ldots, f_{E-1}$ are mapped to one complex-valued modulation symbol $x_k = x$, where $k = 0, 1, \ldots, E/Qm-1$;

the mp phase mapping bits $c_{1,0}, c_{1,1}, \ldots, c_{1,mp-1}$ are determined in any one of the following manners:

the phase mapping bits $c_{1,0}, c_{1,1}, \ldots, c_{1,mp-1}$ are the first mp bits of the Qm bits $b_0, b_1, \ldots, b_{Qm-1}$;

the phase mapping bits $c_{1,0}, c_{1,1}, \ldots, c_{1,mp-1}$ are the first mp bits of the Qm bits $b_0, b_1, \ldots, b_{Qm-1}$ with positions of the bits $b_0$ and $b_1$ exchanged;

the phase mapping bits $c_{1,0}, c_{1,1}, \ldots, c_{1,mp-1}$ are the last mp bits of the Qm bits $b_0, b_1, \ldots, b_{Qm-1}$; or the phase mapping bits $c_{1,0}, c_{1,1}, \ldots, c_{1,mp-1}$ are the first 2 bits and the odd-indexed bits in the last Qm-2 bits of the Qm bits $b_0, b_1, \ldots, b_{Qm-1}$.

16. The method of claim 14, wherein every Qm bits $[f_{k \cdot Qm}, f_{1+k \cdot Qm}, f_{2+k \cdot Qm}, \ldots, f_{Qm-1+k \cdot Qm}] = [b_0, b_1, \ldots, b_{Qm-1}]$ in the first bit sequence $f_0, f_1, f_2, \ldots, f_{E-1}$ are mapped to one complex-valued modulation symbol $x_k = x$, where $k = 0, 1, \ldots, E/Qm-1$;

the mp phase mapping bits $c_{1,0}, c_{1,1}, \ldots, c_{1,mp-1}$ are determined in any one of the following manners:

the phase mapping bits $c_{1,0}, c_{1,1}, \ldots, c_{1,mp-1}$ are the first mp bits of the Qm bits $b_0, b_1, \ldots, b_{Qm-1}$;

the phase mapping bits $c_{1,0}, c_{1,1}, \ldots, c_{1,mp-1}$ are the first mp bits of the Qm bits $b_0, b_1, \ldots, b_{Qm-1}$ with positions of the bits $b_0$ and $b_1$ exchanged;

the phase mapping bits $c_{1,0}, c_{1,1}, \ldots, c_{1,mp-1}$ are the last mp bits of the Qm bits $b_0, b_1, \ldots, b_{Qm-1}$; or the phase mapping bits $c_{1,0}, c_{1,1}, \ldots, c_{1,mp-1}$ are the first 2 bits and the odd-indexed bits in the last Qm-2 bits of the Qm bits $b_0, b_1, \ldots, b_{Qm-1}$.

17. A communication node, comprising a processor, wherein the processor is configured to perform the data transmission method of claim 14 when executing a computer program.

18. A non-transitory computer-readable storage medium storing a computer program which, when executed by a processor, causes the processor to perform the data transmission method of claim 14.

* * * * *